(12) United States Patent
Bullinger et al.

(10) Patent No.: US 8,579,999 B2
(45) Date of Patent: Nov. 12, 2013

(54) METHOD OF ENHANCING THE QUALITY OF HIGH-MOISTURE MATERIALS USING SYSTEM HEAT SOURCES

(75) Inventors: Charles W. Bullinger, Bismarck, ND (US); Mark A. Ness, Underwood, ND (US); Nenad Sarunac, Easton, PA (US); Edward K. Levy, Bethlehem, PA (US); Richard S. Weinstein, Bismarck, ND (US); Dennis R. James, Bismarck, ND (US)

(73) Assignee: Great River Energy, Maple Grove, MN (US)

( * ) Notice: Subject to any disclaimer, the term of this patent is extended or adjusted under 35 U.S.C. 154(b) by 1470 days.

(21) Appl. No.: 11/107,152

(22) Filed: Apr. 15, 2005

(65) Prior Publication Data

US 2006/0075682 A1 Apr. 13, 2006

Related U.S. Application Data

(60) Provisional application No. 60/618,379, filed on Oct. 12, 2004.

(51) Int. Cl.
*C10L 5/00* (2006.01)

(52) U.S. Cl.
USPC .............................................. 44/626; 44/629

(58) Field of Classification Search
USPC ................................... 44/626, 501, 505, 629
See application file for complete search history.

(56) References Cited

U.S. PATENT DOCUMENTS

| | | |
|---|---|---|
| 2,101,295 A | 12/1937 | Rusk |
| 2,303,367 A | 12/1942 | Kendall et al. |
| 2,512,422 A | 6/1950 | Fletcher et al. |
| 2,586,818 A | 2/1952 | Harms |

(Continued)

FOREIGN PATENT DOCUMENTS

| | | | |
|---|---|---|---|
| CN | 2165939 | 5/1994 | ................ B07B 7/00 |
| DE | 67 770 | 7/1969 | |

(Continued)

OTHER PUBLICATIONS

Kakaras, et al. "Computer Simulation Studies for the Integration of an External Dryer into a Greek Lignite-Fired Power Plant," 81 *Fuel* 583-93 (2002).

(Continued)

*Primary Examiner* — James Goloboy
*Assistant Examiner* — Latosha Hines
(74) *Attorney, Agent, or Firm* — Moss & Barnett

(57) ABSTRACT

The present invention harvests and utilizes fluidized bed drying technology and waste heat streams augmented by other available heat sources to dry feedstock or fuel. This method is useful in many industries, including coal-fired power plants. Coal is dried using the present invention before it goes to coal pulverizers and on to the furnace/boiler arrangement. Coal can be intercepted on current coal feed systems ahead of the pulverizers. Drying fuel, such as coal, is done to improve boiler efficiency and reduce emissions. A two-stage bed utilized in the process first "pre-dries and separates" the feed stream into desirable and undesirable feedstock. Then, it incrementally dries and segregates fluidizable and non-fluidizable material from the product stream. This is all completed in a low-temperature, open-air system. Elevation of fan room air temperature is also accomplished using waste heat, thereby making available to the plant system higher temperature media to enhance the feedstock drying process.

33 Claims, 37 Drawing Sheets

(56) References Cited

U.S. PATENT DOCUMENTS

| | | | |
|---|---|---|---|
| 2,600,425 A | 6/1952 | Parry | |
| 2,671,968 A | 3/1954 | Criner | |
| 2,932,395 A | 4/1960 | Marot | |
| 3,007,577 A | 11/1961 | Putman | |
| 3,090,131 A | 5/1963 | Waterman, Jr | |
| 3,140,862 A | 7/1964 | Schoppe | |
| 3,238,634 A | 3/1966 | Groins | |
| 3,246,750 A | 4/1966 | Chase et al. | |
| 3,262,214 A | 7/1966 | Webb | |
| 3,331,754 A | 7/1967 | Mansfield | |
| 3,409,131 A | 11/1968 | Alfred at al. | |
| 3,434,932 A | 3/1969 | Mansfield | |
| 3,471,016 A | 10/1969 | Everson et al. | |
| 3,539,001 A | 11/1970 | Binnex et al. | |
| 3,654,705 A | 4/1972 | Smith et al. | |
| 3,687,431 A | 8/1972 | Parks | |
| 3,687,743 A | 8/1972 | Parks | |
| 3,721,014 A | 3/1973 | Voelskow | |
| 3,728,230 A | 4/1973 | Kemmetmueller | |
| 3,734,289 A | 5/1973 | Pearman | |
| 3,744,145 A | 7/1973 | Maxwell et al. | |
| 3,774,759 A | 11/1973 | Weintraub et al. | |
| 3,800,427 A | 4/1974 | Kemmetmueller | |
| 3,803,846 A * | 4/1974 | Letvin | 60/685 |
| 3,842,461 A | 10/1974 | Wurster | |
| 3,852,168 A | 12/1974 | Oetiker | |
| 3,856,441 A | 12/1974 | Suzukawa et al. | |
| 3,959,084 A | 5/1976 | Price | |
| 3,960,513 A | 6/1976 | Agarwal et al. | |
| 3,968,052 A | 7/1976 | Seglin et al. | |
| 3,985,516 A | 10/1976 | Johnson | |
| 4,028,228 A | 6/1977 | Ferris et al. | |
| 4,030,895 A | 6/1977 | Caughey | |
| 4,052,168 A | 10/1977 | Koppelman | |
| 4,053,364 A | 10/1977 | Poersch et al. | |
| 4,073,481 A | 2/1978 | Lawson et al. | |
| 4,100,033 A | 7/1978 | Holter | |
| 4,126,519 A | 11/1978 | Murray | |
| 4,145,489 A | 3/1979 | Dunlap | |
| 4,152,843 A | 5/1979 | Kemmetmueller | |
| 4,155,313 A | 5/1979 | Moss | |
| 4,174,946 A | 11/1979 | Rohde | |
| 4,176,011 A | 11/1979 | Knappstein | |
| 4,192,650 A | 3/1980 | Seitzer | |
| 4,196,676 A | 4/1980 | Brown et al. | |
| 4,201,541 A | 5/1980 | Schoppe | |
| 4,230,559 A | 10/1980 | Smith | |
| 4,236,318 A | 12/1980 | Heard et al. | |
| 4,240,877 A | 12/1980 | Stahlherm et al. | |
| 4,245,395 A | 1/1981 | Potter | |
| 4,253,821 A | 3/1981 | Bradshaw | |
| 4,253,825 A | 3/1981 | Fasano | |
| 4,265,737 A | 5/1981 | Smith et al. | |
| 4,266,539 A | 5/1981 | Parker et al. | |
| 4,276,120 A | 6/1981 | Lutz | |
| 4,280,418 A | 7/1981 | Erhard | |
| 4,282,088 A | 8/1981 | Ennis | |
| 4,284,416 A | 8/1981 | Nahas | |
| 4,284,476 A | 8/1981 | Wagener et al. | |
| 4,287,023 A | 9/1981 | Cooper | |
| 4,292,742 A | 10/1981 | Ekberg | |
| 4,294,807 A | 10/1981 | Randolph | |
| 4,295,281 A * | 10/1981 | Potter | 34/371 |
| 4,299,694 A | 11/1981 | Goodell | |
| 4,300,291 A | 11/1981 | Heard et al. | |
| 4,308,102 A | 12/1981 | Wagener et al. | |
| 4,310,501 A | 1/1982 | Reh et al. | |
| 4,324,544 A | 4/1982 | Blake | |
| 4,330,946 A | 5/1982 | Courneya | |
| 4,331,445 A | 5/1982 | Burns | |
| 4,338,160 A | 7/1982 | Dellessard et al. | |
| 4,349,367 A | 9/1982 | Krumwiede | |
| 4,354,903 A | 10/1982 | Weber et al. | |
| 4,383,379 A | 5/1983 | Avril | |
| 4,389,794 A | 6/1983 | Bitterly | |
| 4,409,101 A | 10/1983 | Salikhov et al. | |
| 4,426,810 A | 1/1984 | Rudolph et al. | |
| 4,430,161 A | 2/1984 | Petrovic et al. | |
| 4,431,485 A | 2/1984 | Petrovic et al. | |
| 4,436,589 A | 3/1984 | Petrovic et al. | |
| 4,440,625 A | 4/1984 | Go et al. | |
| 4,444,129 A | 4/1984 | Ladt | |
| 4,449,483 A | 5/1984 | Strohmeyer | |
| 4,455,135 A | 6/1984 | Bitterly | |
| 4,468,288 A | 8/1984 | Galow et al. | |
| 4,470,878 A | 9/1984 | Petrovic et al. | |
| 4,481,724 A | 11/1984 | Petrovic et al. | |
| 4,492,040 A | 1/1985 | Jensen et al. | |
| 4,493,157 A | 1/1985 | Wicker | |
| 4,495,710 A | 1/1985 | Ottoson | |
| 4,506,608 A | 3/1985 | Strohmeyer, Jr. | |
| 4,523,388 A | 6/1985 | Cuel | |
| 4,530,700 A | 7/1985 | Sawyer et al. | |
| 4,533,438 A | 8/1985 | Michel et al. | |
| 4,567,674 A | 2/1986 | Strohmeyer, Jr. | |
| 4,571,174 A | 2/1986 | Shelton | |
| 4,574,744 A | 3/1986 | Lorenz et al. | |
| 4,575,418 A | 3/1986 | Robbins | |
| 4,583,301 A | 4/1986 | Crowley et al. | |
| 4,583,468 A | 4/1986 | Reed et al. | |
| 4,589,981 A | 5/1986 | Barari et al. | |
| 4,606,793 A | 8/1986 | Petrovic et al. | |
| 4,617,744 A | 10/1986 | Siddoway et al. | |
| 4,619,732 A | 10/1986 | Clay et al. | |
| 4,627,173 A | 12/1986 | O'Hagan et al. | |
| 4,635,379 A | 1/1987 | Kroneld | |
| 4,635,380 A | 1/1987 | Anderson | |
| 4,640,873 A | 2/1987 | Tajima | |
| 4,644,664 A | 2/1987 | Bradshaw | |
| 4,655,436 A | 4/1987 | Williams | |
| 4,668,255 A | 5/1987 | Govind | |
| 4,705,533 A | 11/1987 | Simmons | |
| 4,725,337 A | 2/1988 | Green | |
| 4,736,711 A | 4/1988 | Marlair et al. | |
| 4,754,869 A | 7/1988 | Hutchison et al. | |
| 4,760,650 A | 8/1988 | Theliander et al. | |
| 4,790,748 A | 12/1988 | Litt et al. | |
| 4,795,037 A | 1/1989 | Rich, Jr. | |
| 4,800,015 A | 1/1989 | Simmons | |
| 4,809,537 A | 3/1989 | Glover et al. | |
| 4,810,258 A | 3/1989 | Greene | |
| 4,822,383 A | 4/1989 | Brose et al. | |
| 4,842,695 A | 6/1989 | Schmid et al. | |
| 4,848,249 A | 7/1989 | LePori et al. | |
| 4,852,384 A | 8/1989 | Woolbert et al. | |
| 4,882,274 A | 11/1989 | Pyne, Jr. et al. | |
| 4,888,885 A | 12/1989 | Caughey | |
| 4,908,124 A | 3/1990 | Goldbach et al. | |
| 4,945,656 A | 8/1990 | Judd | |
| 4,950,388 A | 8/1990 | Stafford | |
| 4,957,049 A | 9/1990 | Strohmeyer, Jr. | |
| 4,975,257 A * | 12/1990 | Lin | 423/244.07 |
| 5,024,681 A | 6/1991 | Chang | |
| 5,024,770 A | 6/1991 | Boyd et al. | |
| 5,033,208 A | 7/1991 | Ohno et al. | |
| 5,035,721 A | 7/1991 | Atherton | |
| 5,046,265 A | 9/1991 | Kalb | |
| 5,087,269 A * | 2/1992 | Cha et al. | 44/626 |
| 5,087,351 A | 2/1992 | Valentine, Sr. | |
| 5,103,743 A | 4/1992 | Berg | |
| 5,120,431 A | 6/1992 | Cordonnier | |
| 5,132,007 A | 7/1992 | Meyer et al. | |
| 5,137,539 A | 8/1992 | Bowling | |
| 5,137,545 A | 8/1992 | Walker | |
| 5,145,489 A | 9/1992 | Dunlop | |
| 5,146,857 A | 9/1992 | Spliethoff et al. | |
| 5,158,580 A | 10/1992 | Chang | |
| 5,171,406 A | 12/1992 | Shang et al. | |
| 5,192,398 A | 3/1993 | Kress et al. | |
| 5,197,398 A | 3/1993 | Levy et al. | |
| 5,223,088 A | 6/1993 | Hansen | |
| 5,244,099 A | 9/1993 | Zaltzman et al. | |
| 5,248,387 A | 9/1993 | Hansen | |
| 5,283,959 A | 2/1994 | Nagayoshi et al. | |

| | | |
|---|---|---|
| 5,285,581 A | 2/1994 | Walker |
| 5,289,920 A | 3/1994 | Godderidge et al. |
| 5,291,668 A | 3/1994 | Becker et al. |
| 5,299,694 A | 4/1994 | Rambaud |
| 5,322,530 A | 6/1994 | Merriam et al. |
| 5,327,717 A | 7/1994 | Hauk |
| 5,361,513 A | 11/1994 | Woessner |
| 5,372,791 A | 12/1994 | Abdulally |
| 5,373,648 A | 12/1994 | Wolf |
| 5,399,194 A | 3/1995 | Cochran et al. |
| 5,403,365 A | 4/1995 | Merriam et al. |
| 5,426,932 A | 6/1995 | Morihara et al. |
| 5,430,270 A | 7/1995 | Findlan et al. |
| 5,471,955 A | 12/1995 | Dietz |
| 5,491,969 A | 2/1996 | Cohn et al. |
| 5,501,162 A | 3/1996 | Kravets |
| 5,503,646 A | 4/1996 | McKenney et al. |
| 5,527,365 A | 6/1996 | Colemann et al. |
| 5,534,137 A | 7/1996 | Griggs et al. |
| 5,537,941 A | 7/1996 | Goidich |
| 5,546,875 A | 8/1996 | Selle et al. |
| 5,547,549 A * | 8/1996 | Fraas ............................. 202/99 |
| 5,601,703 A | 2/1997 | Szymocha et al. |
| 5,637,336 A | 6/1997 | Kannenberg et al. |
| 5,683,494 A | 11/1997 | Altman et al. |
| 5,735,061 A | 4/1998 | Lawrence |
| 5,795,484 A | 8/1998 | Greenwald, Sr. |
| 5,827,352 A | 10/1998 | Altman et al. |
| 5,830,246 A | 11/1998 | Dunlop |
| 5,830,247 A * | 11/1998 | Dunlop ........................... 44/626 |
| 5,832,848 A | 11/1998 | Reynoldson et al. |
| 5,853,548 A | 12/1998 | Piskorz et al. |
| 5,858,035 A | 1/1999 | Dunlop |
| 5,867,921 A | 2/1999 | Maruyama et al. |
| 5,869,810 A | 2/1999 | Reynolds et al. |
| 5,904,741 A | 5/1999 | Dunlop et al. |
| 5,948,143 A | 9/1999 | Sjostrom et al. |
| 5,961,693 A | 10/1999 | Altman et al. |
| 5,996,808 A | 12/1999 | Levy et al. |
| 6,065,224 A | 5/2000 | Eigner |
| 6,085,912 A | 7/2000 | Hacking, Jr. et al. |
| 6,096,118 A | 8/2000 | Altman et al. |
| 6,148,599 A | 11/2000 | McIntosh et al. |
| 6,151,799 A | 11/2000 | Jones |
| 6,162,265 A | 12/2000 | Dunlop et al. |
| 6,249,988 B1 | 6/2001 | Duske et al. |
| 6,298,579 B1 | 10/2001 | Ichitani et al. |
| 6,302,945 B1 | 10/2001 | Altman et al. |
| 6,355,094 B1 | 3/2002 | Schomaker et al. |
| 6,422,392 B1 | 7/2002 | Levy |
| 6,447,559 B1 | 9/2002 | Hunt |
| 6,488,740 B1 * | 12/2002 | Patel et al. ......................... 95/71 |
| 6,500,241 B2 | 12/2002 | Reddy |
| 6,536,133 B1 | 3/2003 | Snaper |
| 6,547,854 B1 | 4/2003 | Gray et al. |
| 6,584,699 B2 | 7/2003 | Ronning et al. |
| 6,610,263 B2 | 8/2003 | Pahlman et al. |
| 6,712,878 B2 | 3/2004 | Chang et al. |
| 6,755,892 B2 | 6/2004 | Nalette et al. |
| 6,783,739 B2 | 8/2004 | Altman |
| 6,789,488 B2 | 9/2004 | Levy et al. |
| 6,799,097 B2 | 9/2004 | Villareal Antelo et al. |
| 6,880,263 B2 | 4/2005 | Gasparini et al. |
| 6,907,996 B1 | 6/2005 | Fraas |
| 6,912,889 B2 | 7/2005 | Staphanos et al. |
| 7,237,679 B1 | 7/2007 | Hendrickson et al. |
| 7,357,903 B2 | 4/2008 | Zhou et al. |
| 2002/0184787 A1 | 12/2002 | Ronning et al. |
| 2003/0000228 A1 | 1/2003 | Leuenberger et al. |
| 2003/0046826 A1 | 3/2003 | Snaper |
| 2004/0194337 A1 | 10/2004 | Gasparini et al. |
| 2006/0107587 A1 | 5/2006 | Bullinger et al. |
| 2006/0112588 A1 | 6/2006 | Ness et al. |
| 2007/0251120 A1 | 11/2007 | Connell |
| 2007/0256316 A1 | 11/2007 | Jordison et al. |
| 2008/0028631 A1 | 2/2008 | Leahy |
| 2008/0028634 A1 | 2/2008 | Leahy |
| 2008/0201980 A1 | 8/2008 | Bullinger et al. |
| 2009/0249641 A1 | 10/2009 | Graham et al. |

FOREIGN PATENT DOCUMENTS

| | | | |
|---|---|---|---|
| DE | 22 50 000 | 4/1974 | ............ B03B 11/00 |
| DE | 2250000 | 4/1974 | |
| DE | 31 25 629 | 2/1983 | ............... F23K 1/04 |
| DE | 40 03 499 | 8/1990 | ............... F23K 1/01 |
| DE | 41 05 128 | 8/1992 | ............... F23K 1/04 |
| DE | 43 23 469 | 1/1995 | ............... F23K 1/04 |
| DE | 19518644 | 5/1995 | ............... F22B 1/02 |
| DE | 195 10 006 | 9/1996 | ............ F22B 31/08 |
| DE | 199 31 346 | 12/2000 | ............ F01K 17/06 |
| GB | 2 327 442 | 1/1999 | ............ E21B 21/06 |
| JP | 56014578 | 2/1981 | ............ C10B 39/02 |
| JP | 62-215691 | 9/1987 | ..................... 34/359 |
| JP | 08 270355 | 10/1996 | ............ E21B 10/62 |
| JP | 11-267591 A | 10/1999 | ............... B07B 4/08 |
| JP | 2001-055582 | 2/2001 | ............ C10B 57/10 |
| RU | 909499 | 2/1982 | ............ F26B 11/04 |
| SU | 562707 | 6/1977 | ............... F26B 3/06 |
| SU | 909499 | 2/1982 | ............ F26B 11/04 |
| WO | WO 90/00219 | 1/1990 | ............ F01K 17/06 |
| WO | WO 94/02712 | 2/1994 | ............... F02C 3/26 |
| WO | WO 97/14926 | 4/1997 | ............ F26B 23/02 |

OTHER PUBLICATIONS

Kravetse, A. "Enhanced Rankine Cycle-Significant Reduction in NOx Emissions and Heat Rate in Both Existing and New Coal Fired Power Plants" (Unknown), 2005.

Bullinger, Charlie "Lignite Fuel Enhancement" *Project Proposal* (Jul. 31, 2002).

"Research Demonstrates Benefits of Drying Western Coal," *Lehigh Energy Update*, vol. 20(2) (Aug. 2002).

"Increasing Power Plant Efficiency-Lignite Fuel Enhancement," *DOE Project Facts Website* (May 20, 2003).

Levy, Edward K. "Use of Coal Drying to Reduce Water Consumed in Pulverized Coal Power Plants," *First Quarterly Report to DOE* (Mar. 2003).

Ness, Mark "Lignite Fuel Enhancement: Incremental Moisture Reduction Program Phase II Oct. 2003 Status Report," (Oct. 24, 2003).

Feeley et al. "Innovative Approaches and Technologies for Improved Power Plant Water Management," *U.S. DOE Program Facts* (Jan. 1, 2004).

Levy, et al. "Use of Coal Drying to Reduce Water Consumed in Pulverized Coal Power Plants," *Fourth Quarterly Report to DOE* (Jan. 1, 2004).

Levy, Edward "Performance Evaluation of Coal Creek Pilot Dryer," *Prepared for Mark Ness of GRE for Coal Creek Station* (Feb. 6, 2004).

Thwing, Theo "Lehigh Research Aids Power Plants," *The Brown and White (Lehigh Student Newspaper)* (Feb. 8, 2004).

Ness, Mark "Lignite Fuel Enhancement: Incremental Moisture Reduction Program Phase II Feb. 2004 Status Report," (Feb. 29, 2004).

Levy, et al. "Use of Coal Drying to Reduce Water Consumed in Pulverized Coal Power Plants," *Fifth Quarterly Report to DOE* (Apr. 1, 2004).

Levy, et al. "Separation of Ash From Lignite in a Bubbling Fluidized Bed," *Presented for Mark Ness of GRE for Coal Creek Station* (Apr. 23, 2004).

Levy, et al. "Use of Coal Drying to Reduce Water Consumed in Pulverized Coal Power Plants," *Sixth Quarterly Report to DOE* (Jul. 1, 2004).

Guffey, et al. "Thermal Pretreatment of Low-Ranked Coal for Control of Mercury Emissions," 85 *Fuel Processing Technology* 521-31 (2004).

Weinstein, et al. "Lignite Fuel Enhancement: Incremental Moisture Reduction," *Memorandum*.

(56) References Cited

OTHER PUBLICATIONS

Levy, et al. "Use of Coal Drying to Reduce Water Consumed in Pulverized Coal Power Plants," *Seventh Quarterly Report to DOE* (Oct. 2004).
Ness, Mark "Pilot Fluidized Bed Coal Dryer: Test 48, 49, 50, 52, 57, 58, and 59 Results," (Dec. 26, 2004).
Dubrovich, Matthew "Ash Separation From Lignite Using a Bubbling Fluidized Bed," *Thesis Paper Presented to the Graduate and Research Committee of Lehigh University* (Jan. 21, 2005).
Ness, Mark "Lignite Fuel Enhancement: Incremental Moisture Reduction Program Phase II Mar. 2005 Final Report," *Report to NDIC* (Mar. 31, 2005).
Armor, Tony "Interest Group on Drying of Wet Fuels Using Waste Heat," (Uknown).
Niro, Inc., "Fluid Bed Processing Systems," http://www.niroinc.com/html/drying/fluidbed.html (Oct. 6, 2005).
Niro, Inc., "Particulate Processing: Fluid Bed Processors," http://niroinc.com/html/drying/fluidbed.html (Oct. 6, 2005).
Doell, Glenn "Dais-Analytic Corporation: An Energy Technology Company," (Mar. 22, 2001).
Bullinger, et al. "Coal Drying Improves Performance and Reduces Emissions," $27^{th}$ *International Technical Conference on Coal Utilization and Fuel Systems* (Clearwater, FL) (Mar. 4-7, 2002).
Sarunac, et al. "Coal Drying Improves Performance and Reduces Emissions," *EPRI Heat Rate Improvement Conference* (Birmingham, AL) (Jan. 2003).
Bullinger, Charles "Fuel Enhancement by Incremental Moisture Reduction," $18^{th}$ *International Low Rank Coal* (Jun. 25, 2003).
Ness, et al. "Pilot Coal Dryer Testing Summary," *TMRA Clean Coal Technology Workshop* (Feb. 5, 2004).
Ness, et al. "Pilot Fluidized Bed Coal Dryer: Operating Experience and Preliminary Results," $29^{th}$ *International Technical Conference on Coal Utilization & Fuel Systems* (Apr. 18-22, 2004).
Levy, et al. *Upgrading Low-Rank Coals Symposium* (May 2, 2004).
Ness, et al. "Pilot Fluidized Bed Coal Dryer: Operating Experience and Preliminary Results," $19^{th}$ *Western Fuels Symposium* (Billings, MT) (Oct. 12-14, 2004).
Sarunac, et al. "Impact of Coal Drying on Power Plant Efficiency, Operation and Emissions," $30^{th}$ *International Technical Conference on Coal Utilization and Fuel Systems* (Clearwater, FL) (Apr. 2005).
Sarunac, et al. "Comparison of Various Coal Drying Process Layouts and Their Impact on Plant Efficiency, Operation and Emissions," $30^{th}$ *International Technical Conference on Coal Utilization and Fuel Systems* (Clearwater, FL) (Apr. 2005).
Levy, et al. "The Impact of Coal Drying on Low Rank Coal Fired Power Plants," *Lexington, KY Conference* (May 2005).
Lehigh University "Performance and Emissions: Key Factors in Today's Competitive Energy Market" *Bethlehem, PA Conference* (May 25-26, 2005).
Merriam, Norman W. "Removal of Mercury from Powder River Basin Coal by Low-Temperature Thermal Treatment," *Report Under DOE CRADA Filed by Western Research Institute* (Jul. 1993).
James, Dennis R. "Lignite Fuel Enhancement: Incremental Reduction Project (Phase I) Revision I," $1^{st}$ *NDIC Grant Application* (Feb. 14, 2000).
Dr. Moen, et al. "Lignite Coal Dryer Project (for Great River Energy, Coal Creek Station)," *Report* (May 12, 2000).
James, Dennis R. "Lignite Fuel Enhancement: Incremental Reduction Project (Phase I)," *Status Report No. 2* (Aug. 10, 2000).
Bullinger, Charlie "Lignite Fuel Enhancement (Maximizing the Value (i.e., Lowest Cost of Electricity Produced and Reduced Emissions) of Lignite Fuel Through Incremental Moisture Reduction," *DOE Project Proposal* (Apr. 19, 2001).
Bullinger, Charlie "Lignite Fuel Enhancement: (Significantly Enhancing the Value of U.S. Lignite Fuel Its Abundant, Low-Cost and Environmentally Responsible)," *DOE Project Proposal* (Apr. 19, 2001).
Scheffknecht, Gunter "Technologies for Efficient Utilization of Low-Rank Fuels," (May 17-18, 2001).
James, Dennis R. "Lignite Fuel Enhancement: Incremental Moisture Reduction," *Final Report for Phase 1* (Dec. 14, 2001).
Weiss H J et al, "Trocknung Von Braunkohle in Der Dampf-Wirbelschicht", VGB Kraftwekstechnik, vol. 71, No. 7, Jul. 1, 1991, pp. 664-668.
Klutz Von H-J et al, "Das WTA-Verfahren als Vortrocknungsstufe fur moderne Kraftwerkskonzepte auf Basis Braunkohle", VGB Kraftwerkstechnik, vol. 76, No. 3, Mar. 1, 1996, pp. 224-229.

\* cited by examiner

Effect of Fuel Moisture on HHV: Lignite and PRB

Fig. 27 Boiler Efficiency: Lignite and PRB

METHOD OF ENHANCING THE QUALITY OF HIGH-MOISTURE MATERIALS USING SYSTEM HEAT SOURCES

CROSS-REFERENCE TO RELATED APPLICATION

This application claims the benefit of U.S. provisional application Ser. No. 60/618,379 filed on Oct. 12, 2004, which is hereby incorporated by reference.

FIELD OF THE INVENTION

This invention relates to the use of existing system sources of waste heat available at a typical industrial process plant to enhance the quality of materials constituting a feedstock or combustion source for that plant. More specifically, the invention utilizes existing plant waste heat sources in a low-temperature, open-air process to dry such materials to improve their thermal content or processibility and reduce plant emissions before the particulate material is processed or combusted at the plant. While this process may be utilized in many varied industries in an efficient and economical manner, it is particularly well suited for use in electric power generation plants for reducing moisture content in coal before it is fired.

BACKGROUND OF THE INVENTION

Electric power is a necessity for human life as we know it. It does everything from operating machinery in factories to pumping water on farms to running computers in offices to providing energy for lights, heating, and cooling in most homes.

Large electric power plants that provide this electric power harness the energy of steam or flowing water to turn the shaft of a turbine to drive, in turn, an electric generator. While some electric power plants are operated by hydroelectric or nuclear energy sources, about 63% of the world's electric power and 70% of the electric power produced in the United States is generated from the burning of fossil fuels like coal, oil, or natural gas. Such fuel is burned in a combustion chamber at the power plant to produce heat used to convert water in a boiler to steam. This steam is then superheated and introduced to huge steam turbines whereupon it pushes against the fanlike blades of the turbine to rotate a shaft. This spinning shaft, in turn, rotates the rotor of an electric generator to produce electricity.

Once the steam has passed through the turbine, it enters a condenser where it passes around pipes carrying cooling water, which absorbs heat from the steam. As the steam cools, it condenses into water which can then be pumped back to the boiler to repeat the process of heating it into steam once again. In many power plants, this water in the condenser pipes that has absorbed this heat from the steam is pumped to a spray pond or cooling tower to be cooled. The cooled water can then be recycled through the condenser or discharged into lakes, rivers, or other water bodies.

Eighty-nine percent of the coal mined in the United States is used as the heat source for electric power plants. Unlike petroleum and natural gas, the available supplies of coal that can be economically extracted from the earth are plentiful.

There are four primary types of coal: anthracite, bituminous, subbituminous, and lignite. While all four types of these coals principally contain carbon, hydrogen, nitrogen, oxygen, and sulfur, as well as moisture, the specific amounts of these solid elements and moisture contained in coal varies widely. For example, the highest ranking anthracite coals contain about 98% wt carbon, while the lowest ranking lignite coals (also called "brown coal") may only contain about 30% wt carbon. At the same time, the amount of moisture may be less than 1% in anthracite and bituminous coals, but 25-30% wt for subbituminous coals like Powder River Basin ("PRB"), and 35-40% wt for North American lignites. For Australia and Russia, these lignite moisture levels may be as high as 50% and 60%, respectively. These high-moisture subbituminous and lignite coals have lower heating values compared with bituminous and anthracite coals because they produce a smaller amount of heat when they are burned. Moreover, high fuel moisture affects all aspects of electric power unit operation including performance and emissions. High fuel moisture results in significantly lower boiler efficiencies and higher unit heat rates than is the case for higher-rank coals. The high moisture content can also lead to problems in areas such as fuel handling, fuel grinding, fan capacity, and high flue gas flow rates.

Bituminous coals therefore have been the most widely used rank of coal for electric power production because of their abundance and relatively high heating values. However, they also contain medium to high levels of sulfur. As a result of increasingly stringent environmental regulations like the Clean Air Act in the U.S., electric power plants have had to install costly scrubber devices upstream of the chimneys of these plants to prevent the sulfur dioxide ("$SO_2$"), nitrous oxides ("$NO_x$"), mercury compounds, and fly ash that result from burning these coals from polluting the air.

Lower-rank coals like subbituminous and lignite coals have gained increasing attention as heat sources for power plants because of their low sulfur content. Burning them as a fuel source can make it easier for power plants to comply with federal and state pollution standards. Also of great relevance is the fact that these subbituminous and lignite coals make up much of the available coal reserves in the western portion of the U.S. However, the higher moisture content of these lower-rank coal types reduces their heat values as a source of heat combustion. Moreover, such higher moisture levels can make such coals more expensive to transport relative to their heat values. They can also cause problems for industry because they break up and become dusty when they lose their moisture, thereby making it difficult to handle and transport them.

While natural gas and fuel oil have almost entirely replaced coal as a domestic heating fuel due to pollution concerns, the rising cost of oil and natural gas has led some factories and commercial buildings to return to coal as a heating source. Because of their higher heating values, bituminous and anthracite coals are generally preferred for these heating applications.

Coal is also the principal ingredient for the production of coke which is used in the manufacture of iron and steel. Bituminous coal is heated to about 2000° F. (1100° C.) in an air-tight oven wherein the lack of oxygen prevents the coal from burning. This high level of heat converts some of the solids into gases, while the remaining hard, foam-like mass of nearly pure carbon is coke. Most coke plants are part of steel mills where the coke is burned with iron ore and limestone to turn the iron ore into pig iron subsequently processed into steel.

Some of the gases produced during carbonization within the coke-making process turn into liquid ammonia and coal tar as they cool. Through further processing, these residual gases can be changed into light oil. Such ammonia, coal tar, and light oil can be used by manufactures to produce drugs, dyes, and fertilizers. The coal tar, itself, can be used for roofing and road surfacing applications.

Some of the gas produced during carbonization in the coke-making process does not become liquid. This "coal gas" burns like natural gas, and can provide heat for the coke making and steel-making processes. The alternative fuels industry has also developed processes for the gasification of coal directly without carbonization. High-energy gas and high-energy liquid fuel substitutes for gasoline and fuel oil result from such gasification processes. Thus, there are many valuable uses for coal besides its intrinsic heat value.

It has previously been recognized within the industry that heating coal reduces its moisture, and therefore enhances the rank and BTU production of the coal by drying the coal. Prior to its combustion in hot water boilers, drying of the coal can enhance the resulting efficiency of the boiler.

A wide variety of dryer devices have been used within the prior art to dry coal, including rotary kilns (U.S. Pat. No. 5,103,743 issued to Berg), cascaded whirling bed dryers (U.S. Pat. No. 4,470,878 issued to Petrovic et al.), elongated slot dryers (U.S. Pat. No. 4,617,744 issued to Siddoway et al.), hopper dryers (U.S. Pat. No. 5,033,208 issued to Ohno et al.), traveling bed dryers (U.S. Pat. No. 4,606,793 issued to Petrovic et al.), and vibrating fluidized bed dryers (U.S. Pat. No. 4,444,129 issued to Ladt). Also well-known within the industry are fluidized-bed dryers or reactors in which a fluidizing medium is introduced through holes in the bottom of the bed to separate and levitate the coal particles for improved drying performance. The fluidizing medium may double as a direct heating medium, or else a separate indirect heat source may be located within the fluidized bed reactor. See, e.g., U.S. Pat. Nos. 5,537,941 issued to Goldich; 5,546,875 issued to Selle et al.; 5,832,848 issued to Reynoldson et al.; 5,830,246, 5,830,247, and 5,858,035 issued to Dunlop; 5,637,336 issued to Kannenberg et al.; 5,471,955 issued to Dietz; 4,300,291 issued to Heard et al.; and 3,687,431 issued to Parks.

Many of these conventional drying processes, however, have employed very high temperatures and pressures. For example, the Bureau of Mines process is performed at 1500 psig, while the drying process disclosed in U.S. Pat. No. 4,052,168 issued to Koppelman requires pressures of 1000-3000 psi. Similarly, U.S. Pat. No. 2,671,968 issued to Criner teaches the use of updrafted air at 1000° F. Likewise, U.S. Pat. No. 5,145,489 issued to Dunlop discloses a process for simultaneously improving the fuel properties of coal and oil, wherein a reactor maintained at 850-1050° F. is employed. See also U.S. Pat. No. 3,434,932 issued to Mansfield (1400-1600° F.); and U.S. Pat. No. 4,571,174 issued to Shelton (≤1000° F.).

The use of such very high temperatures for drying or otherwise treating the coal requires enormous energy consumption and other capital and operating costs that can very quickly render the use of lower-ranked coals economically unfeasible. Moreover, higher temperatures for the drying process create another emission stream that needs to be managed. Further complicating this economic equation is the fact that prior art coal drying processes have often relied upon the combustion of fossil fuels like coal, oil, or natural gas to provide the very heat source for improving the heat value of the coal to be dried. See, e.g., U.S. Pat. No. 4,533,438 issued to Michael et al.; U.S. Pat. No. 4,145,489 issued to Dunlop; U.S. Pat. No. 4,324,544 issued to Blake; U.S. Pat. No. 4,192,650 issued to Seitzer; U.S. Pat. No. 4,444,129 issued to Ladt; and U.S. Pat. No. 5,103,743 issued to Berg. In some instances, this combusted fuel source may constitute coal fines separated and recycled within the coal drying process. See, e.g., U.S. Pat. No. 5,322,530 issued to Merriam et al; U.S. Pat. No. 4,280,418 issued to Erhard; and U.S. Pat. No. 4,240,877 issued to Stahlherm et al.

Efforts have therefore been made to develop processes for drying coal using lower temperature requirements. For example, U.S. Pat. No. 3,985,516 issued to Johnson teaches a drying process for low-rank coal using warm inert gas in a fluidized bed within the 400-500° F. range as a drying medium. U.S. Pat. No. 4,810,258 issued to Greene discloses the use of a superheated gaseous drying medium to heat the coal to 300-450° F., although its preferred temperature and pressure is 850° F. and 0.541 psi. See also U.S. Pat. Nos. 4,436,589 and 4,431,585 issued to Petrovic et al. (392° F.); U.S. Pat. No. 4,338,160 issued to Dellessard et al. (482-1202° F.); U.S. Pat. No. 4,495,710 issued to Ottoson (400-900° F.); U.S. Pat. No. 5,527,365 issued to Coleman et al. (302-572° F.); U.S. Pat. No. 5,547,549 issued to Fracas (500-600° F.); U.S. Pat. No. 5,858,035 issued to Dunlop; and U.S. Pat. Nos. 5,904,741 and 6,162,265 issued to Dunlop et al. (480-600° F.).

Several prior art coal drying processes have used still lower temperatures—albeit, only to dry the coal to a limited extent. For example, U.S. Pat. No. 5,830,247 issued to Dunlop discloses a process for preparing irreversibly dried coal using a first fluidized bed reactor with a fluidized bed density of 20-40 lbs/ft$^3$, wherein coal with a moisture content of 15-30% wt, an oxygen content of 10-20%, and a 0-2-inch particle size is subjected to 150-200° F. for 1-5 minutes to simultaneously comminute and dewater the coal. The coal is then fed to a second fluidized bed reactor in which it is coated with mineral oil and then subjected to a 480-600° F. temperature for 1-5 minutes to further comminute and dehydrate the product. Thus, it is apparent that not only is this process applied to coals having relatively lower moisture contents (i.e., 15-30%), but also the coal particles are only partially dewatered in the first fluidized bed reactor operated at 150-200° F., and the real drying takes place in the second fluidized bed reactor that is operated at the higher 480-600° F. bed temperature.

Likewise, U.S. Pat. No. 6,447,559 issued to Hunt teaches a process for treating coal in an inert atmosphere to increase its rank by heating it initially at 200-250° F. to remove its surface moisture, followed by sequentially progressive heating steps conducted at 400-750° F., 900-1100° F., 1300-1550° F., and 2000-2400° F. to eliminate the water within the pores of the coal particles to produce coal with a moisture content and volatiles content of less than 2% and 15%, respectively, by weight. Again, it is clear that the initial 200-250° F. heating step provides only a limited degree of drying to the coal particles.

One of the problems that can be encountered with the use of fluidized bed reactors to dry coal is the production of large quantities of fines entrapped in the fluidizing medium. Especially at higher bed operating conditions, these fines can spontaneously combust to cause explosions. Therefore, many prior art coal drying processes have resorted to the use of inert fluidizing gases within an air-free fluidized bed environment to prevent combustion. Examples of such inert gas include nitrogen, carbon dioxide, and steam. See, e.g., U.S. Pat. No. 3,090,131 issued to Waterman, Jr.; U.S. Pat. No. 4,431,485 issued to Petrovic et al.; U.S. Pat. Nos. 4,300,291 and 4,236,318 issued to Heard et al.; U.S. Pat. No. 4,292,742 issued to Ekberg; U.S. Pat. No. 4,176,011 issued to Knappstein; U.S. Pat. No. 5,087,269 issued to Cha et al.; U.S. Pat. No. 4,468,288 issued to Galow et al.; U.S. Pat. No. 5,327,717 issued to Hauk; U.S. Pat. No. 6,447,559 issued to Hunt; and U.S. Pat. No. 5,904,741 issued to Dunlop et al. U.S. Pat. No. 5,527,365 issued to Coleman et al. provides a process for drying low-quality carbonaceous fuels like coal in a "mildly reducing environment" achieved through the use of lower alkane inert gases like propane or methane. Still other prior art processes employ a number of heated fluidizing streams maintained at progressively decreasing temperatures as the coal travels through the length of the fluidized bed reactor to ensure adequate cooling of the coal in order to avoid explosions. See, e.g., U.S. Pat. Nos. 4,571,174 issued to Shelton; and 4,493,157 issued to Wicker.

Still another problem previously encountered by the industry when drying coal is its natural tendency to reabsorb water moisture in ambient air conditions over time after the drying process is completed. Therefore, efforts have been made to coat the surface of the dried coal particles with mineral oil or some other hydrocarbon product to form a barrier against adsorption of moisture within the pores of the coal particles. See, e.g., U.S. Pat. Nos. 5,830,246 and 5,858,035 issued to Dunlop; U.S. Pat. No. 3,985,516 issued to Johnson; and U.S. Pat. Nos. 4,705,533 and 4,800,015 issued to Simmons.

In order to enhance the process economics of drying low-rank coals, it is known to use waste heat streams as supplemental heat sources to the primary combustion fuel heat source. See U.S. Pat. No. 5,322,530 issued to Merriam et al. This is particularly true within coking coal production wherein the cooling gas heated by the hot coke may be recycled for purposes of heating the drying gas in a heat exchanger. See, e.g., U.S. Pat. No. 4,053,364 issued to Poersch; U.S. Pat. No. 4,308,102 issued to Wagener et al.; U.S. Pat. No. 4,338,160 issued to Dellessard et al.; U.S. Pat. No. 4,354,903 issued to Weber et al.; U.S. Pat. No. 3,800,427 issued to Kemmetmueller; U.S. Pat. No. 4,533,438 issued to Michael et al.; and U.S. Pat. Nos. 4,606,793 and 4,431,485 issued to Petrovic et al. Likewise, flue gases from fluidized bed combustion furnaces have been used as a supplemental heat source for a heat exchanger contained inside the fluidized bed reactor for drying the coal. See, e.g., U.S. Pat. Nos. 5,537,941 issued to Goldich; and 5,327,717 issued to Hauk. 5,103,743 issued to Berg discloses a method for drying solids like wet coal in a rotary kiln wherein the dried material is gasified to produce hot gases that are then used as the combustion heat source for radiant heaters used to dry the material within the kiln. In U.S. Pat. No. 4,284,476 issued to Wagener et al., stack gas from an associated metallurgical installation is passed through hot coke in a coke production process to cool it, thereby heating the stack gas which is then used to preheat the moist coal feed prior to its conversion into coke.

None of these prior art processes, however, appear to employ a waste heat stream in a coal drying operation as the sole source of heat used to dry the coal. Instead, they merely supplement the primary heat source which remains combustion of a fossil fuel like coal, oil or natural gas. Thus, the process economics for drying the coal products, including low-rank coals, continues to be limited by the need to burn fossil fuels in order to dry a fossil fuel (i.e., coal) to improve its heat value for firing a boiler in a process plant (e.g., an electric power plant).

The concerted use of waste heat sources available within electric power plant that would otherwise be lost as the exclusive heat source for drying the coal prior to its introduction to the boiler furnace to improve the process economics of using low-rank coals like subbituminous and lignite coal would be desirable. Such low-rank coal sources could suddenly become viable fuel sources for power plants compared with the more traditionally used bituminous and anthracite coals. The economical use of lower-sulfur subbituminous and lignite coals, in addition to removal of undesirable elements found within the coal that causes pollution, would also be greatly beneficial to the environment.

SUMMARY OF THE INVENTION

A method for enhancing the quality characteristics of materials used as an essential component in an industrial plant operation through the use of waste heat sources available in that plant operation is provided according to the invention. Such materials can include fuel sources combusted within the industrial plant operation, or raw materials used to make the finished products resulting from the plant operation. Such waste heat sources include, but are not limited to, hot flue or stack gases from furnaces, hot condenser cooling water, process steam from turbines, and other process streams with elevated heat values. The present invention relates in particular to the process for identifying and exploiting the various available waste heat sources, alone or in combination, to provide heat of appropriate magnitude and temperature level that is needed to enhance the quality or characteristic of the material.

Although the invention has application to many varied industries, for illustrative purposes, the invention is described herein with respect to a typical coal-burning electric power generating plant, where removal of some of the moisture from the coal in a dryer is desirable for improving the heat value of the coal and the resulting boiler efficiency of the plant. Drying coal in this manner can enhance or even enable the use of low-rank coals like subbituminous and lignite coals. By reducing the moisture content of the coal, regardless of whether it constitutes low-rank or high-rank coal, other enhanced operating efficiencies may be realized, as well. For example, drier coal will reduce the burden on the coal handling system, conveyers and coal crushers in the electric generating plant. Since drier coal is easier to convey, this reduces maintenance costs and increases availability of the coal handling system. Drier coal is also easier to pulverize, so less "mill" power is needed to achieve the same grind size (coal fineness). With less fuel moisture, moisture content leaving the mill is reduced. This will improve the results of grinding of the coal. Additionally, less primary air used to convey, fluidize, and heat the coal is needed. Such lower levels of primary air reduces air velocities and with lower primary air velocities, there is a significant reduction of erosion in coal mills, coal transfer pipes, coal burners, and associated equipment. This has the effect of reducing coal transfer pipe and mill maintenance costs, which are, for lignite-fired plants, very high. Reductions in stack emissions should also be realized, thereby improving collection efficiency of downstream environmental protection equipment.

Such coal fuel stock need not be dried to absolute zero moisture levels in order to fire the power plant boilers on an economically viable basis. Instead, by using such available waste heat sources to dry the coal to a sufficient level, the boiler efficiency can be markedly increased, while maintaining the processing costs at an economically viable level. This provides true economic advantage to the plant operator. Reduction of the moisture content of lignite coals from a typical 39-60% level to 10% or lower is possible, although 27-32% is preferable. This preferred level is dictated by the boiler's ability to transfer heat.

The present invention preferably utilizes multiple plant waste heat sources in various combinations to dry the material without adverse consequences to plant operations. In a typical power plant, waste process heat remains available from many sources for further use. One possible source is a steam turbine. Steam may be extracted from the steam turbine cycle to dry coal. For many existing turbines, this could reduce power output and have an adverse impact on performance of turbine stages downstream from the extraction point, making this source for heat extraction of limited desirability. For newly built power plants, however, steam turbines are designed for steam extraction without having a negative effect on stage efficiency, thereby enabling such steam extraction to be a part of the waste heat source used for coal drying for new plants.

Another possible source of waste heat for drying coal is the thermal energy contained within flue gas leaving the plant. Using the waste heat contained in flue gas to remove coal moisture may decrease stack temperature, which in turn reduces buoyancy in the stack and could result in condensation of water vapor and sulfuric acid on stack walls. This limits the amount of heat that could be harvested from flue gas for coal drying, especially for units equipped with wet scrubbers, which may thereby dictate that hot flue gas is not the sole waste heat source used in many end-use applications under this invention.

In a Rankine power cycle, heat is rejected from the cycle in the steam condenser and/or cooling tower. Heat rejected in a steam condenser typically used in utility plants represents a large source of waste heat, the use of which for a secondary purpose minimally impacts plant operation. A portion of this hot condenser cooling water leaving the condenser could therefore be diverted and used instead for coal drying. Engineering analyses show that, at full unit load, only 2 percent of the heat rejected in the condenser is needed to decrease coal moisture content by 4 percent points. Utilization of this heat source, solely or in combination with other available plant waste heat sources, provides optimal use of plant waste heat sources without adverse impact on plant operations.

While this invention focuses upon the use of available waste heat sources to enable the moisture reduction or other processing step, it should be appreciated that a primary heat source like combustion heat may be added to the system for utilizing waste heat sources to achieve the desired result on an economic basis. Typically, this will be a small amount of primary heat relative to the waste heat sources used.

The present invention utilizes fixed bed driers and fluidized bed driers, both single and multiple-stage, to pre-dry and further clean the material before it is consumed within the industrial plant operation, although other commercially known types of dryers may be employed. Moreover, this drying process takes place in a low-temperature, open-air system, thereby further reducing the operating costs for the industrial plant. The drying temperature will preferably be kept below 300° F., more preferably between 200-300° F.

With the present invention, a portion of the hot condenser cooling water leaving the condenser could be diverted and used for preheating the inlet air directed to the APH.

The present invention also provides a system for removing fly ash, sulfur, mercury-bearing material, and other harmful pollutants from the coal using the material segregation and sorting capabilities of fluidized beds, in contrast to current prior art systems that attempt to remove the pollutants and other contaminates after the coal has been burned. Removal of such pollutants and other contaminants before the coal is burned eliminates potential harm that may be caused to the environment by the contaminants in the plant processes, with the expected benefits of lower emissions, coal input levels, auxiliary power needs to operate the plant, plant water usage, equipment maintenance costs caused by metal erosion and other factors, and capital costs arising from equipment needed to extract these contaminants from the flue gas.

DETAILED DESCRIPTION OF THE PREFERRED EMBODIMENT

Figure 1:
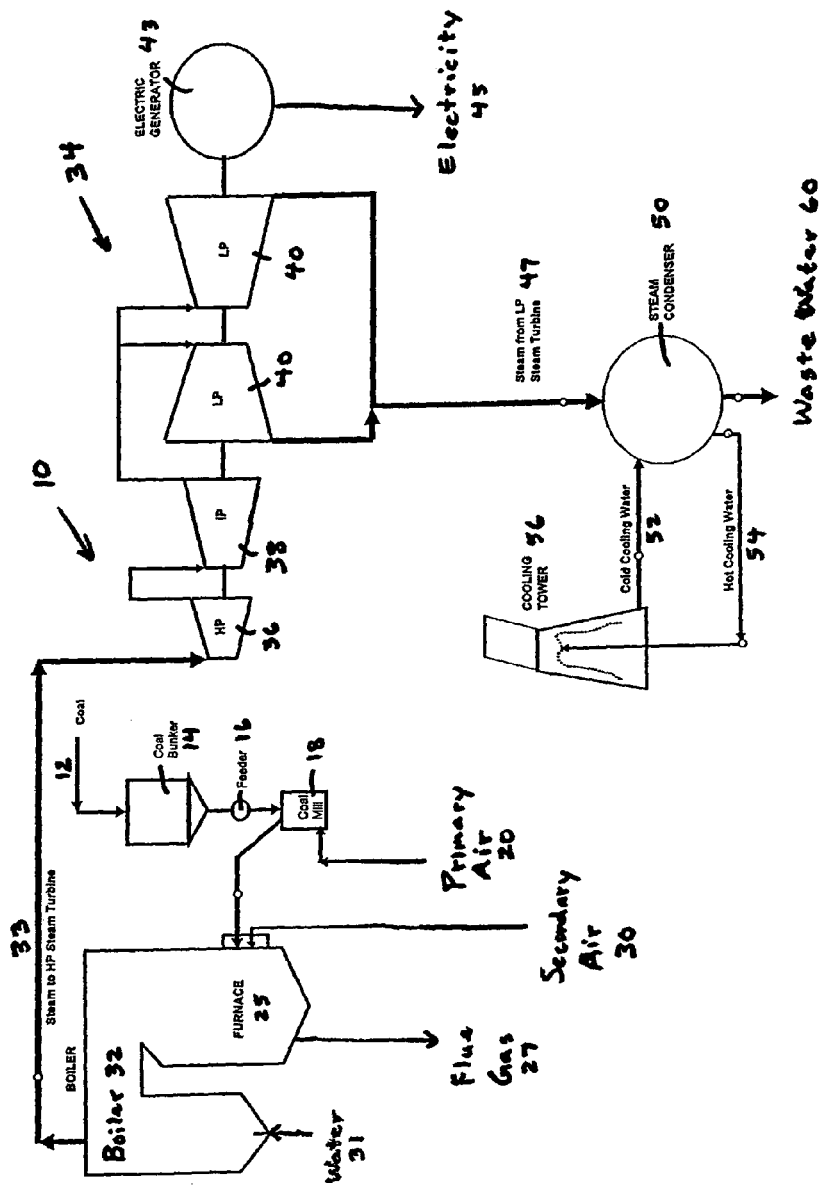
FIG. 1 is a schematic diagram illustrating a simplified coal-fired power plant operation for producing electricity.

A method for enhancing the quality characteristics of materials used as an essential component in an industrial plant operation through the use of one or more waste heat sources available in the plant operation is provided by the invention. Such invention allows for the drying of the material on a more economic basis, thereby enabling the use of lower-ranked (e.g., higher moisture) material that might not otherwise be viable within the industrial plant operation. The invention may also enable reductions in pollutants and other undesirable elements contained within the material before it is processed within the industrial plant operation.

For purposes of the present invention, "particulate material" means any granular or particle compound, substance, element, or ingredient that constitutes an integral input to an industrial plant operation, including but not limited to combustion fuels like coal, biomass, bark, peat, and forestry waste matter; bauxite and other ores; and substrates to be modified or transformed within the industrial plant operation like grains, cereals, malt, cocoa.

In the context of the present invention, "industrial plant operation" means any combustion, consumption, transformation, modification, or improvement of a substance to provide a beneficial result or end product. Such operation can include but is not limited to electric power plants, coking operations, iron, steel, or aluminum manufacturing facilities, cement manufacturing operations, glass manufacturing plants, ethanol production plants, drying operations for grains and other agricultural materials, food processing facilities, and heating operations for factories and buildings. Industrial plant operations encompass other manufacturing operations incorporating heat treatment of a product or system, including but not limited to green houses, district heating, and regeneration processes for amines or other extractants used in carbon dioxide or organic acid sequestration.

As used in this application, "coal" means anthracite, bituminous, subbituminous, and lignite or "brown" coals, and peat. Powder River Basin coal is specifically included.

For purposes of the present invention, "quality characteristic" means a distinguishing attribute of the particulate material that impacts its combustion, consumption, transformation, modification, or improvement within the industrial plant operation, including but not limited to moisture content, carbon content, sulfur content, mercury content, fly ash content, and production of $SO_2$ and $NO_x$, carbon dioxide, mercury oxide when burned.

As used in this application, "heat treatment apparatus" means any apparatus that is useful for the application of heat to a product, including but not limited to furnaces, dryers, cookers, ovens, incubators, growth chambers, and heaters.

In the context of the present invention, "dryer" means any apparatus that is useful for the reduction of the moisture content of a particulate material through the application of direct or indirect heat, including but not limited to a fluidized bed dryer, vibratory fluidized bed dryer, fixed bed dryer, traveling bed dryer, cascaded whirling bed dryer, elongated slot dryer, hopper dryer, or kiln. Such dryers may also consist of single or multiple vessels, single or multiple stages, be stacked or unstacked, and contain internal or external heat exchangers.

For purposes of this application "principal heat source" means a quantity of heat produced directly for the principal purpose of performing work in a piece of equipment, such as a boiler, turbine, oven, furnace, dryer, heat exchanger, reactor, or distillation column. Examples of such a principal heat source include but are not limited to combustion heat and process steam directly exiting a boiler.

As used in this application, "waste heat source" means any residual gaseous or liquid by-product stream having an elevated heat content resulting from work already performed by a principal heat source within a piece of equipment within an industrial plant operation that is used for the secondary purpose of performing work in a piece of equipment instead of being discarded. Examples of such waste heat sources include but are not limited to cooling water streams, hot condenser cooling water, hot flue or stack gas, spent process steam from, e.g., a turbine, or discarded heat from operating equipment like a compressor, reactor, or distillation column.

Coal fired in the boiler furnace of an electric power plant shall be used as exemplary particulate material and industrial plant operation for purposes of this application, but it is important to appreciate that any other material that constitutes a useful, necessary, or beneficial input to an industrial plant operation is covered by this application, as well.

FIG. 1 shows a simplified coal-fired electric power plant 10 for the generation of electricity. Raw coal 12 is collected in a coal bunker 14 until needed. It is then fed by means of feeder 16 to coal mill 18 in which it is pulverized to an appropriate particle size as is known in the art with the assistance of primary air stream 20.

The pulverized coal particles are then fed to furnace 25 in which they are combusted in conjunction with secondary air stream 30 to produce heat. Flue gas 27 is also produced by the combustion reaction, and is vented to the atmosphere.

This heat source, in turn, converts water 31 in boiler 32 into steam 33, which is delivered to steam turbine 34. Steam turbine 34 may consist more fully of high pressure steam turbine 36, intermediate pressure steam turbine 38, and low pressure steam turbines 40 operatively connected in series. Steam 33 performs work by pushing against the fanlike blades connected to a series of wheels contained within each turbine unit which are mounted on a shaft. As the steam pushes against the blades, it causes both the wheels and turbine shaft to spin. This spinning shaft turns the rotor of electric generator 43, thereby producing electricity 45.

Steam 47 leaving the low-pressure steam turbines 40 is delivered to condenser 50 in which it is cooled by means of cooling water 52 to convert the steam into water. Most steam condensers are water-cooled, where either an open or closed-cooling circuit is used. In the closed-loop arrangement show in FIG. 1, the latent heat contained within the steam 47 will increase the temperature of cold cooling water 52, so that it is discharged from steam condenser 50 as hot cooling water 54, which is subsequently cooled in cooling tower 56 for recycle as cold cooling water 52 in a closed-loop arrangement. In an open-cooling circuit, on the other hand, the heat carried by cooling water is rejected into a cooling body of water (e.g., a river or a lake), as is the case for FIG. 15-16. In a closed-cooling circuit, by contrast, the heat carried by cooling water is rejected into a cooling tower.

Figure 2:
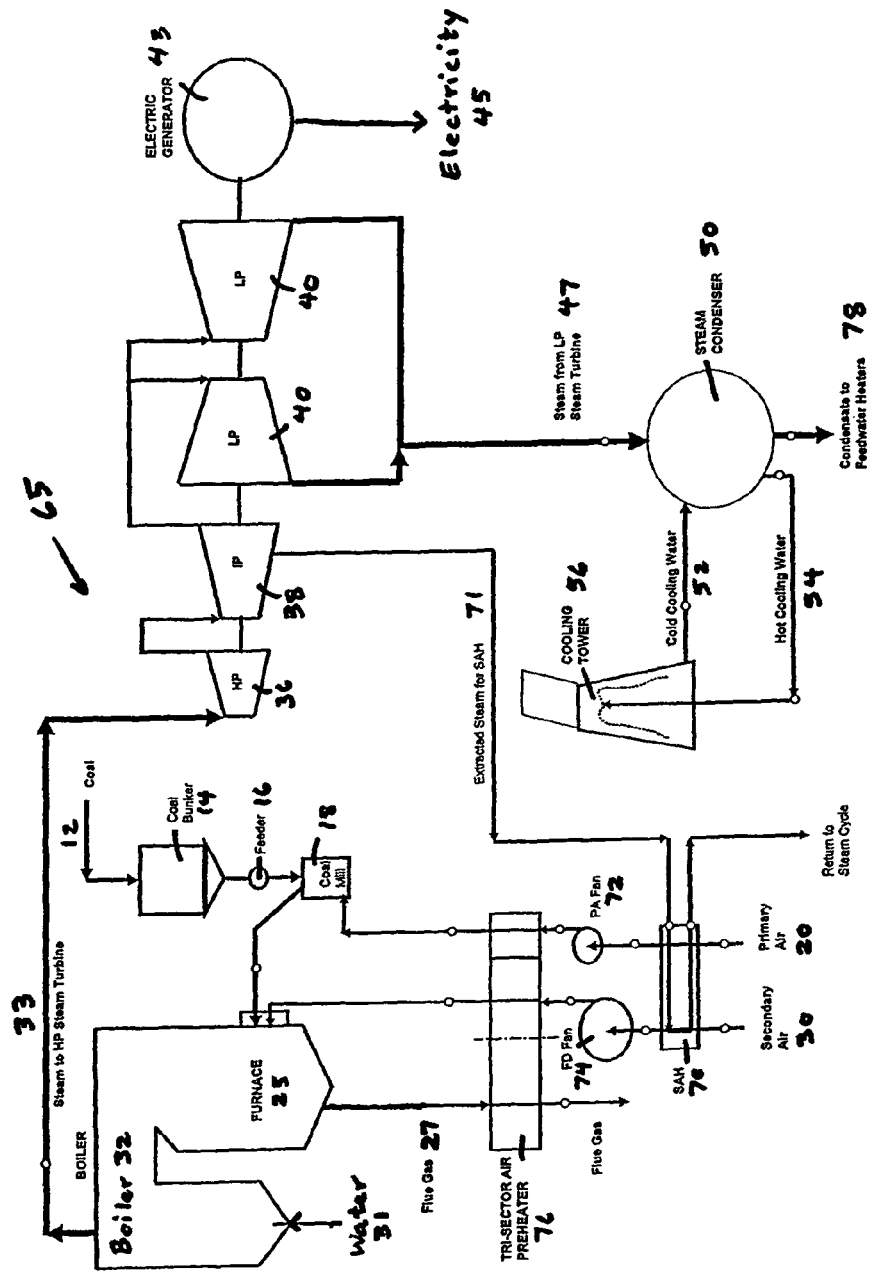
FIG. 2 is a schematic diagram showing an improved coal-fired power plant, which utilizes the flue gas and steam turbine waste heat streams to enhance the boiler efficiency.

The operational efficiency of the electric power plant 10 of FIG. 1 may be enhanced by extracting and utilizing some of the waste heat and byproduct streams of the electricity power plant, as illustrated in FIG. 2. Fossil-fired plant boilers are typically equipped with air pre-heaters ("APH") utilized to heat primary and secondary air streams used in the coal milling and burning process. Burned coal is used in a boiler system (furnace, burner and boiler arrangement) to convert water to steam, which is then used to operate steam turbines that are operatively connected to electrical generators. Heat exchangers, often termed steam-to-air pre-heaters ("SAH"), use steam extracted from the steam turbine to preheat these primary and secondary air streams upstream of the air pre-heater. Steam extraction from the turbine results in a reduced turbine (and plant) output and decreases the cycle and unit heat rate.

A typical APH could be of a regenerative (Ljungstrom or Rothemule) or a tubular design. The SAHs are used to maintain elevated temperature of air at an APH inlet and protect a cold end of the APH from corrosion caused by the deposition of sulfuric acid on APH heat transfer surfaces, and from plugging which results in an increase in flow resistance and fan power requirements. A higher APH inlet air temperature results in a higher APH gas outlet temperature and higher temperature of APH heat transfer surfaces (heat transfer passages in the regenerative APH, or tubes in a tubular APH) in the cold end of the APH. Higher temperatures reduce the acid deposition zone within the APH and also reduce the acid deposition rate.

Thus, within the modified system 65, SAH 70 uses a portion 71 of the process steam extracted from intermediate-pressure steam turbine 38 to preheat primary air stream 20 and secondary air stream 30 before they are delivered to coal mill 18 and furnace 25, respectively. The maximum temperature of primary air stream 20 and secondary air stream 28 which can be achieved in SAH 70 is limited by the temperature of extracted steam 71 exiting steam turbine 38 and the thermal resistance of SAH 70. Moreover, primary air stream 20 and secondary air stream 30 are fed by means of PA fan 72 and FD fan 74, respectively, to tri-sector APH 76, wherein these air streams are further heated by means of flue gas stream 27 before it is discharged to the atmosphere. In this manner, primary air stream 20 and secondary air stream 30 with their elevated temperatures enhance the efficiency of the operation of coal mill 18 and production of process heat in furnace 25. Furthermore, the water stream 78 discharged by condenser 50 may be recycled to boiler 32 to be converted into process steam once again. Flue gas 27 and process steam 71 exiting steam turbine 38 and the water 78 exiting the condenser which might otherwise go to waste have been successfully used to enhance the overall efficiency of the electric power generating plant 65.

As discussed above, it would further benefit the operational efficiency of the electric generating plant if the moisture level of coal 12 could be reduced prior to its delivery to furnace 25. Such a preliminary drying process could also enable the use of lower-rank coals like subbituminous and lignite coals on an economic basis.

Figure 3:
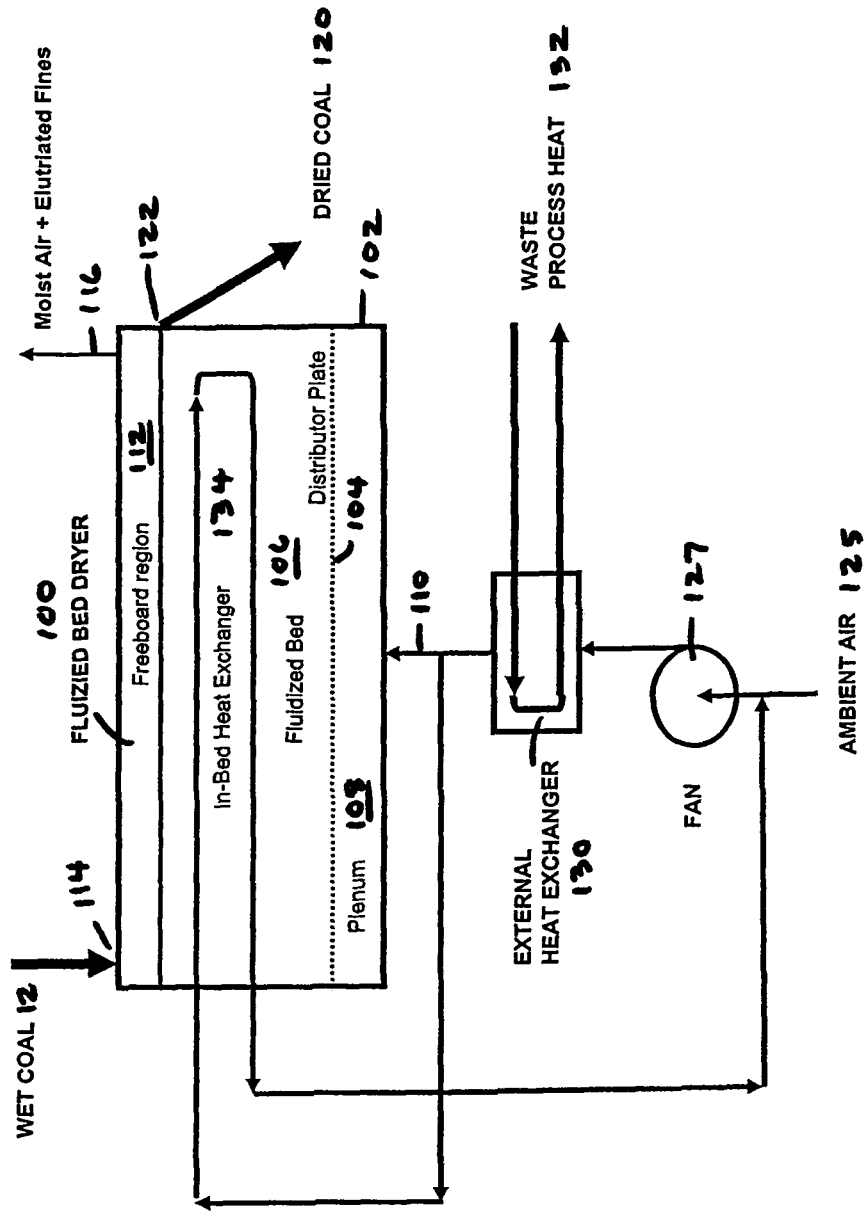
FIG. 3 is a schematic diagram of a single-stage fluidized bed dryer of the present invention that utilizes waste process heat to indirectly heat the fluidizing air used both to dry and fluidize the coal.

FIG. 3 shows a fluidized bed dryer 100 used for purposes of reducing the moisture content of coal 12, although it should be understood that any other type of dryer may be used within the context of this invention. Moreover, the entire coal drying system may consist of multiple coal dryers connected in series or parallel to remove moisture from the coal. A multi-dryer approach, involving a number of identical coal drying units, provides operating and maintenance flexibility and, because of its generally smaller size requirements, allows coal dryers to be installed and integrated within existing power plant equipment, as well as in stages, one at a time. This will minimize interference with normal plant operations.

The fluidized bed(s) will operate in open air at relatively low-temperature ranges. An in-bed heat exchanger will be used in conjunction with a stationary fluidized-bed or fixed-bed design to provide additional heat for coal drying and, thus, reduce the necessary equipment size. With a sufficient in-bed heat transfer surface in a fluidized bed dryer, the fluidizing/drying air stream can be reduced to values corresponding to the minimum fluidization velocity. This will reduce erosion damage to and elutriation rate for the dryer.

Heat for the in-bed heat exchanger can be supplied either directly or indirectly. A direct heat supply involves diverting a portion of hot fluidizing air stream, hot condenser cooling water, process steam, hot flue gas, or other waste heat sources and passing it through the in-bed heat exchanger. An indirect heat supply involves use of water or other heat transfer liquid, which is heated by hot primary air stream, hot condenser cooling water; steam extracted from steam turbine cycle, hot flue gas, or other waste heat sources in an external heat exchanger before it is passed through the in-bed heat exchanger.

Figure 7:
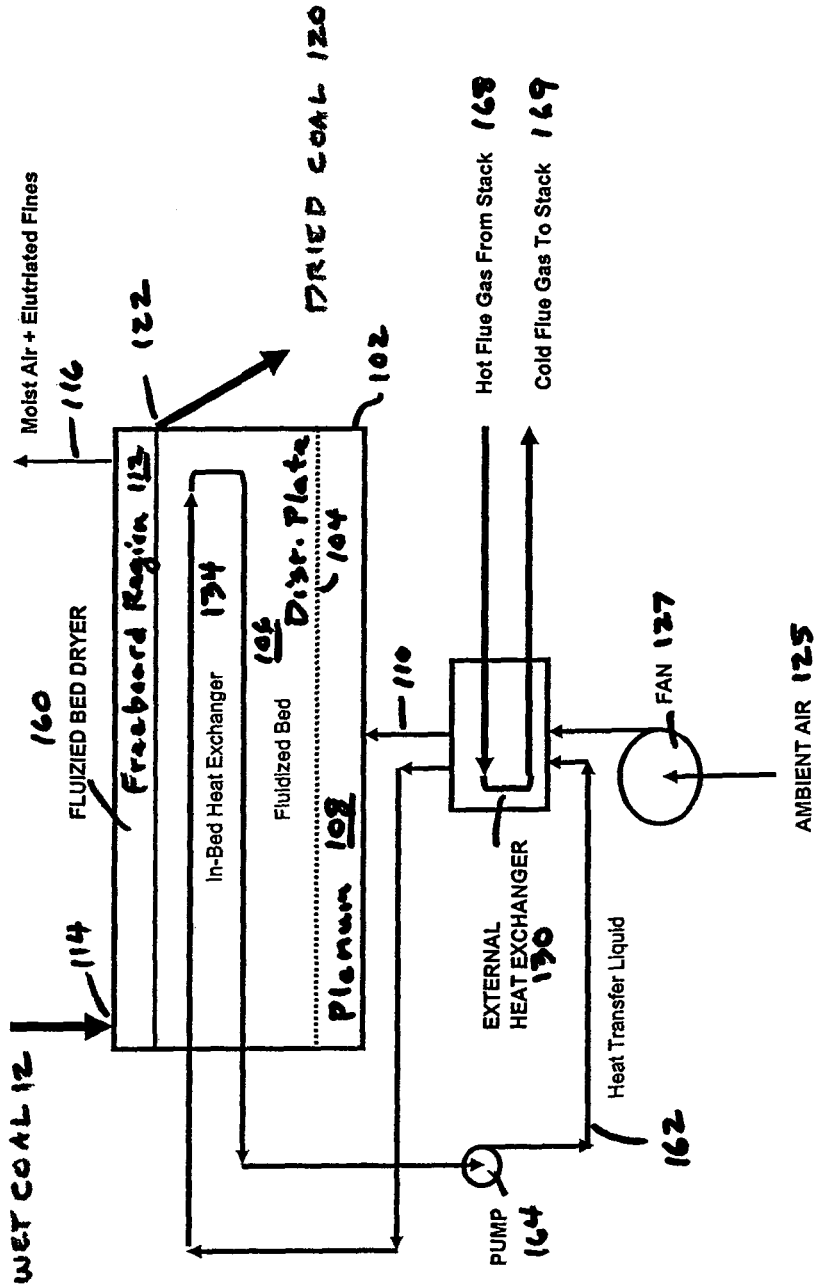
FIG. 7 is a schematic diagram of a single-stage fluidized bed dryer of the present invention that utilizes hot flue gas from a plant furnace stack to both heat the fluidizing air used to fluidize the coal (indirect heat), and to heat the transfer liquid circulated through an in-bed heat exchanger contained inside the fluidized bed dryer to dry the coal (indirect heat).
Figure 8:
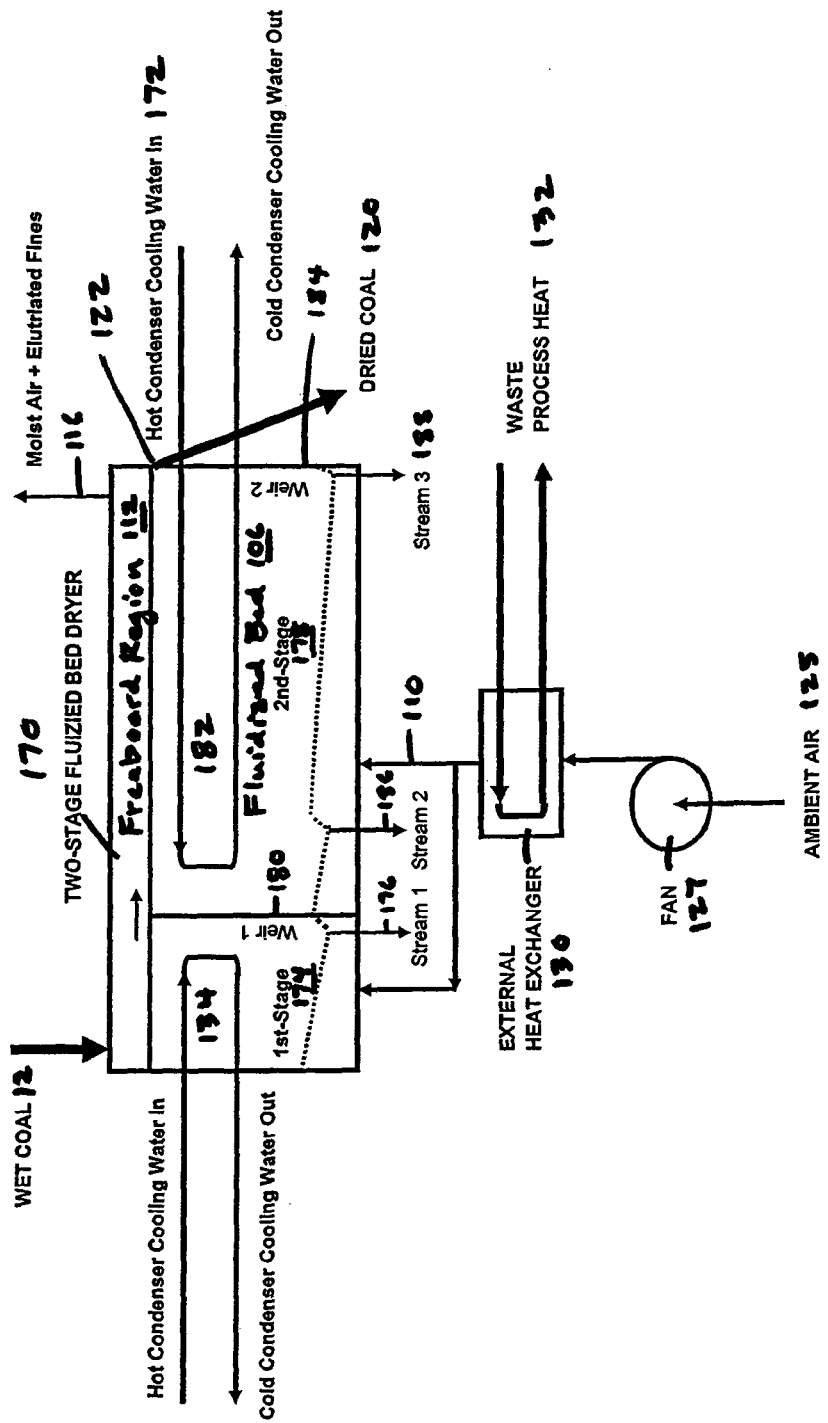
FIG. 8 is a schematic diagram of a two-stage fluidized bed dryer of the present invention that utilizes waste process heat from the plant operations to heat the fluidizing air used to fluidize the coal in both chambers of the fluidized bed dryer (indirect), and hot condenser cooling water circulated through in-bed heat exchangers contained inside both chambers of the fluidized bed dryer to dry the coal (direct heat).

The bed volume can be unitary (see FIGS. 3-7) or divided into several sections, referred to herein as "stages" (see FIG. 8). A fluidized-bed dryer is a good choice for drying wet sized coal to be burned at the same site where the coal is to be combusted. The multiple stages could be contained in a single vessel (see FIGS. 8-10) or multiple vessels. A multi-stage design allows maximum utilization of fluidized-bed mixing, segregation, and drying characteristics. The coal dryer may include a direct or indirect heat source for drying the coal.

FIG. 3 discloses an embodiment of a coal drying bed that is a single-stage, single-vessel, fluidized-bed dryer 100 with a direct heat supply. While there are many different possible structural arrangements for the fluidized-bed dryer 100, common functional elements include a vessel 102 for supporting coal for fluidization and transport. This vessel 102 may be a trough, closed container, or other suitable arrangement. The vessel 102 includes a distributor plate 104 that forms a floor towards the bottom of vessel 102, and divides the vessel 102 into a fluidized bed region 106 and a plenum region 108. The distributor plate 104 may be perforated or constructed with suitable valve means to permit fluidizing air 110 to enter the plenum region 108 of vessel 102. The fluidizing air 110 is distributed throughout the plenum region 108 and forced through the openings or valves in the distributor plate 104 at high pressure to fluidize the coal 12 lying within the fluidized bed region 106.

An upper portion of the vessel defines a freeboard region 112. Wet sized coal 12 enters the fluidized bed region 106 of fluidized-bed dryer 100 at entry point 114 as shown in FIG. 3. When the wet sized coal 12 is fluidized by fluidizing air 110, the coal moisture and elutriated coal fines 116 are propelled through the freeboard region 112 of vessel 102 and exit the vessel typically at the top of the fluidized-bed dryer 100, as shown. Dried coal 120 exits the vessel 102 at discharge point 122. The structure and location of the coal inlet and outlet points, the elutriated fines outlet, the distributor plate 104, and configuration of the vessel 102 may be modified as desired for best results.

Meanwhile, ambient air 125 is drawn by a fan 127 through an external heat exchanger 130 heated by waste process heat 132. A portion of the fluidizing air 110, heated by circulation through external heat exchanger 130, is directed into the fluidized bed region 106 for fluidizing the wet sized coal 12. A direct heat supply is created by diverting the remainder of the fluidizing hot air 110 (heated by the waste process heat 132) through in-bed heat exchanger 134, which extends throughout the fluidized bed 106, to heat the fluidized coal to drive out moisture. The fluidizing air 110 exiting the in-bed heat exchanger 134 is recycled back to the fan 127 to once again be circulated through and heated by the external heat exchanger 130. Some loss of fluidizing air 110 results when fluidizing air directly enters the fluidized bed region 106 through plenum 108. This lost air is replaced by drawing further ambient air 125 into the circulation cycle.

Figure 4:
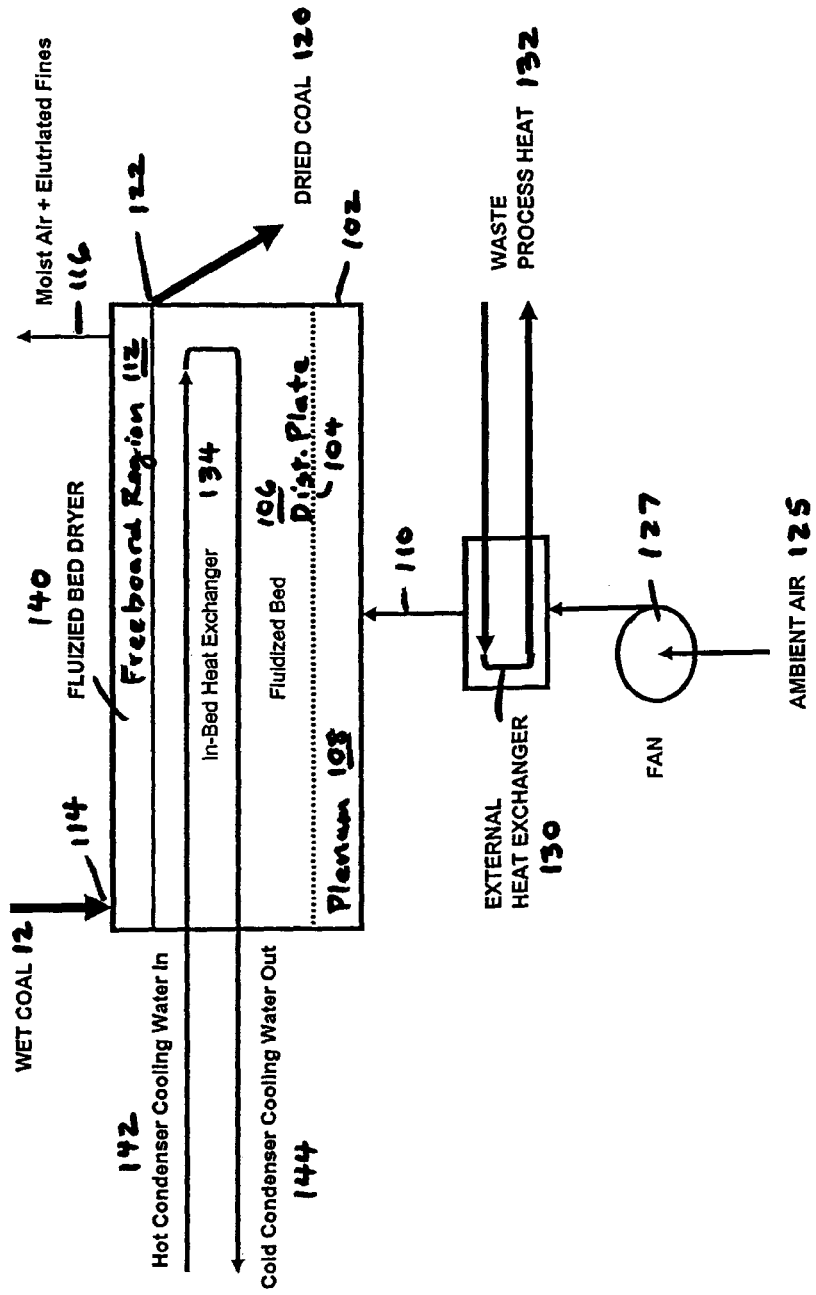
FIG. 4 is a schematic diagram of a single-stage fluidized bed dryer of the present invention that utilizes a combination of waste process heat to heat the fluidizing air used to fluidize the coal (indirect heat), and hot condenser cooling water circulated through an in-bed heat exchanger contained inside the fluidized bed dryer to dry the coal (direct heat).

FIG. 4 illustrates another embodiment of a single-stage, single-vessel, fluidized bed dryer 140 that is similar to the one shown in FIG. 3, except that the waste process heat 132 is not used to heat both the external heat exchanger 130 and the in-bed heat exchanger 134. Instead, a portion of the hot condenser cooling water 142 from elsewhere in the electricity generation plant operation is diverted to in-bed heat exchanger 134 to provide the necessary heat source. Thus, in the fluidized dryer embodiment 140 of FIG. 4, two separate waste heat sources (i.e., waste process heat and hot condenser cooling water) are employed to enhance the operational efficiency of the coal drying process.

Figure 5:
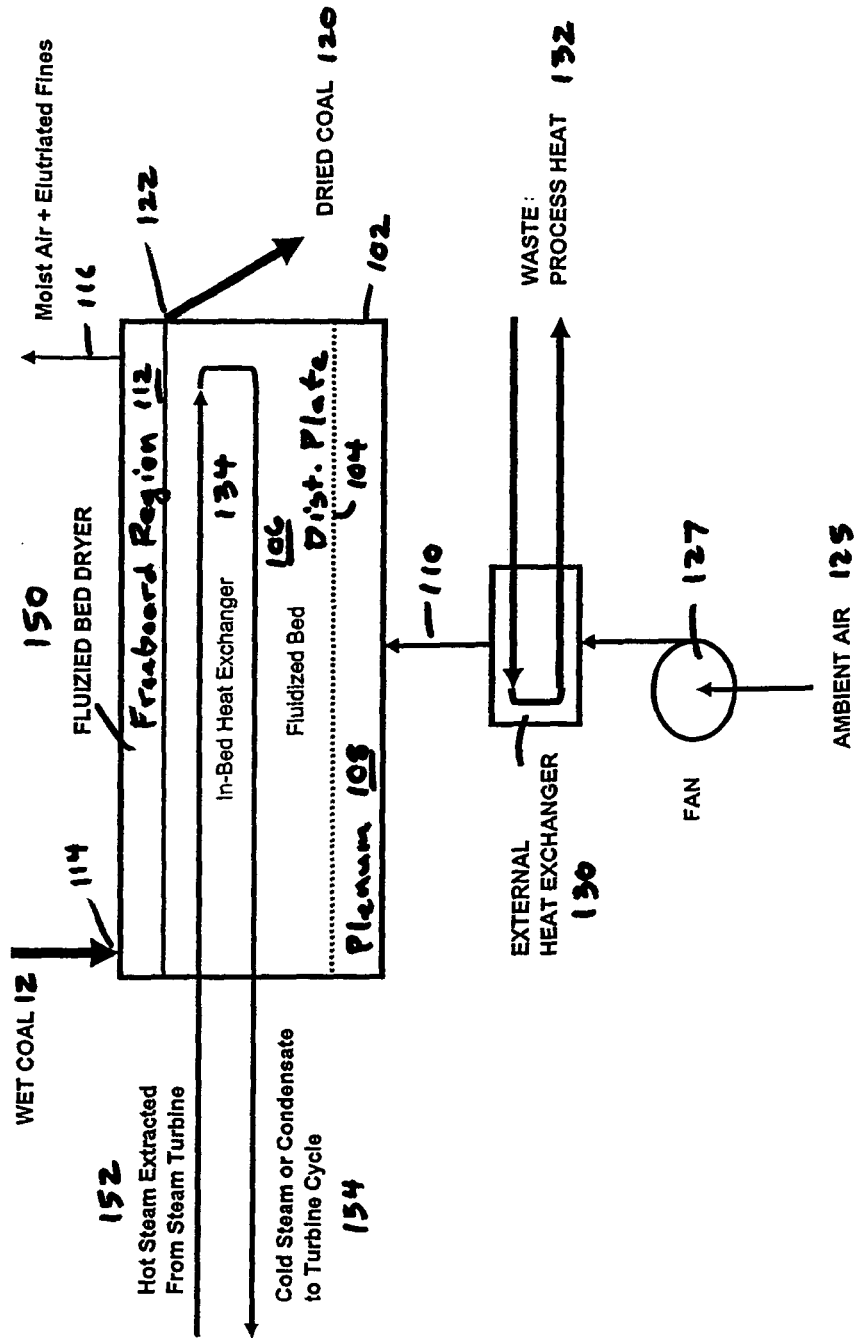
FIG. 5 is a schematic diagram of a single-stage fluidized bed dryer of the present invention that utilizes a combination of waste process heat to heat the fluidizing air used to fluidize the coal (indirect heat), and hot steam extracted from a steam turbine cycle and circulated through an in-bed heat exchanger contained inside the fluidized bed dryer to dry the coal (direct heat).

FIG. 5 shows yet another embodiment of a single-stage, single-vessel, fluidized bed dryer 150 similar to the one depicted in FIG. 4, except that hot process steam 152 extracted from the steam turbines of the electricity power plant is used instead of hot condenser cooling water as a heat source for in-bed heat exchanger 134. Again, fluidized bed dryer 150 uses two different waste heat sources (i.e., waste process heat 132 and hot process steam) in order to enhance the operating efficiency of the coal drying process.

Figure 6:
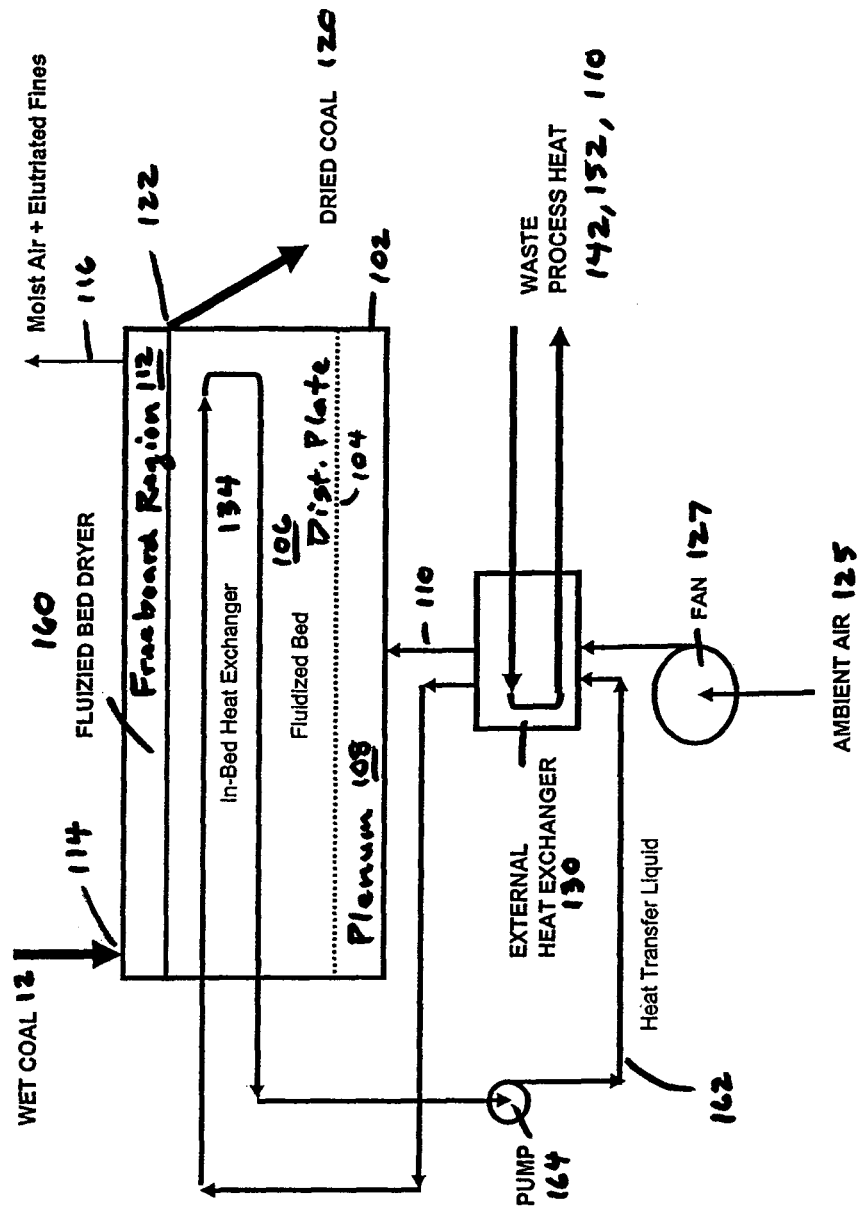
FIG. 6 is a schematic diagram of a single-stage fluidized bed dryer of the present invention that utilizes waste process heat to both heat the fluidizing air used to fluidize the coal (indirect heat), and to heat the transfer liquid circulated through an in-bed heat exchanger contained inside the fluidized bed dryer to dry the coal (indirect heat).

Another embodiment of a fluidized bed dryer is shown in FIGS. 6-7, entailing a single-stage, single-vessel, fluidized bed dryer 160 with an indirect heat supply. An indirect heat supply to the in-bed heat exchanger 134 is provided by the use of water or other heat transfer liquid 162, which is heated by the fluidizing air 110, hot condenser cooling water 142, process steam 152 extracted from the steam turbine cycle, or hot flue gas 168 from the furnace stack in an external heat exchanger 130, and then circulated through the in-bed heat exchanger 134 by means of pump 166, as illustrated in FIG. 6. Any combination of these sources of heat (and other sources) may also be utilized.

Still another embodiment of an open-air, low-temperature fluidized bed dryer design of the present invention is illustrated in FIG. 8, which is a multiple-stage, single-vessel, fluidized bed dryer 170 with a direct heat supply (hot condenser cooling water 172 from the cooling tower of electric power plant) to an in-bed heat exchanger 134. Vessel 102 is divided in two stages: a first stage 174 and second stage 176. Although illustrated in FIG. 8 as a two-stage dryer, additional stages may be added and further processing can be achieved. Typically, wet sized coal 12 enters the first stage 174 of the fluidized bed drier 170 through the freeboard region 112 at entry point 114. The wet sized coal 12 is preheated and partially dried (i.e., a portion of surface moisture is removed) by hot condenser cooling water 172 entering, circulating and exiting through the heating coils of in-bed heat exchanger 164 contained inside the first stage 174 (direct heat). The wet sized coal 12 is also heated and fluidized by hot fluidizing air 110. Fluidizing air 110 is forced by fan 127 through the distributor plate 104 of the first stage 174 of the fluidized bed dryer 170 after being heated by waste process heat 132 in external heat exchanger 130.

In the first stage 174, the hot fluidization air stream 110 is forced through the wet sized coal 12 supported by and above distributor plate 104 to dry the coal and separate the fluidizable particles and non-fluidizable particles contained within the coal. Heavier or denser, non-fluidizable particles segregate out within the bed 170 and collect at its bottom on the distributor plate 104. These non-fluidizable particles ("undercut") are then discharged from the first stage 174 as Stream 1 (176). Fluidized bed dryers are generally designed to handle non-fluidized material up to four inches thick collecting at the bottom of the fluidized bed. The non-fluidized material may account for up to 25% of the coal input stream. This undercut stream 176 can be directed through another beneficiation process or simply be rejected. Movement of the segregated material along the distributor plate 104 to the discharge point for stream 176 is accomplished by an inclined horizontal-directional distributor plate 104, as shown in FIG. 8. The first stage 174 therefore separates the fluidizable and non-fluidizable material, pre-dries and preheats the wet sized coal 12, and provides uniform flow of the wet sized coal 12 to the second stage 178 contained within the fluidized bed dryer 170. From the first stage 174, the fluidized coal 12 flows airborne over a first weir 180 to the second stage 178 of the bed dryer 170. In this second stage of the bed dryer 170, the fluidized coal 12 is further heated and dried to a desired outlet moisture level by direct heat, hot condenser cooling water 172 entering, circulating, and exiting the heating coils of the in-bed heat exchanger 182 contained within the second stage 178 to radiate sensible heat therein. The coal 12 is also heated, dried, and fluidized by hot fluidizing air 110 forced by fan 127 through the distributor plate 104 into the second stage 178 of the fluidized bed dryer 170 after being heated by waste process heat 132 in external heat exchanger 130.

The dried coal stream is discharged airborne over a second weir 184 at the discharge end 122 of the fluidized bed dryer 170, and elutriated fines 116 and moist air are discharged through the top of the dryer unit. This second stage 178 can also be used to further separate fly ash and other impurities from the coal 12. Segregated material will be removed from the second stage 178 via multiple extraction points 186 and 188 located at the bottom of the bed 170 (or wherever else that is appropriate), as shown in FIG. 8 as Streams 2 (186) and 3 (188). The required number of extraction points may be modified depending upon the size and other properties of the wet sized coal 12, including without limitation, nature of the undesirable impurities, fluidization parameters, and bed design. The movement of the segregated material to the discharge point(s) 176, 186, and 188 can be accomplished by an inclined distributor plate 104 shown in FIG. 8, or by existing commercially available horizontal-directional distributor plates. Streams 1, 2 and 3 may be either removed from the process and land-filled or further processed to remove undesirable impurities. A separate application entitled "Apparatus and Method of Separating and Concentrating Organic and/or Non-Organic Material" that was filed on the same day as this application with the same common owner describes more fully an application and method for segregating and further treating undercut streams 176, 186, and 188, and is incorporated hereby by reference in its entirety.

The fluidization air stream 110 is cooled and humidified as it flows through the coal bed 170 and wet sized coal 12 contained in both the first stage 174 and second stage 178 of the fluidized bed 106. The quantity of moisture which can be removed from the coal 12 inside the dryer bed is limited by the drying capacity of the fluidization air stream 110. Therefore, the heat inputted to the fluidized bed 106 by means of the heating coils of the in-bed heat exchangers 134 and 182 increases the drying capacity of fluidizing air stream 110, and reduces the quantity of drying air required to accomplish a desired degree of coal drying. With a sufficient in-bed heat transfer surface, drying air stream 110 could be reduced to values corresponding to the minimum fluidization velocity needed to keep particulate suspended. This is typically in the 0.8 meters/second range, but the rate could be increased to run at a higher value, such as 1.4 meters/second, to assure that the process never drops below the minimum required velocity.

To achieve maximum drying efficiency, drying air stream 110 leaves fluidized bed 106 at saturation condition (i.e., with 100% relative humidity). To prevent condensation of moisture in the freeboard region 112 of the fluidized bed dryer 170 and further downstream, coal dryer 170 is designed for outlet relative humidity less than 100%. Also, a portion of the hot fluidizing air 110 may be bypassed around the fluidized bed 106, and mixed with the saturated air in the freeboard region 112 to lower its relative humidity (e.g., sparging). Alternatively, reheat surfaces may be added inside the freeboard region 112 of the fluidized bed dryer 170 or heating of vessel skin, or other techniques may be utilized to increase the temperature and lower the relative humidity of fluidization air 110 leaving the bed dryer 170, and prevent downstream condensation. The moisture removed in the dryer is directly proportional to the heat input contained in the fluidizing air and heat radiated by the in-bed heat exchangers. Higher heat inputs result in higher bed and exit temperatures, which increase the water transport capabilities of the air, thereby lowering the required air-to-coal ratio required to achieve the desired degree of drying. The power requirements for drying are dependent upon the air flow and the fan differential pressure. The ability to add heat in the dryer bed is dependant upon the temperature differential between the bed and heating water, the heat transfer coefficient, and the surface area of the heat exchanger. In order to use lower temperature waste heat, more heat transfer area is therefore needed to introduce the heat into the process. This typically means a deeper bed to provide the necessary volume for the heat coils of the in-bed heat exchangers. Thus, intended goals may dictate the precise dimensions and design configuration of the fluidized bed dryer of the present invention.

Coal streams going into and out of the dryer include the wet sized coal 12, processed coal stream, elutriated fines stream 116, and the undercut streams 176, 186, and 188. To deal with the non-fluidizable coal, the dryers may be equipped with a scrubber—hopper/collection plus auger for removing coal from the bottom of the fluidized bed. This associated equipment is disclosed more fully in the separate application entitled "Apparatus and Method of Separating and Concentrating Organic and/or Non-Organic Material" that was filed on the same day as this application with the common owner, and such application is incorporated hereby by reference in its entirety.

Typical associated components of a dryer include, amongst others, coal delivery equipment, coal storage bunker, fluidized bed dryer, air delivery and heating system, in-bed heat exchanger(s), environmental controls (dust collector), instrumentation, and a control and data acquisition system. In one embodiment, screw augers are used for feeding moist coal into and extracting the dried coal product out of the dryer. Vane feeders can be used to control the feed rates and provide an air lock on the coal streams into and out of the dryer. Load cells on the coal bunker provide the flow rate and total coal input into the dryer. Instrumentation could include, without limitation, thermocouples, pressure gauges, air humidity meters, flow meters and strain gauges.

With respect to fluidized-bed dryers, the first stage accomplishes pre-heating and separation of non-fluidizable material. This can be designed as a high-velocity, small chamber to separate the coal. In the second stage, coal dries by evaporation of coal moisture due to the difference in the partial pressures between the water vapor and coal. In a preferred embodiment, most of the moisture is removed in the second stage.

Figure 9:
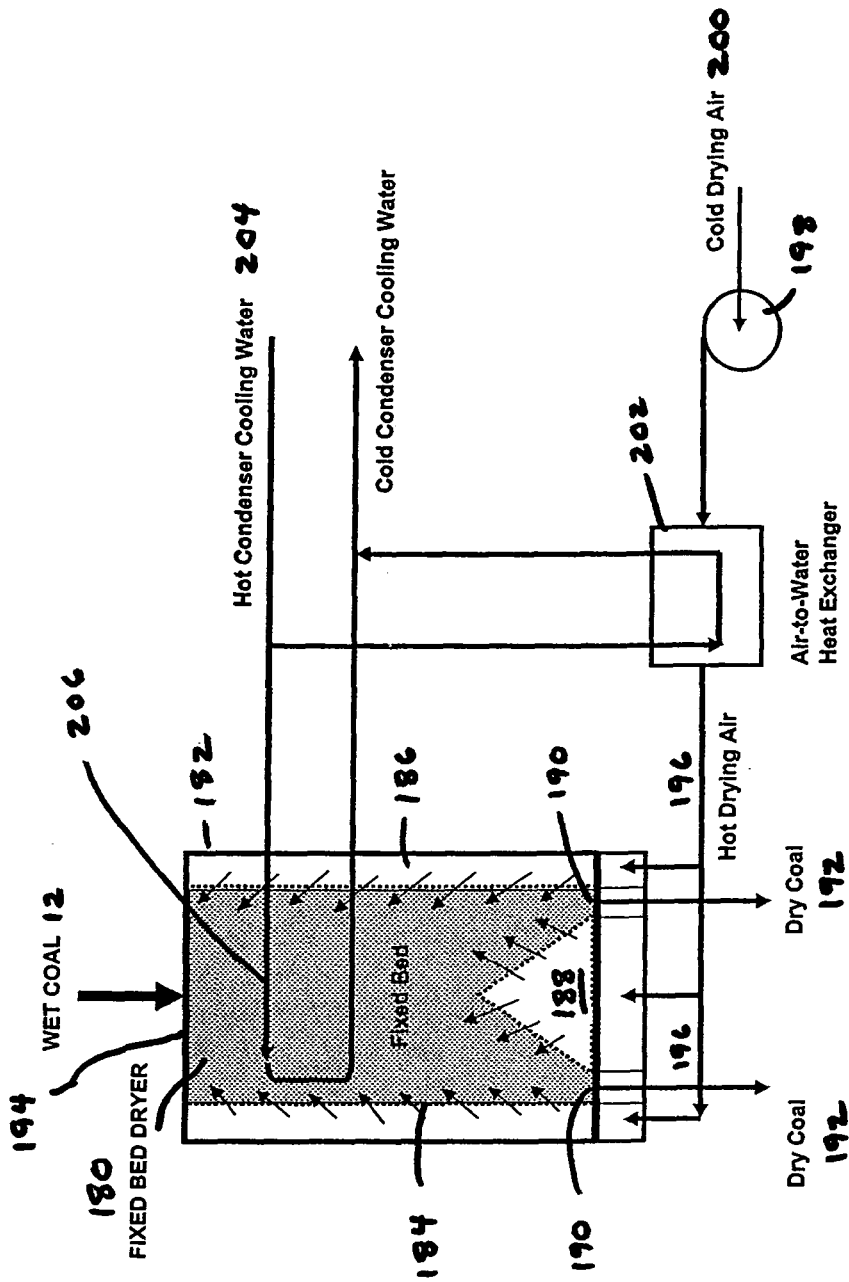
FIG. 9 is a schematic diagram of one embodiment of a fixed bed dryer.

Another type of coal bed dryer for purposes of this invention is a single-vessel, single-stage, fixed-bed dryer with a direct or indirect heat source. One embodiment of such a dryer with a direct heat source is illustrated in FIG. 9, although many other arrangements are possible. A fixed-bed dryer is a good choice for drying coal that will be sold to other power plants or other industrial plants. This is because of the low drying rates and the fact that much longer residence times are needed for fixed-bed dryers, compared with fluidized-bed dryers, to dry a required quantity of coal to a desired degree of moisture reduction. Furthermore, there usually are practical limitations on the use of a fluidized bed dryer in a non-plant situation, such as in the mining field. Under these circumstances, premium waste heat sources, such as the hot condenser cooling water or compressor heat, may not be available for the drying operation. Also, it may be more difficult to cheaply provide the necessary quantity of fluidizing air required for a fluidized bed.

With the arrangement shown in FIG. 9, the fixed-bed dryer 180 has two concentric walls, wherein, a generally cylindrical outer wall 182 and a generally cylindrical inner wall 184 that define a spatial ring 186 between the outer wall 182 and inner wall 184 for air flow. A conical structure 188 having a base diameter smaller than the diameter of the inner wall 184, is positioned at the bottom of the fixed-bed dryer 180, axially aligned with the inner wall 184, to create a ring-shaped floor discharge port 190 for discharge of the dried coal 192.

Coal (typically, but not exclusively, wet sized coal 12) enters the fixed bed 180 at the open top 194. The wet sized coal 12 is drawn by gravity to the bottom of the bed dryer 180. A fluidizing air stream 196 is generated by a fan 198 drawing cold drying air 200 through an air-to-water heat exchanger 202. The fluidizing air 200 is heated by means of waste heat, shown in FIG. 9 as hot condenser cooling water 204 drawn from a steam condenser (not shown). As with all of the embodiments described in this application, other waste heat sources are possible for practice of the invention.

The fluidizing air 200 enters the bottom of the fixed bed 180 through both the conical structure 188 and the spatial ring 186 formed between inner wall 184 and outer wall 182. Both the conical structure 188 and the inner wall 184 are perforated or otherwise suitably equipped to allow fluidizing air 196 to flow through the wet sized coal 12 contained within the inner wall 184 of the fixed bed dryer 180, as shown in FIG. 9. The fluidizing air 196 escapes into the atmosphere through the open top 194 of the fixed bed dryer 180.

The fixed bed dryer 180 includes in-bed heat coils 206. Heat for the in-bed heat transfer coils 206 is provided by waste heat, in this case, hot condenser cooling water 204. Waste heat from other sources or steam extracted from the steam turbine cycle, or any combination thereof, could also be used solely or in combination with the condenser waste heat 204. As wet sized coal 12 is heated and aerated in fixed bed dryer 180, dried coal 192 is drawn by gravity or other commercially available mechanical means to the bottom of the dryer where it is discharged through the discharge ring 190 formed at the bottom of the fixed bed dryer 180.

The dryer bed designs for this invention are intended to be custom designed to maximize use of waste heat streams available from a variety of power plant processes without exposing the coal to temperatures greater than 300° F., preferably between 200-300° F. (Other feedstock or fuel temperature gradients and fluid flows will vary, depending upon the intended goal to be achieved, properties of the fuel or feedstock and other factors relevant to the desired result). Above 300° F., typically closer to 400° F., oxidation occurs and volatiles are driven out of the coal, producing another stream containing undesirable constituents that need to be managed, and other potential problems for the plant operations.

The dryers are able to handle higher-temperature waste heat sources by tempering the air input to the dryer to less than 300° F. and inputting this heat into heat exchanger coils within the bed. The multi-stage design of a fluidized-bed dryer creates temperature zones which can be used to achieve more efficient heat transfer by counter flowing of the heating medium. The coal outlet temperature from a dryer bed is relatively low (typically less than 140° F.) and produces a product which is relatively easy to store and handle. If a particular particulate material requires a lower or higher product temperature, the dryers can be designed to provide the reduced or increased temperature.

Selection of appropriate dryer design, dryer temperature, and residence time for the coal contained within the bed will produce a reduction in moisture to the desired level. For low-rank coals for power plant applications, this may entail a moisture reduction for North American lignite from approximately 35-40% wt to 10-35% wt, more preferably 27-32% wt. In other geographical markets like Australia and Russia that start out with high moisture levels for lignite as high as 50-60%, coal users may choose to reduce the moisture level through drying to below 27%. For subbituminous coals, this moisture reduction might be from approximately 25-30% wt to approximately 10-30% wt, more preferably 20-25% wt. While properly designed dryer processes under this invention can reduce the moisture level of particulate materials to 0% using low-temperature heat, in the case of coal for electric power plant operations, this may be unnecessary and increase processing costs. Custom designs permit the beds to be constructed to dry high-moisture coal to a level best suited for the particular power plant process.

Figure 10:
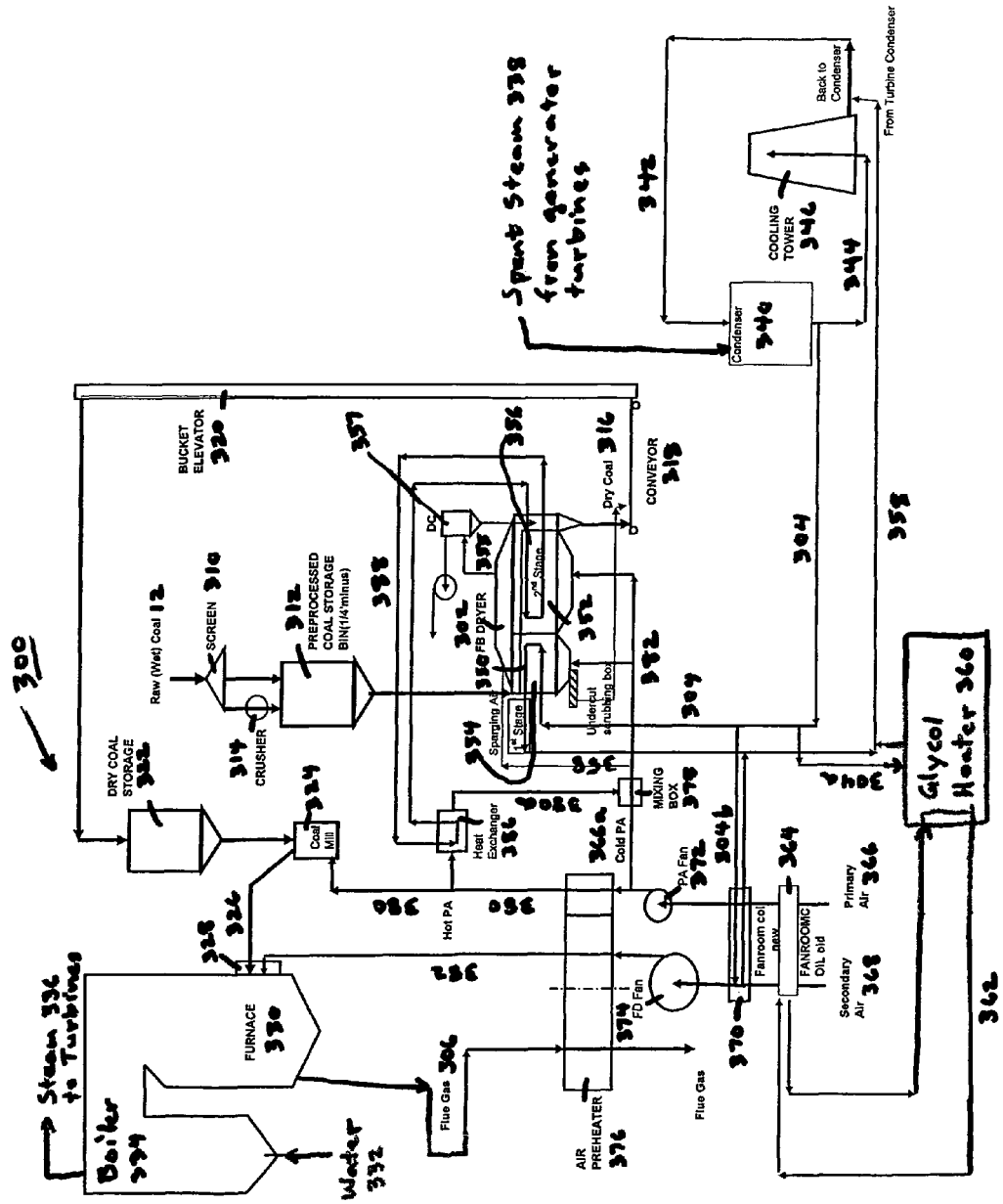
FIG. 10 is a schematic diagram of a two-stage fluidized bed dryer of the present invention integrated into an electric power plant that uses hot condenser cooling water to heat the coal contained in the first dryer stage, and to heat the fluidizing air used to fluidize the coal in both dryer stages. The hot condenser cooling water in combination with hot flue gas dries the coal in the second dryer stage.

Many possible implementation options are available for use of the low-temperature, open-air dry process utilizing waste heat options of the present invention within an industrial plant operation. A preferred embodiment is shown in FIG. 10 in the form of a two-stage, single-vessel fluidized bed dryer 302 integrated within an electrical power generation plant 300, using hot condenser cooling water 304 and hot flue gas 306 as the sole heat sources for the drying operation. Raw lignite coal 12 having a moisture level of 35-40% wt is fed into a screen 310 to sort the coal for suitable size for handling within the process. Appropriately sized coal 12 within the range of two inch minus, more preferably 0.25 inches or less, is conveyed by standard means directly into preprocess coal storage bin 312. Any oversized coal greater than 0.25 inches is first run through a crusher 314 before it is conveyed by standard means to coal storage bin 312.

From the storage bin, the wet, sized coal 12 is then transported by a conveyor system known within the art to the fluidized bed dry 302, wherein the total moisture on the surface of and within the pores of the coal particles is reduced to a predetermined level to yield "dried" coal 316 having an average moisture level of approximately 28-30% wt. This resulting dried coal 316 is transported by conveyor 318 to bucket elevator 320 to dry coal storage hopper 322 where it is kept until needed for the boiler furnace.

The dried coal 316 collected in storage hopper 322 is conveyed by conventional means to coal mill 324 in which it is pulverized into dried, pulverized coal 326 prior to being conveyed to wind box 328 for entry into furnace 330. For purposes of this application, the process parameters typical of "winter conditions" in North Dakota for a 4 million lbs/hr boiler capacity are provided for the coal drying process shown in FIG. 10. Upon combustion of the coal 326 in furnace 330, the resulting heat within the 6 billion BTU/hr range is transferred to water 332 contained in boiler 334. Steam 336 at an average temperature of 1000° F. and pressure of 2,520 psig is then passed onto the first of a series of high-pressure, intermediate-pressure, and low-pressure steam turbines (not shown) used to drive at least one generator (not shown) for the production of electricity. The spent steam will typically leave the high-pressure turbine at 600° F. and 650 psi, and leave the downstream intermediate pressure turbine(s) at approximately 550-600° F. and 70 psi.

The spent steam 338 exiting the low-pressure turbine at approximately 125-130° F. and 1.5 psia is thereafter delivered to condenser 340 wherein it is converted to water. Cold cooling water 342 at approximately 85° F. is circulated through condenser 340 to withdraw latent heat energy from the spent steam 338. In the process, the cooling water 342 will become hotter and exits the condenser as hot cooling water 344 at approximately 120° F. This hot condenser cooling water 344 is then passed to cooling tower 346 wherein its temperature is reduced again to approximately 85° F. to produce the cold condenser cooling water for recycle to condenser 340. The condensed steam from the condenser is thereafter re-circulated through boiler 334 to be reheated into steam 336 for use again to drive the steam turbine.

Fluidized bed dryer 302 consists of first stage 350 having a distribution area of 70 ft² for receiving the coal 12 to be dried, and a larger second stage 352 having a distribution area of 245 ft². These stages of the fluidized bed dryer 302 are equipped with in-bed heat exchangers 354 and 356, respectively, which will be discussed in greater detail below.

A portion 304 of the hot condenser cooling water is diverted and circulated through heat exchanger 354 to provide the direct source of heat to the first stage 350 of the dryer. This hot condenser cooling water 304 will typically average 120° F., and causes first-stage in-bed heat exchanger to emit 2.5 million BTU/hr of heat. The spent hot condenser cooling water 358 exiting the heat exchanger at approximately 100° F. returns to the condenser whereupon it will assist in the cooling down of the spent turbine steam 358, and become hot condenser cooling water 304 once again.

A portion 304a of the hot condenser cooling water is circulated through external heat exchanger 360, which is used to heat up the glycol-base circulation fluid 362 used to heat preliminary fan room coil 364. This preliminary fan room coil 364 increases the temperature of primary air stream 366 and secondary air stream 368 from ambient temperature which will vary throughout the time of year to approximately 25-30° F. (winter conditions). Glycol will not freeze at low temperatures, so it ensures that the primary and secondary air streams likewise will not fall below a minimum temperature of 25° F.

Primary air stream 366 and secondary air stream 368 leaving preliminary fan room coil 364 are then passed onto the principal fan room coil 370, which constitutes an air-water heat exchanger unit. A portion 304b of hot condenser cooling water 304 is circulated through principal fan room coil 370 to provide the necessary heat source. The primary air stream 366 and secondary air stream 368 exit primary fan room coil at approximately 80-100° F., whereupon they are conveyed by means of PA fan 372 and FD fan 374, at 140° F. and 112° F., respectively, to external air heater 376, which constitute a tri-sector, rotating regenerative air pre-heater.

The use of the fanroom coils 364 and 370 to preheat inlet air to the air preheater 62 and the hot and cold primary air streams 380 and 366a, respectively, increases the temperature of the heat available to the outer heat exchanger 386 and heat transfer fluid stream 388 from the 120-degree range to the 200-degree plus range. This has a positive effect on the flow rate of fluidizing/drying air 352 and on the required surface area of the in-bed heat exchanger 356. Both are reduced as the temperature of drying and heating streams is increased.

A portion 366a of the primary air 366 is diverted prior to external air pre-heater 376 to mixing box 378 at approximately 145° F. After mixing with a hotter stream 380a (at approximately 283° F., of the primary air it forms fluidizing air 382 at approximately 187° F., which is used as the fluidizing medium for both first stage 350 and second stage 352 of fluidized bed dryer 302. In order to achieve this 187° F. fluidizing air temperature, approximately 54% of the air entering mixing box 378 will be provided by hot PA air 380a, and 46% will be provided by cold PA air 366a. The fluidizing air 382 will enter first stage 350 at velocity of approximately 3.5 ft/sec to fluidize the approximately 40 inch-thick bed of coal particles. The coal particles 12 travel across the first stage 350 at approximately 132,000 lbs/hr wherein they are heated by in-bed heat exchanger 354 and the fluidizing air to approximately 92° F. and undergo a small moisture reduction. Upon reaching the end of the first stage 350, they will spill over the top of a weir into second stage 352.

Flue gas 306 exits the boiler furnace 330 at approximately 825° F. This waste heat source is passed through external air heater 376 to provide the heating medium. The flue gas exits the external heater at approximately 343° F. and is vented to the stack via a precipitator and scrubber. But, in the process, the flue gas heats primary air stream 366 and secondary air stream 368 to approximately 757° F. and 740° F., respectively, to form hot primary air 380 and heated secondary air 382. The heated secondary air stream 382 is delivered to furnace 330 at approximately 117% of what is needed to aid the combustion process and enhance the boiler efficiency.

Hot primary air 380 at approximately 757° F. is delivered to coal mill 324, whereupon it forms a source of positive pressure to push the pulverized coal particles to wind box 328 and furnace 330. Again, preheating the pulverized coal particles 326 in this manner enhances the boiler efficiency and enables the use of a smaller boiler and associated equipment.

With drier coal, the flame temperature is higher due to lower moisture evaporation loss, and the heat transfer processes in the furnace 25 are modified. The higher flame temperature results in larger radiation heat flux to the walls of furnace 25. Since the moisture content of the exiting flue gas 27 is reduced, radiation properties of the flame are changed, which also affects radiation flux to the walls of furnace 25. With higher flame temperature, the temperature of coal ash particles exiting the furnace 25 is higher, which could increase furnace fouling and slagging. Deposition of slag on furnace walls reduces heat transfer and results in a higher flue gas temperature (FEGT) at the furnace exit. Due to reduction in coal flow rate as fuel moisture is reduced, the amount of ash entering the boiler will also be reduced. This reduces solid particle erosion in the boiler 32 and maintenance of the boiler 32 (e.g., the required removal of the soot that collects on the interior surface of the boiler).

A portion of the hot primary air stream 380 is diverted to heat exchanger 386, which heats a liquid medium 388 to approximately 201° F., which is used as the heat source for in-bed heat exchanger 356 contained in second stage 352 of the fluidized bed dryer 302. This liquid medium will leave the heat exchanger at approximately 160° F. whereupon it is routed back to heat exchanger 386 to be reheated. As already mentioned above, primary air stream 380a leaving heat exchanger 386 at approximately 283° F. combines with cold primary air 366a in mixing box 378 to form the fluidizing air stream 382 directed to the fluidized bed dryer 302. This mixing box allows the temperature of the fluidizing air to be adjusted to a desired level.

The fluidized coal particles that were delivered from first stage 350 at approximately 92° F. and slightly reduced moisture to second stage 352 of the fluidized bed dryer will form a bed of approximately 38-42 inches in depth that will be fluidized by air stream 382 and further heated by in-bed heat exchanger 356. These coal particles will take approximately 12 minutes to travel the length of the second stage 352 of the fluidized bed, whereupon they will be discharged as dried coal 316 at approximately 118° F. and 29.5% wt moisture. More importantly, the heat value of the coal 12 that entered the first stage of dryer 302 at approximately 6200 BTU/lb has been increased to approximately 7045 BTU/lb.

Within the industry, an "X ratio" is calculated to represent the relative efficiency of the transfer of heat across air heater 376 from flue gas 306 to primary air 366 and secondary air 368. Represented by the equation:

$$m_{PA+FD} \cdot cp_{PA+FD} \cdot (T_{out}-T_{in})_{PA+FD} = m_{flue} \cdot cp_{flue} \cdot (T_{in}-T_{out})_{flue}$$

where m is the mass flow, cp is the specific heat, $T_{in}$ is the inlet temperature, and $T_{out}$ is the outlet temperature for the respective combustion air (i.e., primary air and secondary air) and flue gas streams, respectively. Because the product of (m·cp) for the combustion air stream (stated in BTU/hr) is typically only 80% of the corresponding value for the flue gas stream, this means that under ordinary circumstances for a power plant the temperature drop in the flue gas across the air heat exchanger can only equal 80% of the temperature gain in the combustion air stream. By reducing the moisture content of the coal and consequently the flue gas produced via combustion of that coal product in the furnace in accordance with this invention, however, the mass flow rate and specific heat values for the flue gas stream 306 will be reduced, while preheating of primary air stream 366 and secondary air stream 368 via fan room coils 364 and 370 will increase the mass flow rate for the combustion air stream. This will cause the X ratio to increase towards 100%, thereby greatly enhancing the boiler efficiency of the power plant operation. Moreover, careful design of the dryer system in accordance with the principles of this invention can further enhance the X ratio value to approximately 112%, thereby rendering the boiler operation even more efficient for producing electricity. Furthermore, this greatly enhanced X ratio for the air heat exchanger and boiler efficiency has been achieved through the use of available waste heat sources within the power plant operation, which enables improvement of the economics for the power plant operation on a synergistic basis.

Figure 11:
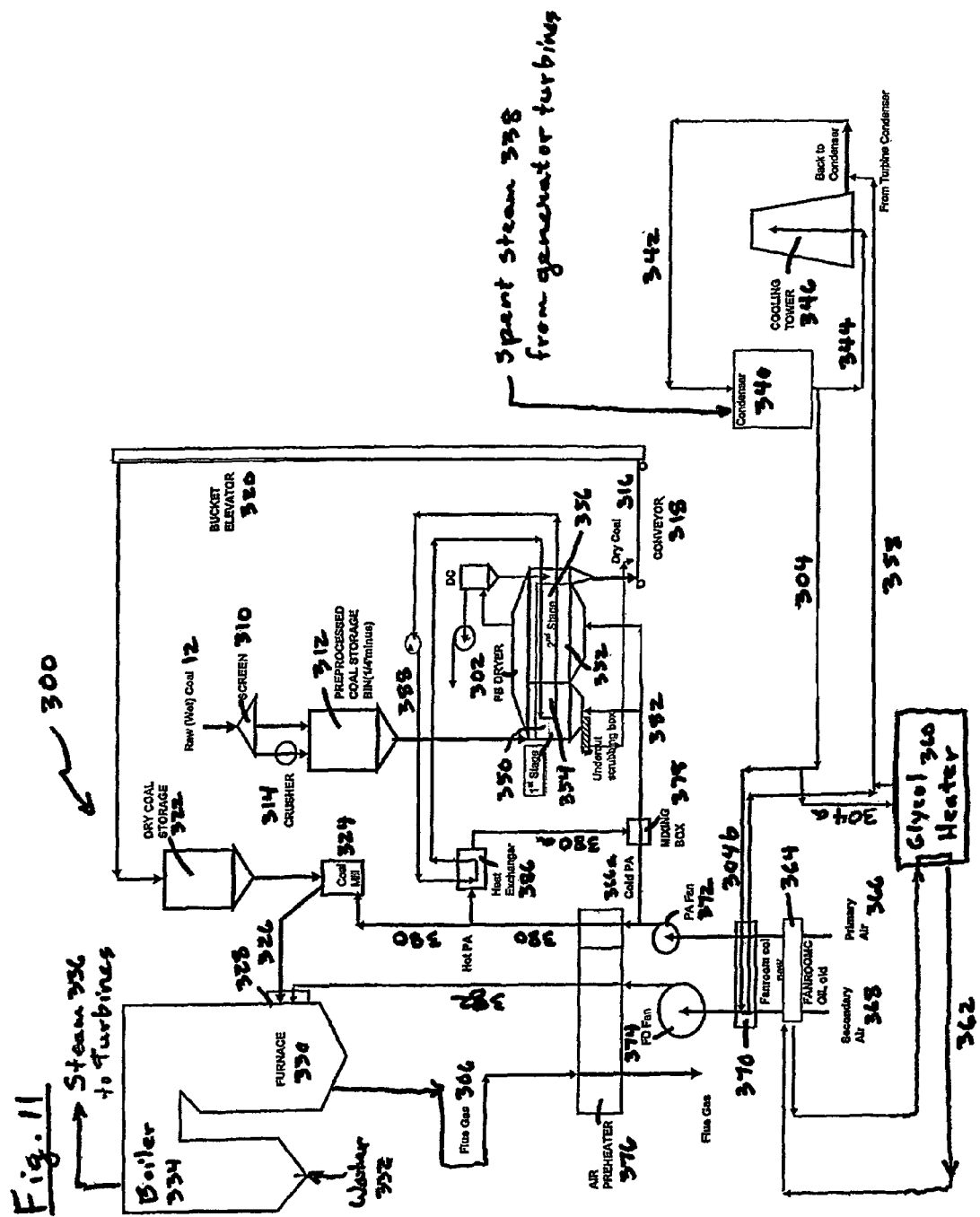
FIG. 11 is a schematic diagram that uses the combined waste heat provided by the hot condenser cooling water and hot flue gas to heat and/or dry the coal in both dryer stages.
Figure 12:
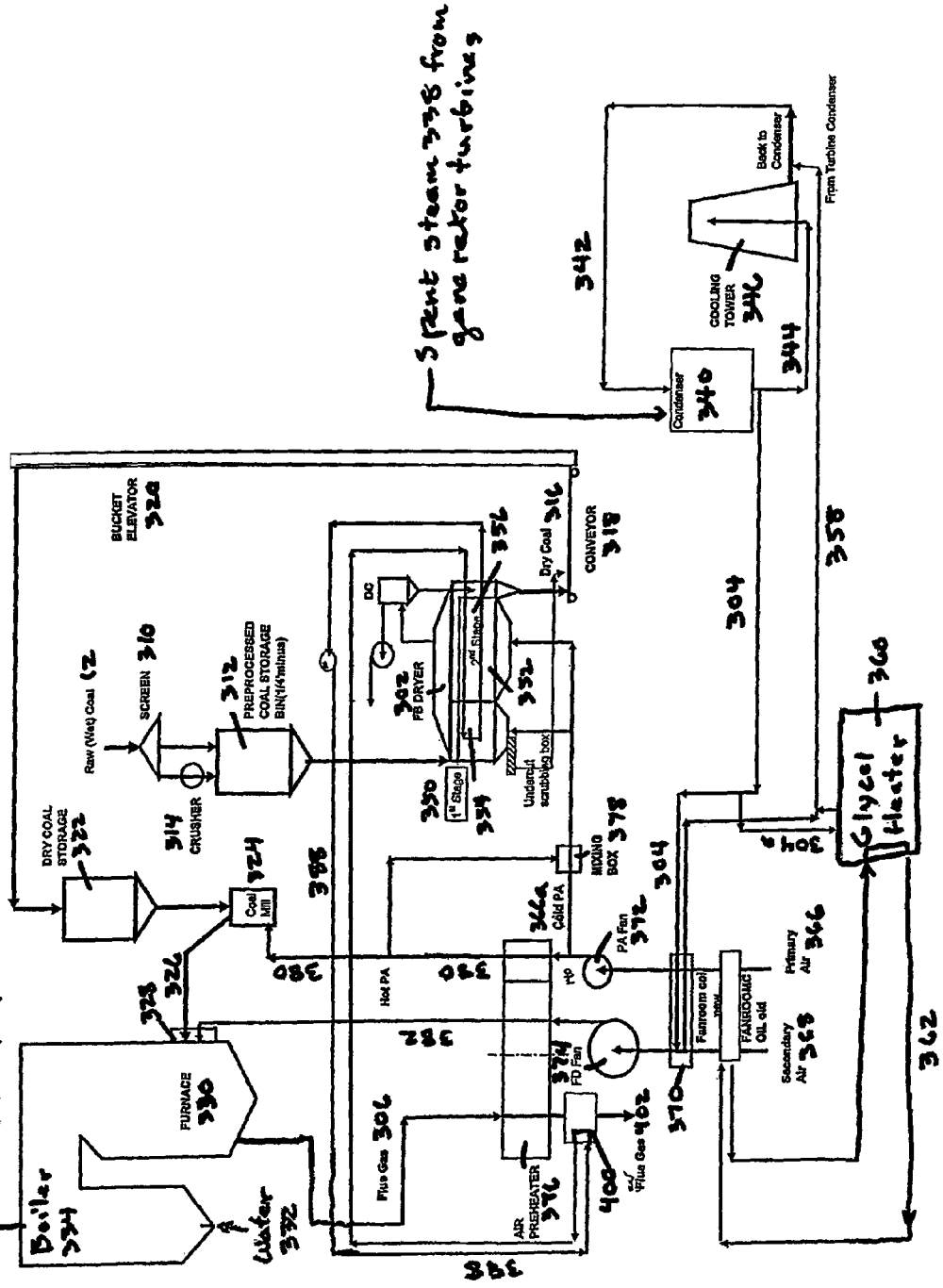
FIG. 12 is a schematic diagram that uses the hot flue gas to heat and/or dry the coal in both dryer stages.

It is important to appreciate that other variations can be made to the fluidized bed dryer arrangements show in FIGS. 10-12. For example, other waste heat streams available within the electric power plant like the spent process steam coming off the turbines could be used in substitution for the hot flue gas or hot condenser cooling water streams. Moreover, separate mixing boxes could be inserted within the lines used to deliver the fluidizing air to the first and second stages of the fluidized bed in order to permit separate adjustment and control of the temperature of each fluidizing stream. Furthermore, a bi-sector or external air heater could be employed with both the primary and secondary airstreams passed through the one side to be heated by the hot flue gas traveling through the other side. If needed, a steam air pre-heater ("SAH") can be placed in the hot primary air stream to further increase its temperature before it reaches the mixing boxes. The heat input for this SAH could be provided by steam extracted from the steam turbine cycle or from other waste heat sources available within the plant. Still another variation would be to place a low-temperature economizer heat exchanger in the path of the flue gas after it exits the external air pre-heater in order to heat a circulating fluid that provides further heat enhancement to the primary and/or secondary air streams before they reach the external air heater.

FIG. 11 shows a slightly different integration of the fluidized bed dryer 302 into electric power plant 300, compared with FIG. 10 in which like elements have been given the same numbers for ease of understanding. Hot condenser cooling water 304 is still used to heat glycol heater 360 for preliminary fan room coil 364 and primary fan room coil 370, which, in turn, collectively preheat primary air stream 366 and secondary air stream 368 before they are further heated in external air heater 376 by flue gas 306 to create hot secondary air 382 and hot primary air 380. The cold primary air stream 366a is also still directed through mixing box 378 to control the temperature of the fluidizing air directed through the bottoms of first stage 350 and second stage 352 of the fluidized bed dryer. However, circulating liquid medium 388 heated in heat exchanger 386 is used as the heating medium for both in-bed heat exchanger 354 in first stage 350 and in-bed heat exchanger 356 in second stage 352. Unlike the arrangement shown in FIG. 10, hot condenser cooling water 304 is not used as the heating medium for in-bed heat exchanger 354 in the fist stage 350. This FIG. 11 embodiment allows higher temperature heat to be directed to both heat exchangers in fluidized-bed dryer 302 and enhances the flexibility of the overall drying system.

FIG. 12 shows a still slightly different arrangement for the fluidized bed dryer 302 and electric power plant 300. Like FIG. 11, a common source of waste heat is used for both in-bed heat exchangers contained in the first stage 350 and second stage 352 of the fluidized-bed dryer 302. However, unlike FIG. 11 where the hot primary air 380 exiting the external air heater 376 is used to heat the heat exchanger circulating liquid 388, in FIG. 12 this circulating liquid 388 is heated inside heat exchanger 400 by means of the flue gas stream 402 exiting the external air pre-heater 376. In this manner, the circulating liquid 388 can be heated to approximately 200-300° F. for use in the in-bed heat exchangers 354 and 356. Moreover, this FIG. 12 embodiment is further preferred because it enables further productive use of the heat content of the flue gas stream, and provides even greater flexibility to the dryer system design which renders it more efficient in producing the same or better drying performance compared with the embodiments shown in FIGS. 10 and 11.

Figure 13:
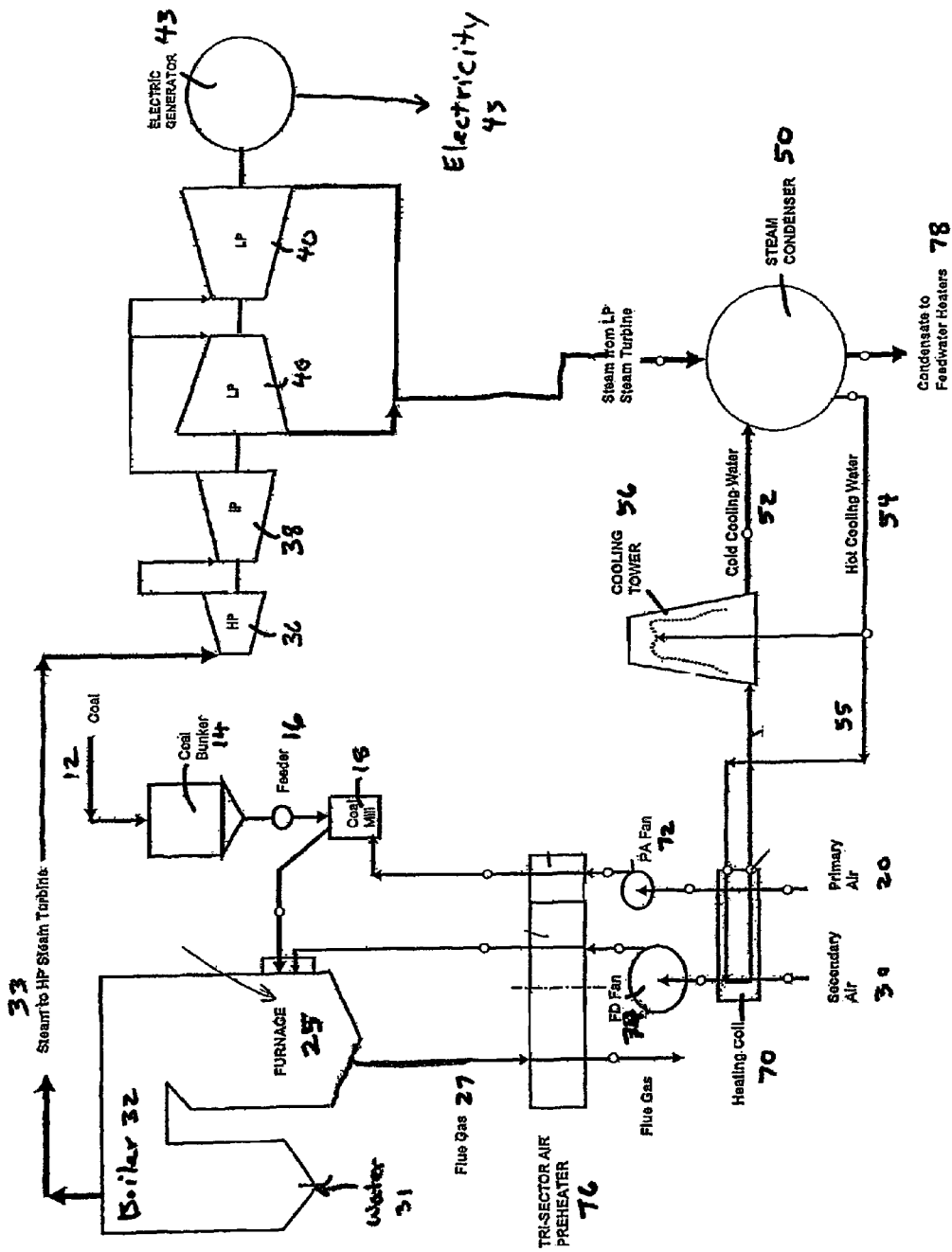
FIG. 13 illustrates a closed-cooling circuit with a tri-sector air pre-heater.

While use of the hot flue gas 27 and hot steam 71 extracted from the steam turbines has previously been discussed in FIG. 2 for improving the efficiency of the electric power plant 65, other alternative arrangements are possible. In FIG. 13, for example, another embodiment of a closed-cooling circuit with a tri-sector rotating regenerative air pre-heater is shown. In this case, instead of diverting spent steam 71 from the steam turbines to act as a heat source for the heat exchanger 70 for preheating primary air stream 20 and secondary air stream 30 before they reach the air heater 76, a portion of the hot condenser cooling water 55 is routed to the heat coil in heat exchanger 70 for this purpose.

Figure 14:
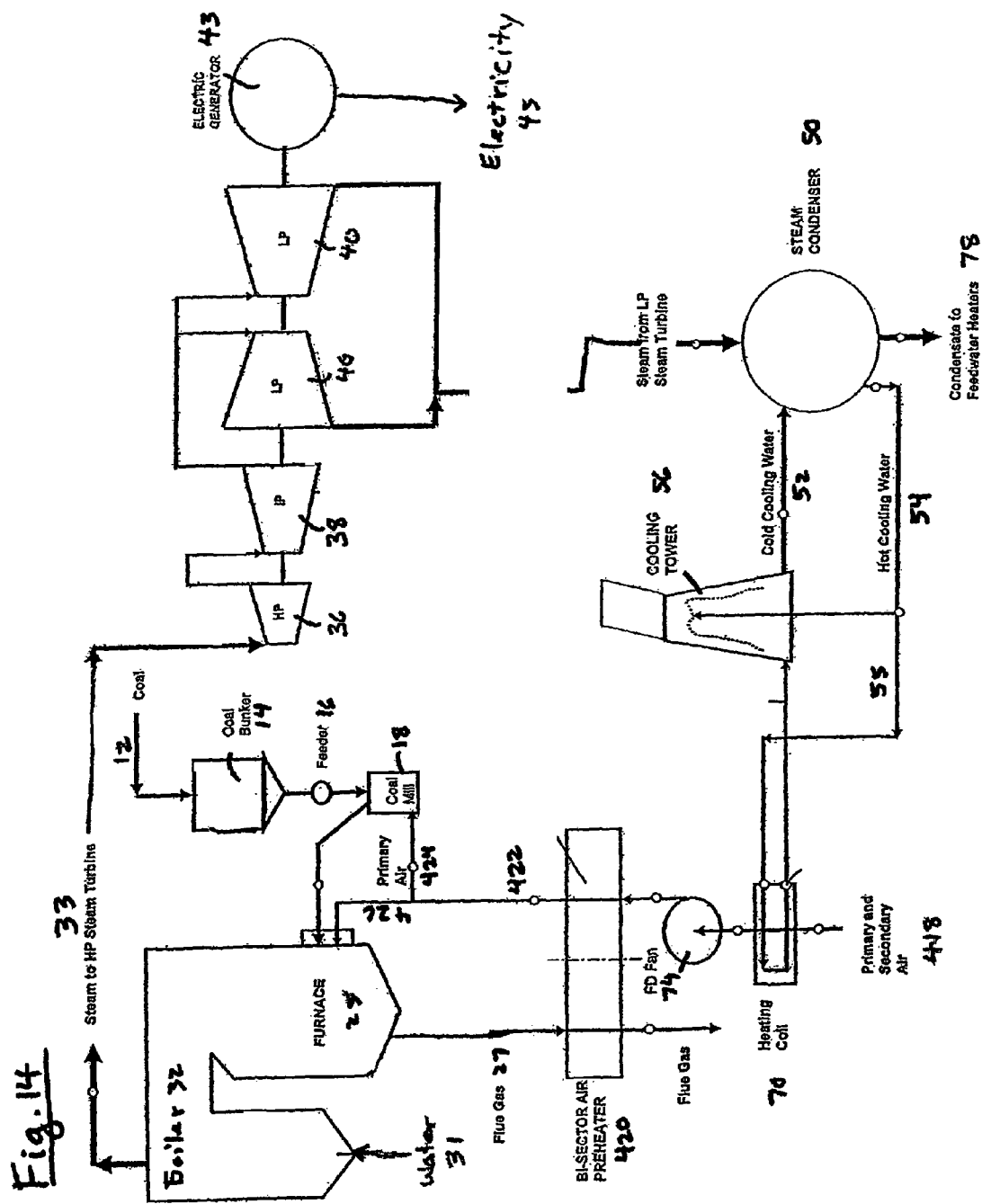
FIG. 14 illustrates a closed-cooling circuit with a bisector air pre-heater.

Meanwhile, FIG. 14 shows an alternative embodiment of the FIG. 13 arrangement in which hot condenser cooling water 54 is used to heat the heat exchanger 70. In this case, however, a bi-sector rotating regenerative air pre-heater 420 is used to further heat the primary and secondary air streams after they exit preliminary heat exchanger 70. A single air stream 418 is routed through the one side of bi-sector air pre-heater 420, and the hot flue gas 27 is directed through the other side to provide the heating medium. The further heated air stream 422 split downstream of the air pre-heater 420 into separate primary air stream 424 and secondary air stream 426. Primary air stream 424 is sent to coal mill 18 to provide positive pressure for the pulverized coal transported to furnace 25, pre-heating the pulverized coal in the process. Secondary air 426 is routed to the wind box 428 off furnace 25 whereafter it enters the furnace to promote combustion of the coal inside the furnace.

Figure 15:
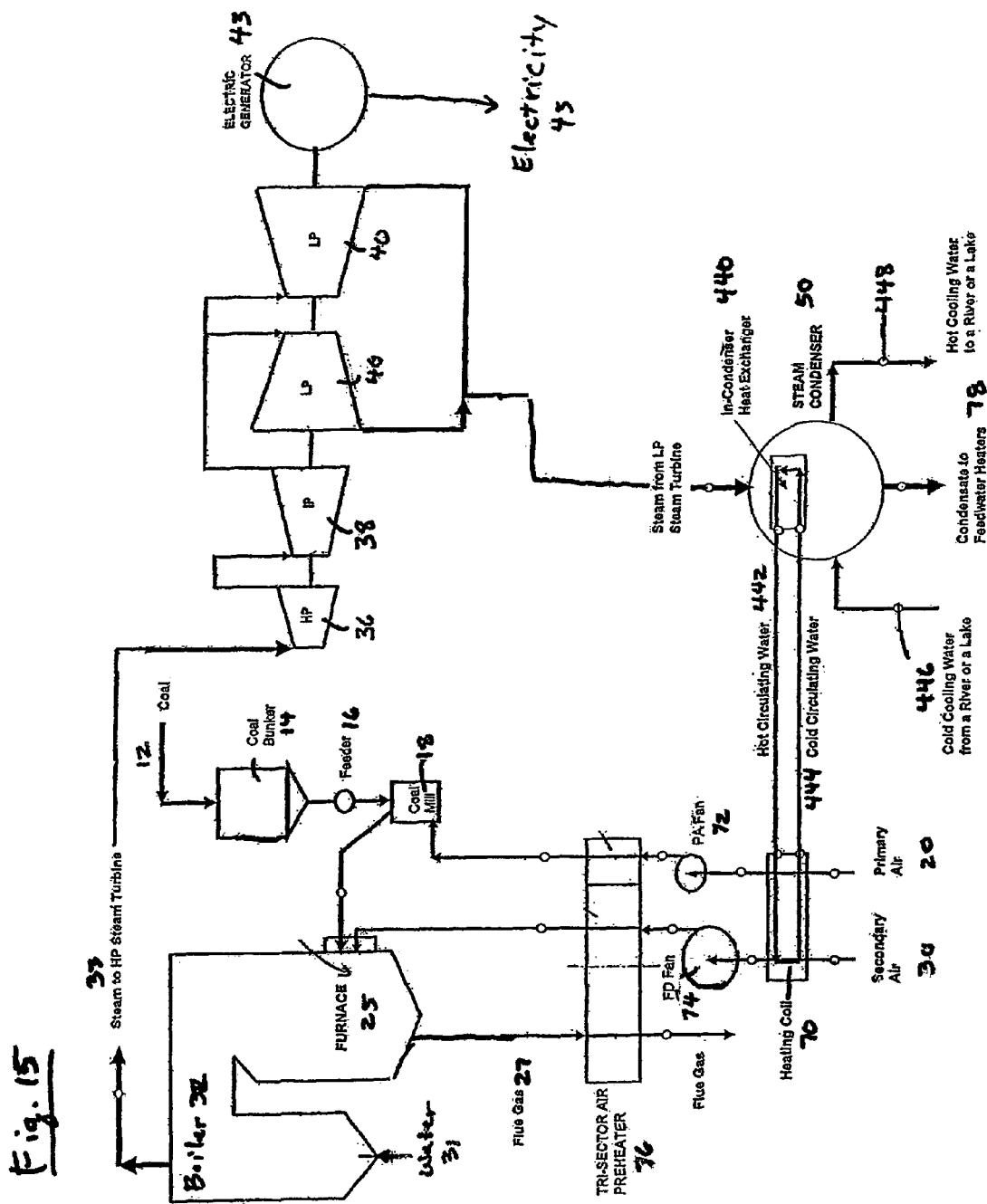
FIG. 15 illustrates an open-cooling circuit with a tri-sector rotating regenerative air pre-heater.

An open-cooling circuit with a tri-sector rotating regenerative air pre-heater is illustrated in FIG. 15. The coal-fixed power plant arrangement is similar to the one depicted in FIG. 13 in which hot condenser cooling water is used to heat preliminary heat exchanger 70. However, in this case condenser 50 is cooled by an open-cooling circuit, instead of cooling tower 56. Moreover, an in-condenser heat exchanger 440 is used to utilize waste heat for the inlet preheating. The separate heat exchanger 440 is placed within the shell of steam condenser 50 above the condenser tubes located therein (not shown). This design provides hot circulating water 442 that is somewhat higher in temperature than the hot condenser cooling water 54 that normally leaves stream condenser 50, and is of much higher water purity.

The hot circulating water 442 leaving in-condenser heat exchanger 440 is pumped to the air-to-water preliminary heat exchanger 70 to preheat primary air stream 20 and secondary air stream 30 before they reach tri-sector air pre-heater 76. After giving up its sensible heat within the heating coil of heat exchanger 70, the cooler cold circulating water 444 flows back to in-condenser heat exchanger 440, where it is reheated by the incoming spent turbine stream.

In an open system, cold cooling water from a lake or river 446 is used to condense the spent turbine steam in a steam condenser 50. Heat transferred from the steam to the cold cooling water 446 exits steam condenser 50 as hot cooling water 448 and is typically discharged into the same lake or river.

Figure 16:
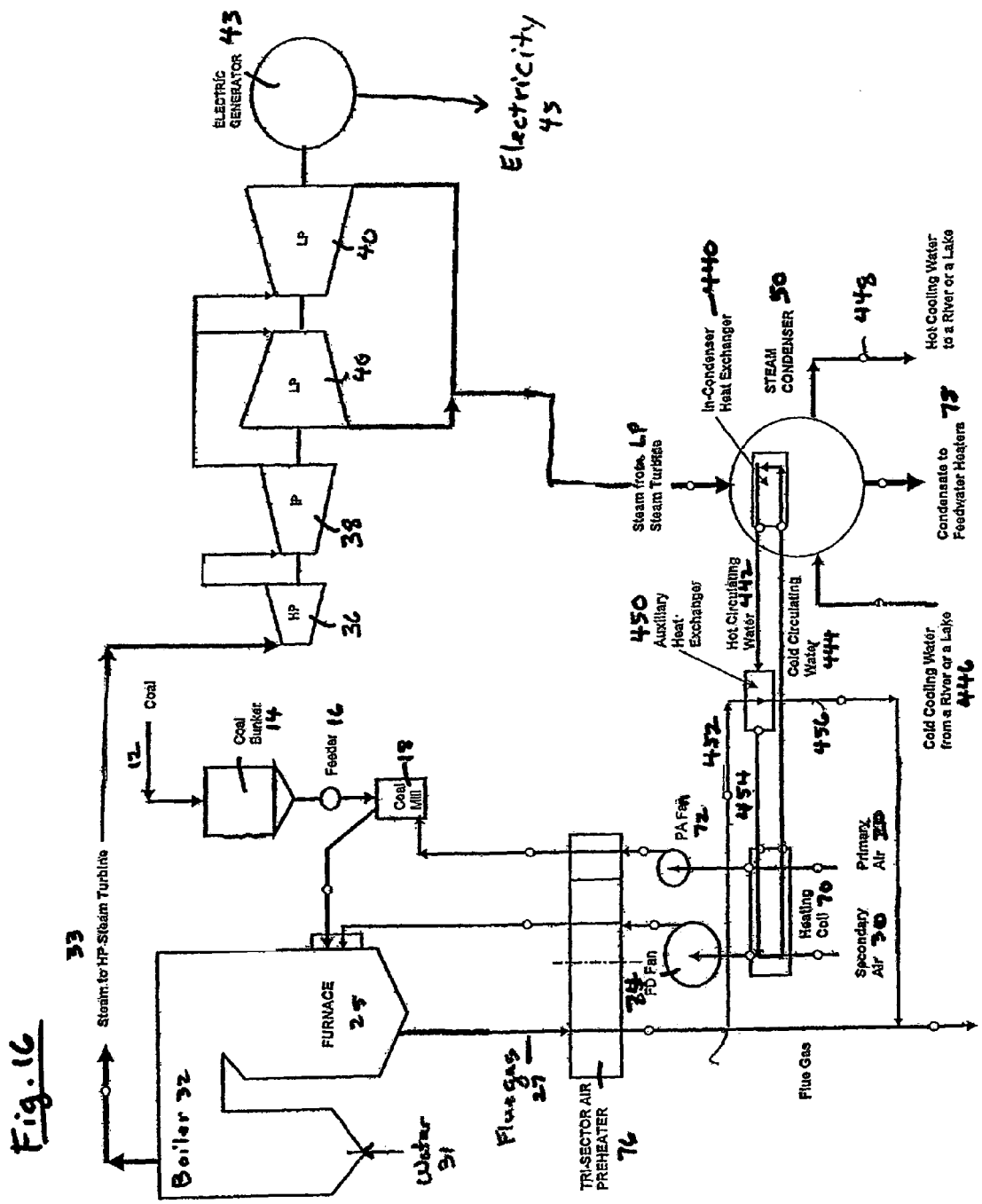
FIG. 16 illustrates a second embodiment of an open-cooling circuit with a tri-sector rotating regenerative air pre-heater.

In case an inlet air preheat temperature is needed that is higher than the one that could be achieved by the in-condenser heat exchanger 440, an auxiliary heat exchanger 450 could be added to increase the air preheat temperature, as illustrated in FIG. 16. A portion 452 of flue gas 27 leaving the tri-sector air pre-heater 76 is diverted to the auxiliary heat exchanger 450 to increase the temperature of the hot circulating water 442 leaving the in-condenser heat exchanger 440. This hotter circulating water 454 then provides sensible heat to the heating coil of preliminary air heat exchanger 70. The cooled flue gas stream 456 leaving the auxiliary heat exchanger 450 combines with the main flue gas stream 27 that has left air heater 76.

Of course, the bi-sector air pre-heater depicted in FIG. 14 could be substituted for the tri-sector air pre-heater shown in FIGS. 15-16. Many other air pre-heater arrangements are possible, and could, by way of example, include a tubular air pre-heater where the combined primary and secondary air streams 20, 30 flow through the same air pre-heater of a tubular design, and a combination of tubular and rotating air pre-heaters where the primary air stream 20 is heated in a tubular air pre-heater, while the secondary air stream 30 is heated in a bi-sector rotating air pre-heater. Also, a plate heat exchanger design available in the industry could be used instead of a tubular air pre-heater design. Implementation of the inlet air preheat coil would be similar to that described above.

Figure 17:
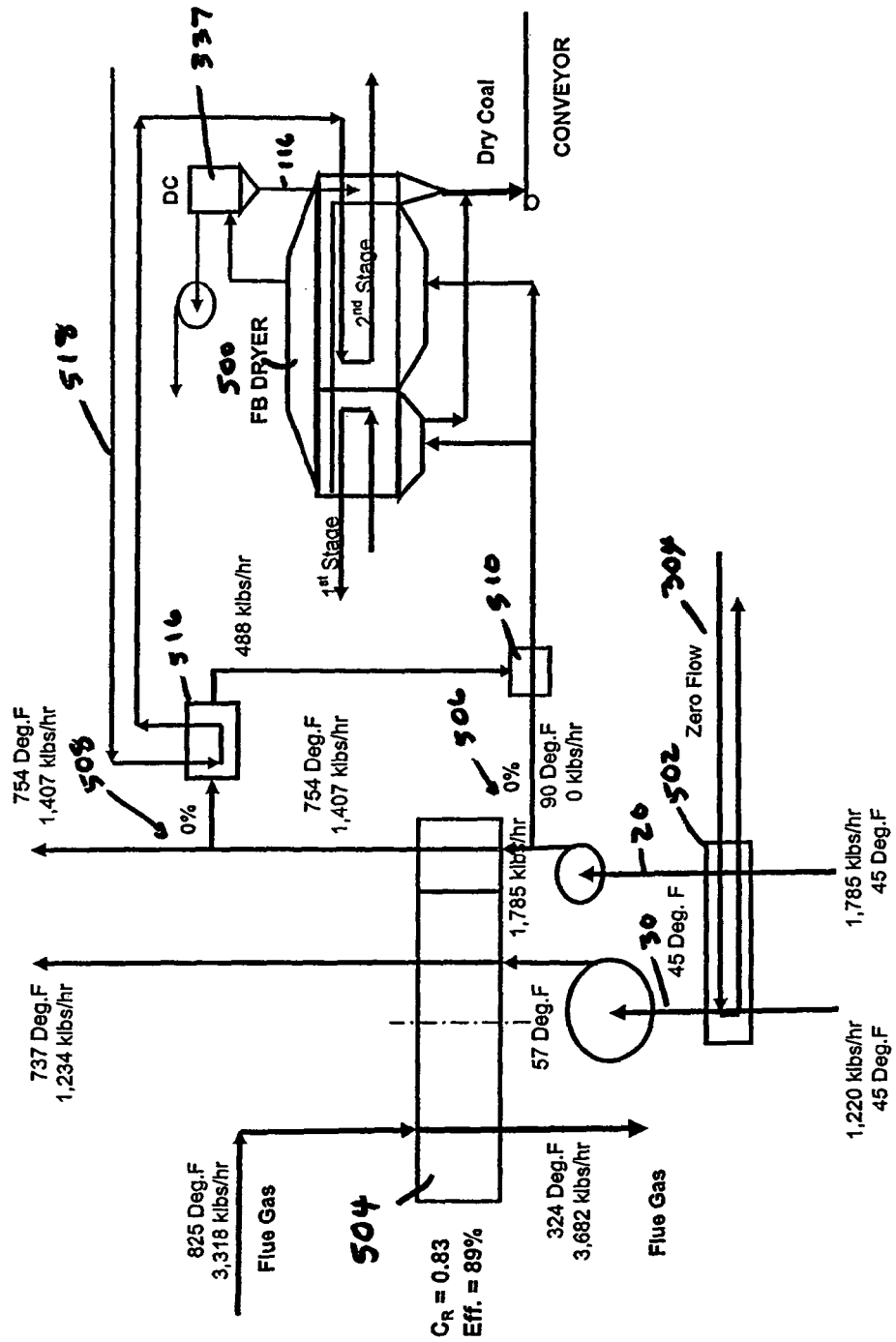
FIG. 17 illustrates typical temperature gradients and flow rates of the present invention with a two stage fluidized bed dryer shown, but not connected to the plant system.

FIG. 17 illustrates the present invention in schematic, including a two-staged fluidized bed dryer 500, a water to air pre-heater 502, and an air-to-air (flue gas to primary and secondary air) pre-heater 504. Primary air stream 20 and secondary air stream 30 are heated in heat exchanger 502, a flue gas to primary, secondary air heat exchanger. Because the fluidized bed dryer is off line, there is no transfer of primary air to the fluidized bed dryer system. This is reflected by the zero percent transfer indicated at 506 and 508 in FIG. 17. Additionally, FIG. 17 reflects that there is zero flow of hot condenser cooling water.

Figure 18:
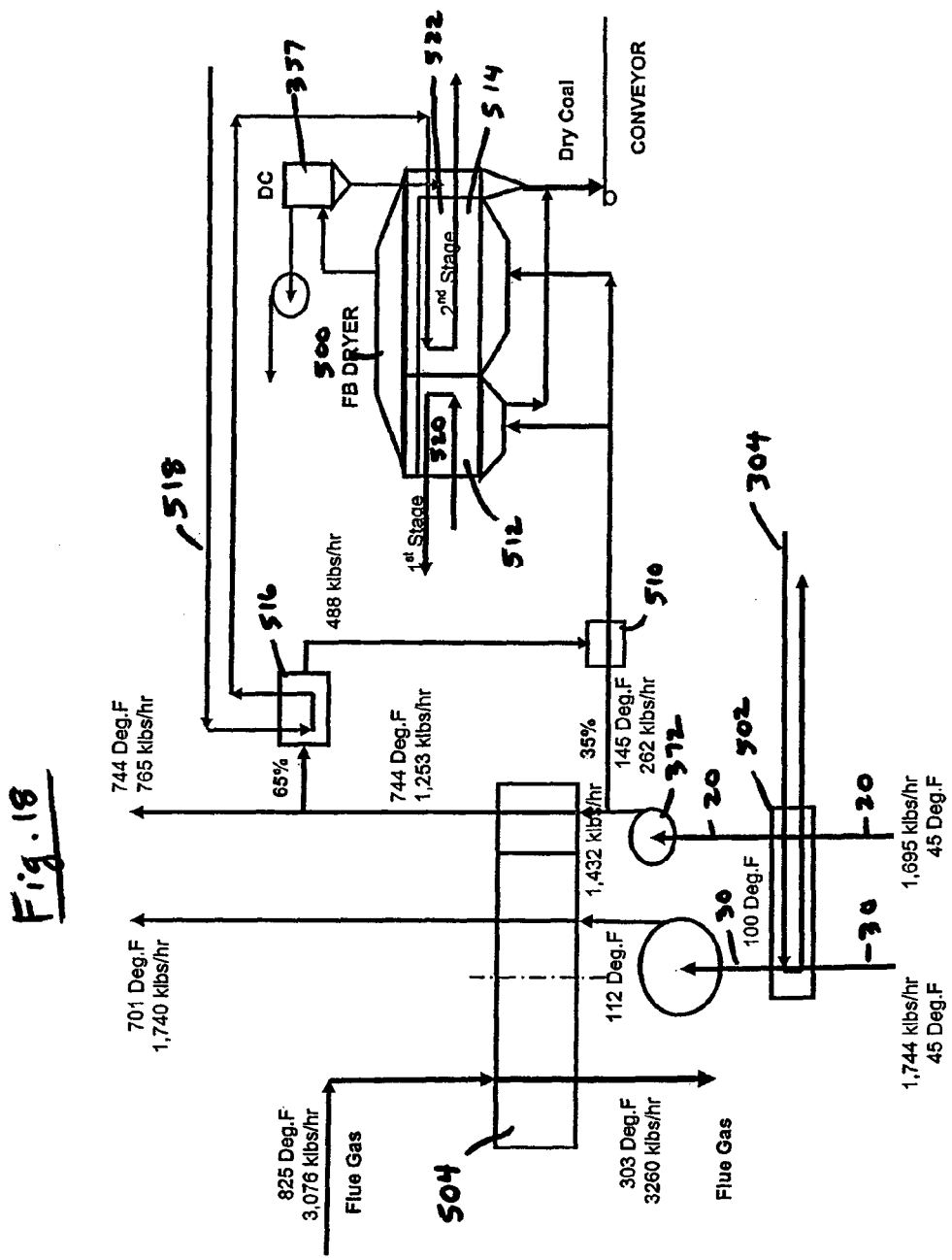
FIG. 18 illustrates typical temperature gradients and flow rates of the present invention with a two stage fluidized bed dryer integrated into the power plant system.

FIG. 18 is the same arrangement is shown as in FIG. 17, except that the hot condenser cooling water 304 flows through pre-heater 502, and the fluidized bed dryer 500 is on-line. Temperature gradients, flow rates, and percentage of flow of the primary air are also indicated. Specifically, hot condenser cooling water 304 flows through pre-heater 502 to warm primary air stream 20 and secondary air stream 30. Primary air fan 372 directs 35% of the primary air stream 20 up stream from the heat exchanger 502, to a mixing box 510. From the mixing box 510, the primary air stream 20 enters the first stage 512 and the second stage 514 of the fluidized-bed dryer 500. That portion of the primary air 20 which exists down stream of the heat exchanger 502 is directed to an air-to-air heat exchanger 504. Approximately 65% of the primary air exiting heat exchanger 504 is directed to heat exchanger 516. A transfer liquid 518 is utilized in heat exchanger 516 and direct acquired heat from the primary air stream 20 to in-bed coils 520 and 522. Heat is delivered to the heat exchanger 507 by flue gas 306.

The temperature gradients and flow rates shown in FIGS. 17 and 18 are indicative of one embodiment of a coal burning energy plant that utilizes the heat exchanger/fluidized bed dryer arrangement as illustrated, with the fluidized-bed dryer 500 off-line (FIG. 17) and on-line (FIG. 18).

With reference to FIG. 8, particle control equipment known within the industry, such as a dust collector (bag house) 357 or an electrostatic precipitator in combination with a cyclone may be used to remove elutriated fines from the air stream 116 leaving the bed dryer 170. The elutriated particle stream, collected by particle-collection equipment, and the extraction streams 176, 186 and 188 from the bottom of bed 106, can be mixed with the product stream 316, fed to the coal mill 324, and combusted in the furnace 330. Alternatively, these elutriation and extraction streams can be processed to remove undesirable impurities and enhance their value.

Figure 19:
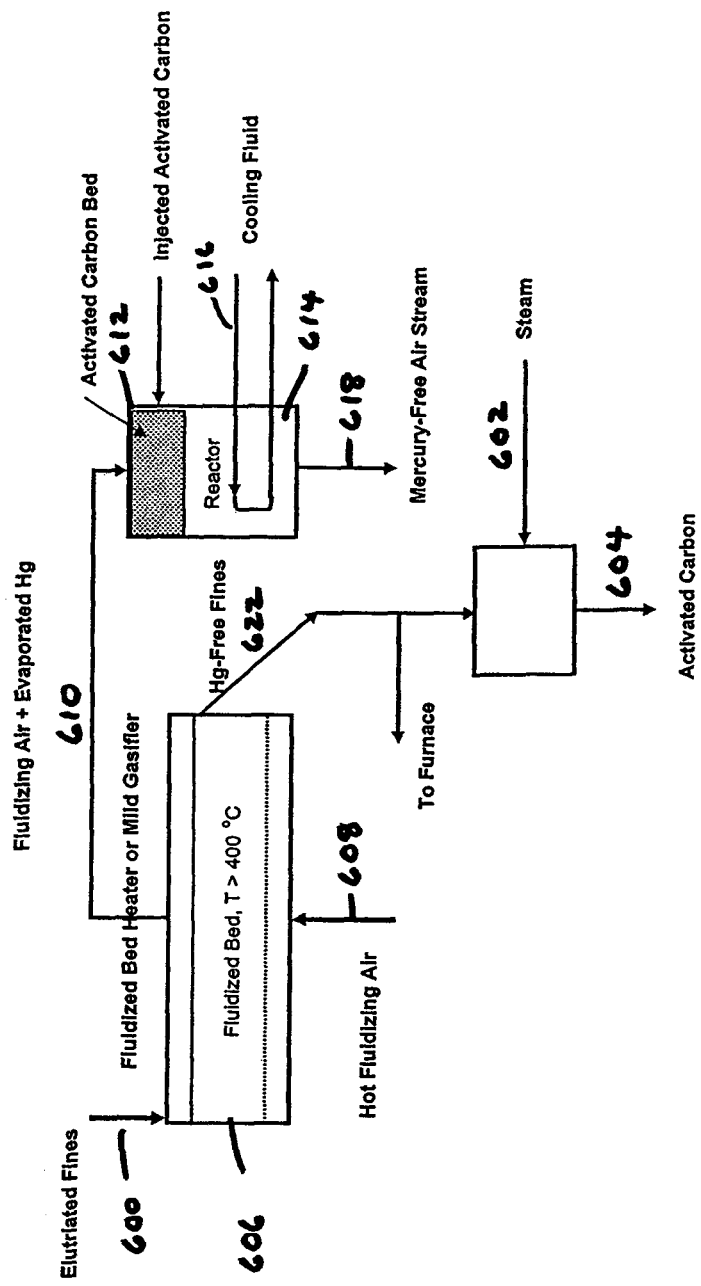
FIG. 19 is a schematic diagram of a fluidized bed dryer in combination with means for separating contaminates from coal fines.

Elutriated particles 600 collected by particle-control equipment are typically very small in size and rich in fly ash, sulfur, and mercury. FIG. 19 is a schematic drawing indicating a process for removing mercury through the use of activated steam 602 to produce activated carbon 604. As shown in FIG. 19, elutriated particle stream 600 is heated in a fluidized-bed heater or mild gasifier 606 to a temperature of 400° F. or higher to evaporate the mercury. Fluidizing air 608, forced through the fluidized bed 608, drives out the mercury into overhead stream 610. Evaporated mercury in overhead stream 610 can be removed by existing commercially available mercury control techniques, for example, by activated carbon injected into the air stream, or the mercury-laden air stream 610 may be passed though a bed of activated carbon 612 as illustrated in FIG. 19. Since mercury concentration in the treatment stream 610 will be much higher compared to the flue gas 306 leaving the furnace 330, and the total volume of the air stream that needs to be treated is very small compared to the flue gas leaving the furnace, this will be a very efficient mercury removal process. A heat exchanger 614 through which cooling fluid 616 is circulated, may be used to cool hot mercury-free stream 618. Heat can be harvested in the cooling process and used to preheat fluidization air 620 to the fluidized bed heater or mild gasifier 606. The mercury-free fines 622 can be burned in the furnace 330 or, as illustrated in FIG. 19, can be activated by steam 602 to produce activated carbon 604. The produced activated carbon 604 can be used for mercury control at the coal-drying site or can be sold to other coal-burning power stations.

Figure 20:
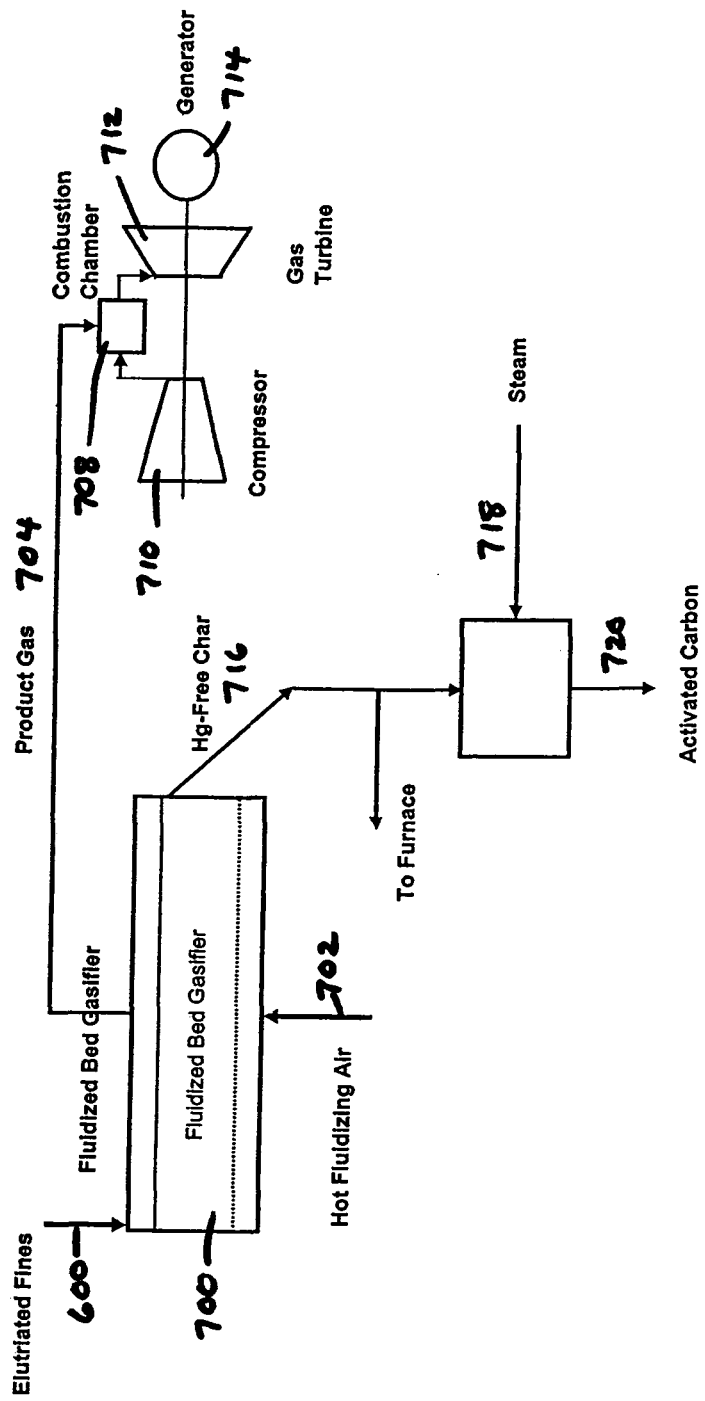
FIG. 20 is a schematic diagram of a fluidized bed dryer in combination with means for separating contaminates from coal fines and burning the contaminates to generate power.

FIG. 20 illustrates a process for gasifying elutriated fines 600. Elutriated particle stream 600 is gasified in fluid bed gasifier 700 in combination with fluidizing air 702. A gasifier is typically utilized at a higher temperature, such as 400° F., where combustible gases and volatiles are driven off. The product gas stream 704 is combusted in a combustion turbine 706 consisting of a combustion chamber 708, compressor 710, gas turbine 712 and generator 714. The remaining char 716 in the fluidized-bed gasifier will be mercury-free, and can be burned in the existing furnace 330 or treated by steam 718 to produce activated carbon 720.

Extraction streams can also be rich in sulfur and mercury. These streams can be removed from the process and land-filled or further processed, in a manner similar to the elutriated fines stream, to remove undesirable impurities.

Many advantages are obtained using the present system. The process allows waste heat to be derived from many sources including hot condenser circulating water, hot flue gas, process extraction steam, and any other heat source that may be available in the wide range of acceptable temperatures for use in the drying process. The process is able to make better use of the hot condenser circulating water waste heat by heating the fan room (APH) by 50 to 100° F. at little cost, thereby reducing sensible heat loss and extracting the heat from the outlet primary and secondary air streams 20, 30 exiting the air pre-heater. This heat could also be extracted directly from the flue gas by use of the air preheat exchanger. This results in a significant reduction in the dryer air flow to coal flow ratio and size of the dryer required.

The dryer can be designed to make use of existing fans to supply the air required for the fluidized bed by adjusting bed differentials and dust collector fan capabilities. The beds may utilize dust collectors of various arrangements, some as described herein. The disclosed embodiments obtain primary air savings because one effect of drier coal is that less coal is required to heat the boiler, and thus fewer mills are required to grind coal and less air flow is required to the mills to supply air to the dryer.

By integrating the dryer into the coal handling system just up stream of the bunkers, the boiler system will benefit from the increase in coal feed temperature into the mills, since the coal exits the dryer at an elevated temperature. The changes to flue gas temperature, residence time in the bed dryer, flue gas water content, and higher scrubbing rates are expected to significantly affect mercury emissions from the plant.

An advantage of pre-heating the inlet air to the APH is to increase the temperature of the heat transfer surfaces in the cold end of the APH. Higher surface temperatures will result in lower acid deposition rates and, consequently, lower plugging and corrosion rates. This will have a positive effect on fan power, unit capacity, and unit performance. Using waste heat from the condenser to preheat inlet air to the APH instead of the steam extracted from the steam turbine will result in an increase in the turbine and unit power output and improvement in cycle and unit performance. Increasing the temperature of air at the APH inlet will result in a reduction in APH air leakage rate. This is because of the decrease in air density. A decrease in APH air leakage rate will have a positive effect on the forced draft and induced draft fan power, which will result in a reduction in station service usage, increase in net unit power output, and an improvement in unit performance. For power plants with cooling towers, the use of waste heat to preheat inlet air to the APH will reduce cooling tower thermal duty and result in a decrease in cooling tower water usage.

Coal drying using the disclosed process will lower water losses in the boiler system, resulting in higher boiler efficiency. Lower sensible gas losses in the boiler system results in higher boiler efficiency. Moreover, reduced flue gas volumes will enable lower emissions of carbon dioxide, oxides of sulfur, mercury, particulate, and oxides of nitrogen on a per megawatt (MW) basis. There is also lower coal conduit erosion (e.g., erosion in conduit pipe caused by coal, particulates, and air), lower pulverization maintenance, lower auxiliary power required to operate equipment resulting in higher unit capacity, lower ash and scrubber sludge volumes, lower water usage by the plant (water previously tapped from the steam turbine cycle is unaffected), lower air pre-heater cold end fouling and corrosion, lower flue gas duct erosion, and an increase in the percentage of flue gas scrubbed. The bed dryers can also be equipped with scrubbers—devices that remove contaminates, providing pre-burning treatment of the coal. There is an infinite array of temperature levels and design configurations that may be utilized with the present invention to treat other feedstock and fuel as well.

The combination of the APH—hot condenser cooling water arrangement permits a smaller, more efficient bed for drying coal. Present systems that utilize process heat from the steam turbine cycle require a much larger bed. There is material separation in the current invention. This allows for greater drying efficiencies. The present arrangement can be used with either a static (fluidized) bed drier or a fixed bed drier. In a two-stage dryer, the relative velocity differential between the first and second stages can be adjusted. There can be various temperature gradients, and flexibility in heat ranges in the various stages to maximize desired results. In a multiple-stage fluidized bed arrangement, there is separation of non-fluidized material, re-burn, and oxygen control. In the first stage, which in one embodiment represents 20% of the dryer distribution surface area more of the air flow, mercury, and sulfur concentrations are pulled out. Because the two-stage bed dryer can be a smaller system, there is less fan power required, which saves tremendously on electricity expenses.

A significant economic factor in drying coal is required fan horsepower. The present invention can be combined with a scrubbing box. The system also provides elutriation for re-burn and oxygen control of contaminants.

From a system standpoint, there is less wear and tear and maintenance of coal handling conveyors and crushers, a decrease in the amount of ash, and reduced erosion. It is easier to pulverize coal, so there is more complete drying in the mill, less line clogging, less primary air required, and lower primary air velocities. Station service power (i.e., auxiliary power) needs will decrease, plant capacity can be increased, and scrubbers and emissions will improve.

The flow rate of flue gas 306 leaving the furnace 330 firing dried, pulverized coal 326 is lower compared to wet pulverized coal. Also, the specific heat of the flue gas 306 is lower due to the lower moisture content in the dried, pulverized coal 326. The result is reduced thermal energy of the flue gas 306 and the need for smaller environmental treatment equipment. Lower flow rates of the flue gas 306 also result in lower rates of convective heat transfer. Therefore, despite the increase in FEGT with drier fuel, less heat will be transferred to the working fluid (water or steam, not shown) in the boiler 334. For boilers with fixed heat transfer geometry, the temperature of the hot reheat steam (recycled circulating process steam) may be lower compared to operation with a wetter fuel. Some decrease in the hot reheat steam temperature could be corrected by increasing the surface area of a re-heater (not shown) or changing boiler operating conditions, such as raising burner tilts (the angle at which heat is applied to the boiler) or operating with a higher level of excess air. A new boiler could be designed for reduced flow rate of flue gas 306 through the convection pass (the exit path of the flue gas through the furnace) to achieve desired steam temperature with normal operating conditions. This will further reduce size and construction costs.

By burning drier coal, station service power will decrease due to a decrease in forced draft (FD), induced draft (ID) and primary air (PA) fan powers and a decrease in mill power. The combination of lower coal flow rate, lower air flow requirements and lower flue gas flow rate caused by firing drier coal will result in an improvement in boiler system efficiency and unit heat rate, primarily due to the lower stack loss and lower mill and fan power. This performance improvement will allow plant capacity to be increased with existing equipment. Performance of the back-end environmental control systems typically used in coal burning energy plants (scrubbers, electrostatic precipitators, and mercury capture devices) will improve with drier coal due to the lower flue gas flow rate and increased residence time.

Burning drier coal also has a positive effect on reducing undesirable emissions. The reduction in required coal flow rate will directly translate into reductions in mass emissions of $NO_x$, $CO_2$, $SO_2$, and particulates. Primary air also affects $NO_x$. With drier coal, the flow rate of primary air will be lower compared to the wet coal. This will result in a reduced $NO_x$ emission rate.

For power units equipped with wet scrubbers, mercury emissions resulting from firing drier coal may be reduced due to reduced air pre-heater gas outlet temperature, which favors the formation of $HgO$ and $HgCl_2$ at the expense of elemental mercury. These oxidized forms of mercury are water-soluble and can, therefore, be removed by a scrubber. In addition, flue gas moisture inhibits mercury oxidation to water-soluble forms. Reducing fuel moisture would result in lower flue gas moisture content, which will promote mercury oxidation to water-soluble forms. Therefore, with drier coal, mercury emissions are lower compared to usage of wetter coals.

Advantages of lower moisture content in the coal as it travels through this limited portion of the system include: drier coal is easier to pulverize, and less mill power is needed to achieve the same grind size (coal fineness); increased mill exit temperature (the temperature of the coal and primary air mixture at mill exit); and better conveying (less plugging) of coal in coal pipes which convey the coal to the furnace 24. Additionally, less primary air stream 20 will be needed for coal drying and conveying. Lower primary air velocities have a significant positive impact on erosion in coal mill 324, coal pipes, burners and associated equipment, which reduces coal pipe and mill maintenance costs, which are, for lignite-fired plants, very high.

With drier coal, the flame temperature in the furnace 330 is higher due to lower moisture evaporation loss and the heat transfer processes is improved. The higher flame temperature results in larger radiation heat flux to the walls of furnace 330. Since the moisture content of the exiting flue gas 306 is reduced, radiation properties of the flame are changed, which also affects radiation flux to the walls of furnace 330. With higher flame temperature, the temperature of coal ash particles exiting the furnace 330, is higher, which could increase furnace fouling and slagging. Deposition of slag on furnace walls reduces heat transfer and results in a higher flue gas temperature at the furnace exit. Due to a reduction in coal flow rate as fuel moisture is reduced, the amount of ash entering the boiler will also be reduced. This reduces solid particle erosion in the boiler 32 and maintenance requirements for the boiler 32 (e.g., removal of the soot that collects on the interior surface of the boiler).

The flow rate of flue gas 306 leaving the furnace 330 firing dried, pulverized coal 326 is lower compared to wet pulverized coal. Lower flue gas rates generally permit decreased size of environmental control equipment. Also, the specific heat of the flue gas 306 is lower due to the lower moisture content in the dried, pulverized coal 326. The result is reduced thermal energy of the flue gas 306. Lower flow rates of the flue gas 306 also results in lower rates of convective heat transfer. Therefore, despite the increase in FEGT with drier fuel, less heat will be transferred to the working fluid (water or steam) in the boiler system convective pass.

For economic reasons, complete drying of the coal is not needed nor is it recommended, as removing a fraction of the total fuel moisture is sufficient. The optimal fraction of removed moisture depends on the site-specific conditions, such as coal type and its characteristics, boiler design, and commercial arrangements (for example, sale of dried fuel to other power stations). Waste process heat is preferably, but not exclusively used for heat and/or fluidization (drying, fluidization air 208) for use in an in-bed heat exchanger. As has been shown, this heat can be supplied directly or indirectly in one or more stages.

The following examples further illustrate the low-temperature coal drying method using waste heat sources that forms a part of the present invention.

Example I

Effect of Moisture Reduction on Improvement in Heat Volume of Lignite Coal

Figure 21:
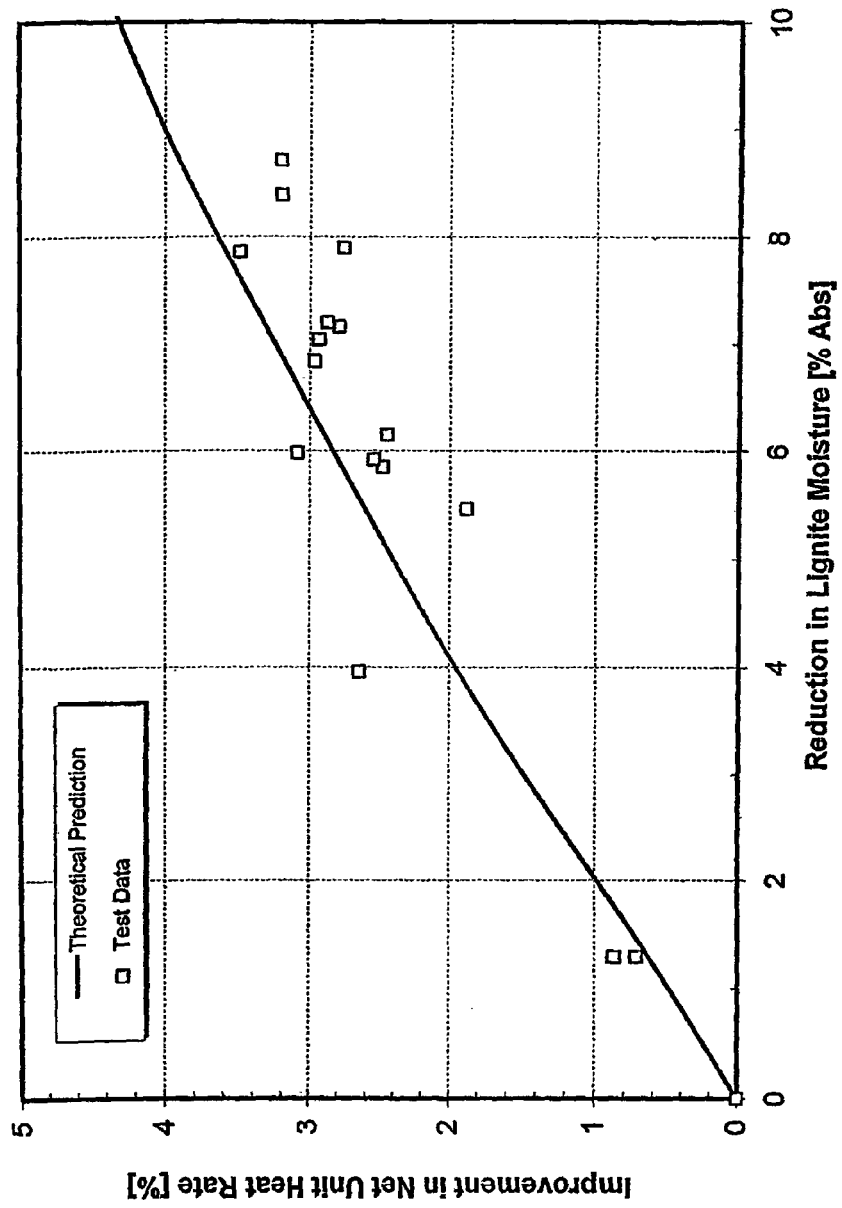
FIG. 21 is a graphical depiction of the improvement in net unit heat rate of coal at different moisture levels.

A coal test burn was conducted at Great River Energy's Coal Creek Unit 2 in North Dakota to determine the effect on unit operations. Lignite was dried for this test by an outdoor stockpile coal drying system. The results are shown in FIG. 21.

As can be clearly seen, on average, the coal moisture was reduced by 6.1% from 37.5% to 31.4%. These results were in close agreement with theoretical predictions, as shown in FIG. 21. More importantly, a 6% reduction in moisture content of the lignite coal translated to approximately a 2.8% improvement in the net unit heat rate of the coal when combusted, while an 8% moisture reduction produced approximately a 3.6% improvement in net unit heat rate for the lignite coal. This demonstrates that drying the coal does, in fact, increase its heat value.

Example II

Effect of Moisture Reduction on the Coal Composition

PRB coal and lignite coal samples were subjected to chemical and moisture analysis to determine their elemental and moisture composition. The results are reported in Table 1 below. As can be seen, the lignite sample of coal exhibited on average 34.03% wt carbon, 10.97% wt oxygen, 12.30% wt fly ash, 0.51% wt sulfur, and 38.50% wt moisture. The PRB subbituminous coal sample meanwhile exhibited on average 49.22% wt carbon, 10.91% wt oxygen, 5.28% wt fly ash, 0.35% wt sulfur, and 30.00% moisture.

An "ultimate analysis" was conducted using the "as-received" values for these lignite and PRB coal samples to calculate revised values for these elemental composition values, assuming 0% moisture and 0% ash ("moisture and ash-free"), and 20% moisture levels, which are also reported in Table 1. As can be seen in Table 1, the chemical compositions and moisture levels of the coal samples significantly change. More specifically for the 20% moisture case, the lignite and PRB coal samples exhibit large increases in carbon content to 44.27% wt and 56.25% wt, respectively, along with smaller increases in oxygen content to 14.27% wt and 12.47% wt, respectively. The sulfur and fly ash constituents increase slightly too (although not on an absolute basis?). Just as importantly, the heat value (HHV) for the lignite coal increased from 6,406 BTU/lb to 8,333 BTU/lb, while the HHV value for the PBR coal increased from 8,348 BTU/lb to 9,541 BTU/lb.

TABLE 1

| | | As-Received | | Moisture & Ash-Free | | 20% Fuel Moisture | |
|---|---|---|---|---|---|---|---|
| | Units | Lignite | PRB | Lignite | PRB | Lignite | PRB |
| Carbon | % wt | 34.03 | 49.22 | 69.17 | 76.05 | 44.27 | 56.25 |
| Hydrogen | % wt | 2.97 | 3.49 | 6.04 | 5.39 | 3.87 | 3.99 |
| Sulfur | % wt | 0.51 | 0.35 | 1.04 | 0.54 | 0.67 | 0.40 |
| Oxygen | % wt | 10.97 | 10.91 | 22.29 | 16.86 | 14.27 | 12.47 |
| Nitrogen | % wt | 0.72 | 0.75 | 1.46 | 1.16 | 0.92 | 0.86 |

TABLE 1-continued

| | Units | As-Received | | Moisture & Ash-Free | | 20% Fuel Moisture | |
|---|---|---|---|---|---|---|---|
| | | Lignite | PRB | Lignite | PRB | Lignite | PRB |
| Moisture | % wt | 38.50 | 30.00 | 0.00 | 0.00 | 20.00 | 20.00 |
| Ash | % wt | 12.30 | 5.28 | 0.00 | 0.00 | 16.00 | 6.30 |
| TOTAL | % wt | 100.00 | 100.00 | 100.00 | 100.00 | 100.00 | 100.00 |
| HHV | BTU/lb | 6,406 | 8,348 | 13,021 | 12,899 | 8,333 | 9,541 |
| $H^T$ fuel | BTU/lb | −2,879 | 2,807 | | | −1,664 | −2,217 |

Example III

Effect of Moisture Level on Coal Heat Value

Figure 22:
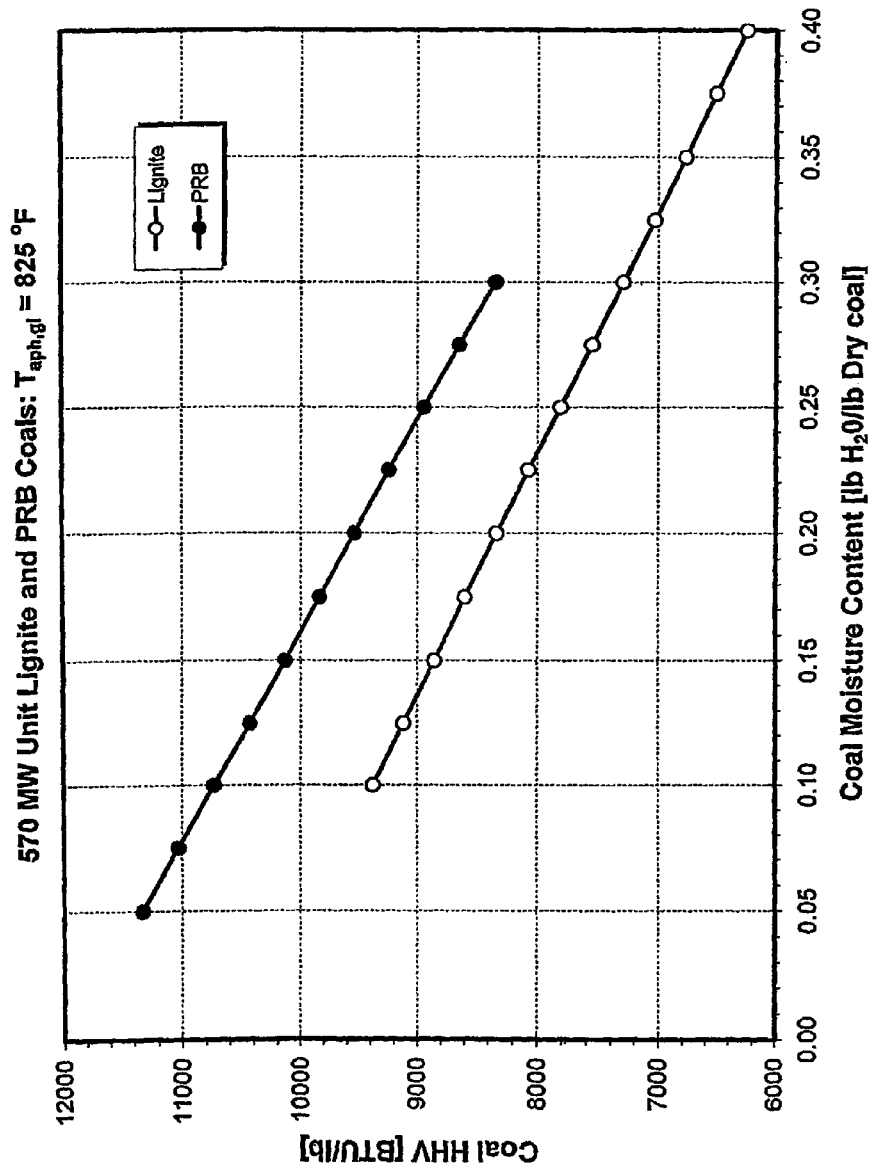
FIG. 22 is a graphical depiction of the HHV value of coal at different moisture levels.

Using the compositional values from Table 1, and assuming a 570 MW power plant releasing 825° F. flue gas, ultimate analysis calculations were performed to predict the HHV heat values for these coal samples at different moisture levels from 5% to 40%. The results are shown in FIG. 22. As can be clearly seen, a linear relationship exists between HHV value and moisture level with higher HHV values at lower moisture levels. More specifically, the PRB coal sample produced HHV values of 11,300 BTU/lb at 5% moisture, 9,541 BTU/lb at 20% moisture, and only 8,400 BTU/lb at 30% moisture. Meanwhile, the lignite coal sample produced HHV values of 9,400 BTU/lb at 10% moisture, 8,333 BTU/lb at 20% moisture, and only 6,200 BTU/lb at 40%. This suggests that boiler efficiency can be enhanced by drying the coal prior to its combustion in the boiler furnace. Moreover, less coal is required to produce the same amount of heat in the boiler.

Example IV

Effect of Coal Moisture Level on Power Plant Efficiency

For purposes of this Example IV, four different dryer system configurations (A, B, C, and D) were used. They are as follows:

Configuration A: Base Case (BC)

Figure 23:
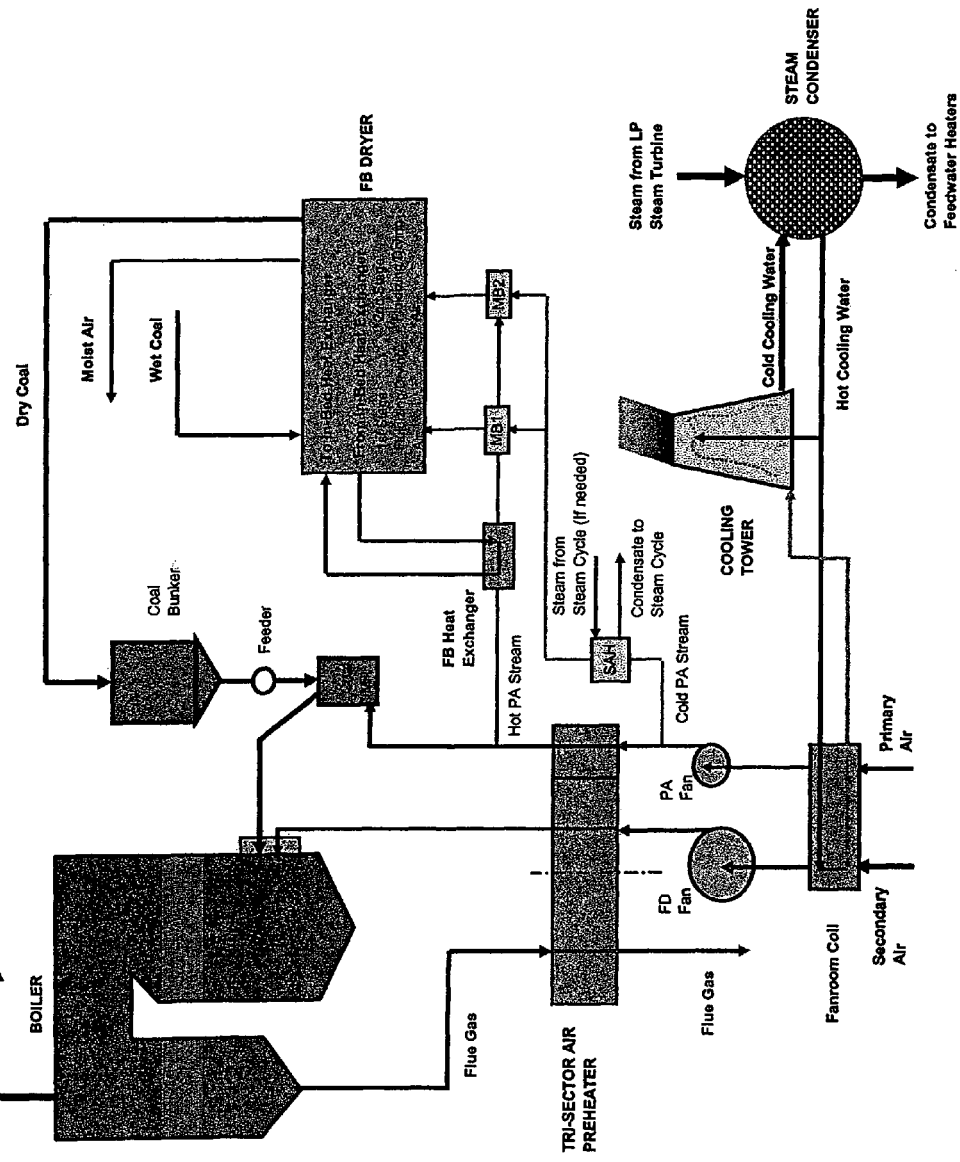
FIG. 23 is a schematic diagram of Configuration A (base case) of this invention.

The BC option is tightly integrated with the power plant equipment. It involves use of a tri-sector rotating regenerative air pre-heater (APH), a heat exchanger for preheating the primary and secondary air streams, a fluidized bed dryer, and a heat exchanger for heating of the heat transfer medium for the in-bed heat exchanger, as shown more fully in FIG. 23. In this arrangement, the APH is used to increase the temperature level of waste heat.

Waste heat from the steam condenser is used to preheat the primary air ("PA"), secondary air ("SA"), and fluidizing air ("FA") streams. This is achieved by diverting a small fraction of the hot condenser cooling water from the rest of the flow and passing it through a water-to-air heat exchanger wherein the PA, SA, and FA streams are preheated to a temperature of approximately 100° F. The cold cooling water is then circulated back to the tower. This lowers cooling tower duty, and reduces the amount of water required for a cooling tower.

Preheated PA and SA streams flow to the PA and FD fans and the, through the primary and secondary air sectors of the APH. The SA stream, heated in the SA sector of the APH, is delivered to the boiler windbox, wherein it is distributed to the burners. A portion of the PA, called herein the "hot PA," is extracted downstream of the APH. Temperature of the cold PA stream is in a 140° F. range, while the hot PA temperature is in the 750° F. range. The remaining portion of the PA is delivered to the coal pulverizers.

The hot PA stream passes through an air-to-water heat exchanger, wherein it transfers heat to the heat transfer fluid, in this case water. The hot water is circulated through the in-bed heat exchanger, which transfers heat to a fluidized bed. After passing through the heat exchanger, the hot PA stream is in the 200-240° F. range. The FA stream, as the name suggests, fluidizes and dries coal in the fluidized bed dryer.

For a dryer of the fixed geometry, i.e., given distributor area, the amount of FA (i.e., the sum of the cold and hot PA flows) is constant. In the BC configuration, the temperature of the FA stream can be controlled by changing the proportions of the hot PA and cold PA streams. As the hot PA flow increases, the amount of available heat for the in-bed heat exchanger increases. This increases the amount of coal moisture that can be removed from coal in the fluidized bed dryer. Maximum coal drying is achieved when all the FA needed for the dryer is delivered as the hot PA stream. This operational mode results in the maximum surface temperature of the in-bed heat exchanger tubes and the maximum bed temperature.

As the hot PA flow increases, the amount of the PA and total air flow (PA+SA) through the APH increases. This increase in the air flow through the APH results in a decrease in the flue gas temperature leaving the APH which, in turn, results in a lower stack loss, and an increase in boiler and unit efficiency. Therefore, the performance improvement with the BC arrangement is higher compared to the case when dried coal is delivered to the power plant and burned without the on-site drying.

The BC option will, most likely, be used to retrofit existing or design new power stations burning high-moisture lignite or PRB coals since these are, typically, equipped with tri-sector APHs.

Configuration B: High-Temperature (HT) Case

Figure 24:
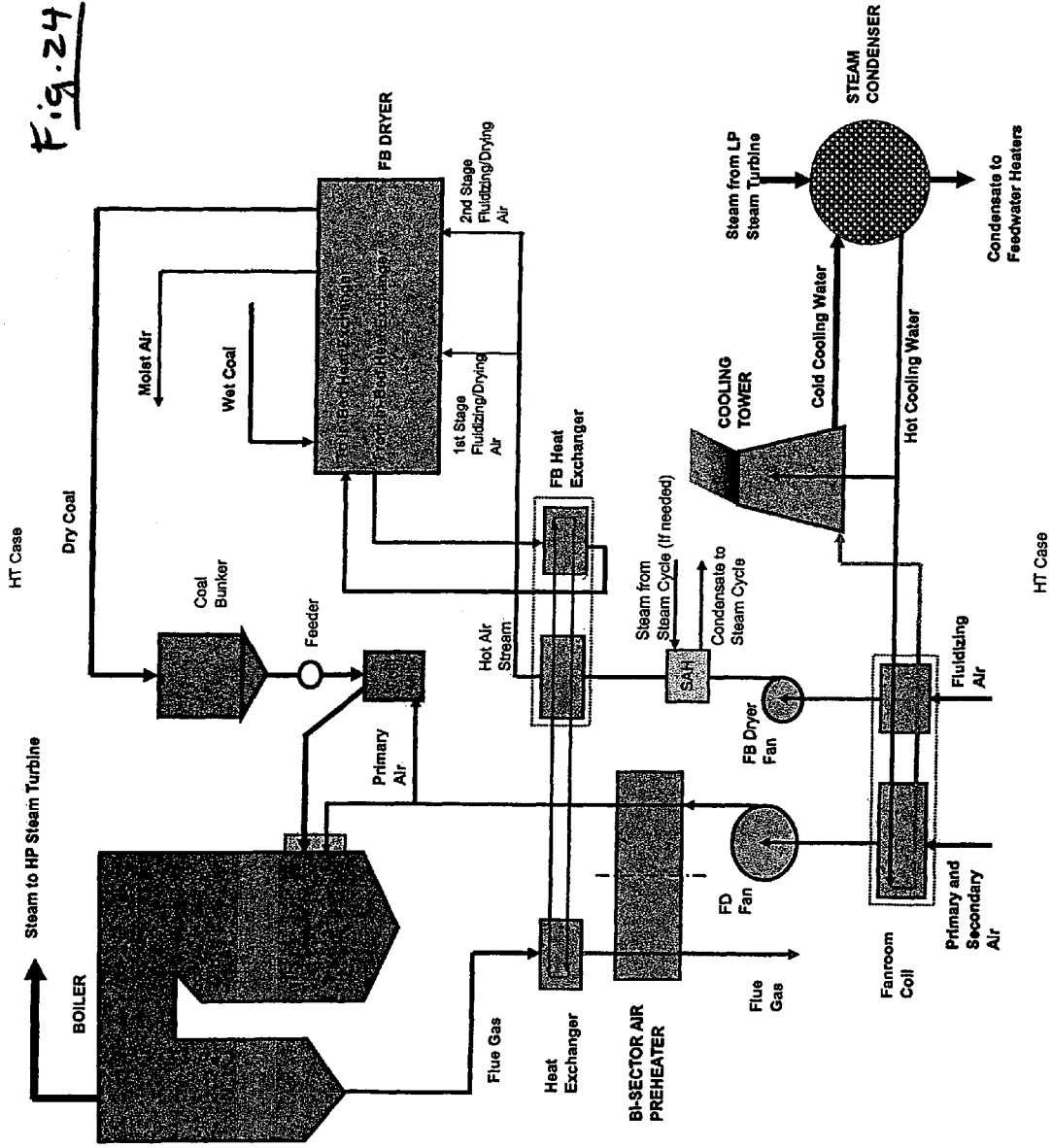
FIG. 24 is a schematic diagram of Configuration B (high temperature) of this invention.

The HT option is less tightly integrated with the power plant equipment, compared to the BC option. As shown more fully in FIG. 24, the FA stream is separate from the PA and SA streams. The HT case involves a bi-sector APH, heat exchangers for preheating the PA/SA and FA streams, a fluidized-bed dryer ("FBD") fan, fluidized-bed dryer, and heat exchangers for heating the FA stream and water for the in-bed heat exchanger by using the high-temperature flue gas.

Similar to the BC case, waste heat from the steam condenser is used to preheat the PA+SA and FA streams. This is achieved by diverting a small fraction of the hot condenser cooling water from the rest of the flow and passing it through a water-to-air heat exchanger wherein the PA+SA and FA streams are preheated to a temperature of approximately 100° F. The cold cooling water is then circulated back to the tower. This lowers cooling tower duty and reduces the amount of water required for a cooling tower.

Preheated primary (PA+SA) streams flow through the FD fan and then through the APH wherein they are further heated. The PA stream is separated from the SA stream, and is delivered to the coal pulverizers. The SA stream is delivered to the boiler windbox, wherein it is distributed to the burners.

The preheated FA stream is passed through the FGD fan, wherein its pressure is increased to about 40". The FA stream then passes through the air-to-water heat exchanger, wherein its temperature is increased to the 200-240° F. range. The heated FA stream is then delivered to the fluidized-bed dryer wherein it fluidizes and dries the coal. The water for the in-bed heat exchanger is heated in a water-to-water heat exchanger that is placed in a serial arrangement.

The heat for both heat exchangers is extracted from the hot flue gas upstream of the APH, using, in this case, water or other suitable liquid as a heat transfer medium. Other, simpler arrangements are possible. For example, the heat transfer medium could be eliminated by combining the above-mentioned three heat exchangers into one combined heat exchanger. In such an arrangement, the FA stream will be heated in the flue gas-to-FA part of the combined heat exchanger and the water for the in-bed heat exchanger will be heated in the flue gas-to-water part of the combined heat exchanger. However, for the purpose of this analysis, the details of the heat exchanger arrangement are not important.

After passing through the heat exchanger, the cooler flue gas flows through the bi-sector APH wherein it is further cooled. As a consequence of this heat exchanger arrangement, the temperature of the flue gas leaving the APH is lower compared to the case where there is no heat extraction upstream of the APH. However, since the PA+SA streams entering the APH is preheated by using waste heat from the condenser, the temperature of metal matrix in the cold end of the APH is not too low to cause increased corrosion and plugging of heat transfer surfaces that is caused by deposition of sulfuric acid.

Performance improvement that could be achieved by the HT arrangement is anticipated to be less compared to the BC configuration. Results of preliminary calculations confirm this. Also, since the FA can be heated to a temperature similar to the BC configuration, the size of the fluidized bed dryer will be similar to or the same as the BC configuration.

The HT configuration will, most likely, be retrofitted at power plants that were originally designed for Eastern bituminous ("EB") coals, but in order to reduce emissions an/or operating costs are not burning Powder River Basin ("PRB") coals or PRB/EB coal blends.

Configuration C: Low-Temperature (LT) Case

Figure 25:
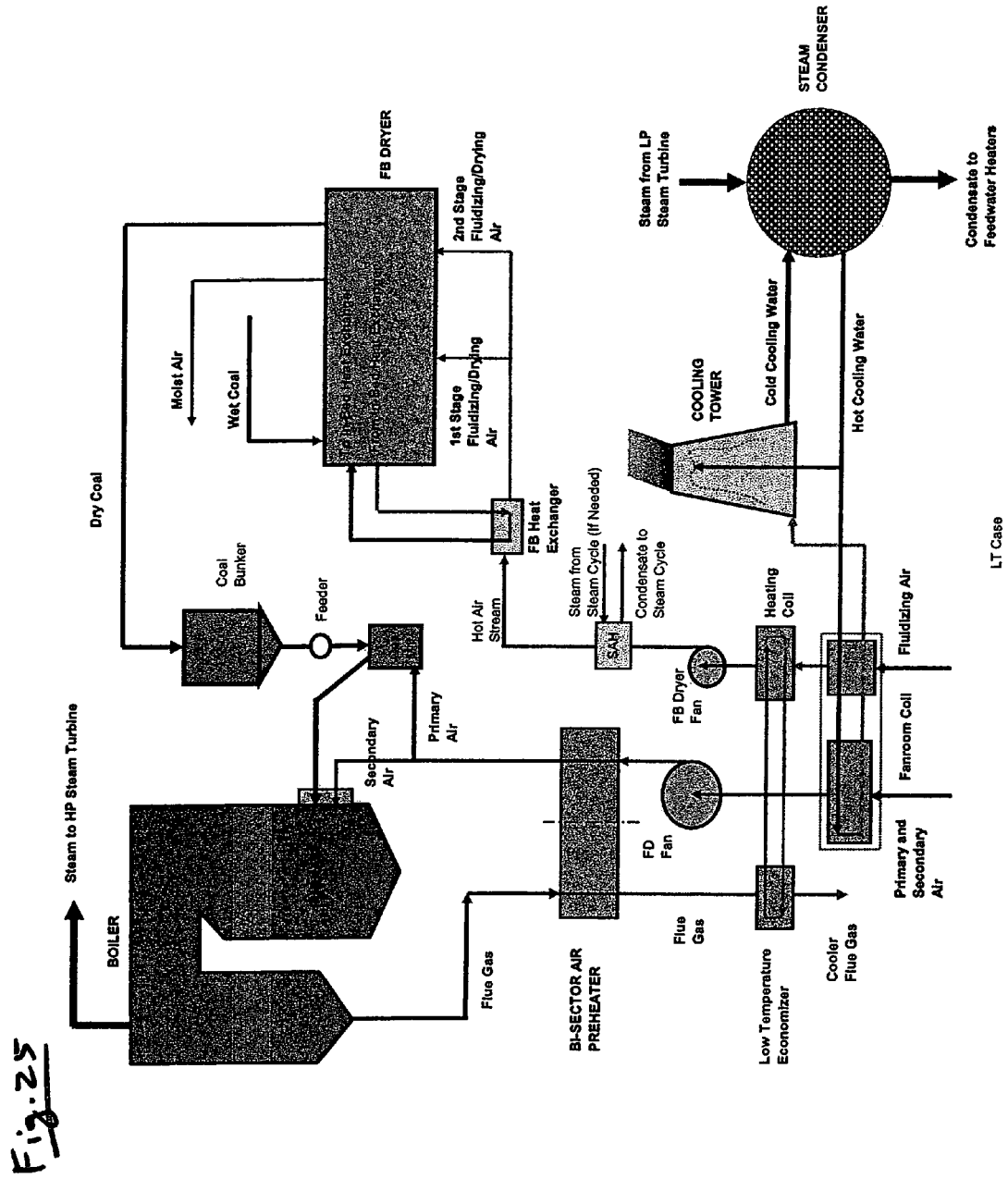
FIG. 25 is a schematic diagram of Configuration C (low temperature) of this invention.
Figure 26:
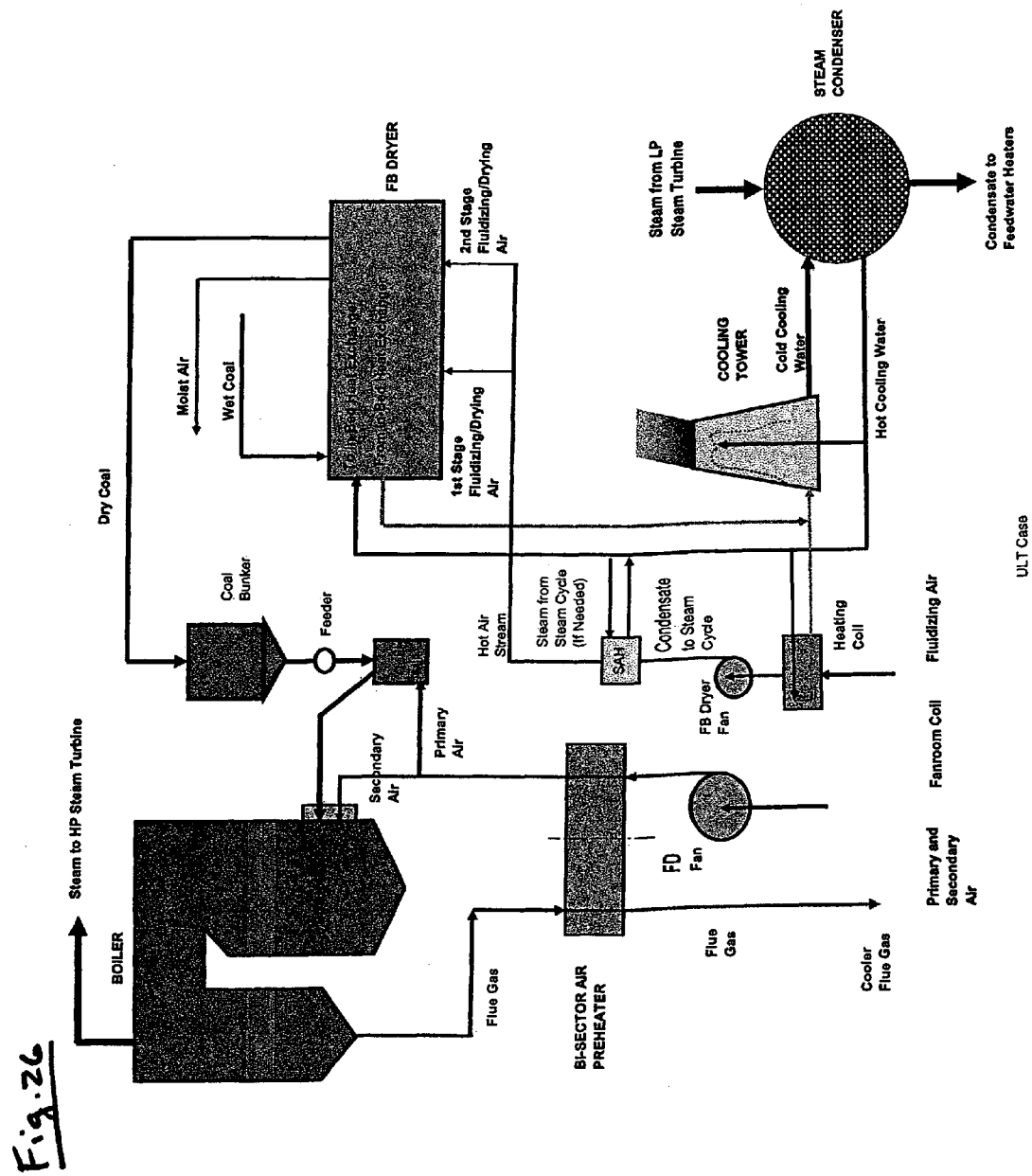
FIG. 26 is a schematic diagram of Configuration D (ultra-low temperature) of this invention.

The LT configuration is similar to the HT option. As shown more fully in FIG. 25, the major difference is that the heat for preheating the FA stream is extracted from the flue gas downstream of the APH. The FA stream is separate from the PA and SA streams. The LT configuration also involves a bi-sector APH, heat exchangers for preheating the PA/SA and FA streams, FBD fan, fluidized-bed dryer, and heat exchangers for heating the FA stream and water for the in-bed heat exchanger by using the low-temperature flue gas.

Similar to the BC and HT configurations, waste heat from the steam condenser is utilized to preheat the PA+SA and FA streams. This is accomplished by diverting a small fraction of the hot condenser cooling water from the rest of the flow, and passing it through a water-to-air heat exchanger where the PA+SA and FA streams are preheated to a temperature of approximately 100° F. The cold cooling water is then circulated back to the cooling tower. This lowers cooling tower duty and reduces the amount of water required for a cooling tower.

Preheated primary (PA+SA) streams flow through the FD fan and then through the APH where they are further heated. PA is separated from the SA and is delivered to the coal pulverizers. The SA stream is delivered to the boiler windbox, where it is distributed to the burners.

The FA stream, preheated by the waste heat from the steam condenser, is passed through the FBD fan, where its pressure is increased to about 40". The high-pressure FA stream then passes through the air-to-water heat exchanger, wherein its temperature is increased to the 250+° F. range. If a source of waste process steam is available, a steam-air heater (SAH) could be used to further increase the temperature of the FA stream, and increase drying capacity of the fluidized bed dryer. The heated FA stream then passes through the fluidized-bed heat exchanger wherein it heats the water for the in-bed heat exchanger. Cooler FA stream is then delivered to the fluidized bed dryer where it fluidizes and dries the coal.

Since in this case the temperature of the FA stream and hot water for the in-bed heat exchanger will be lower, compared to the BC and HT configurations, this will lower drying capacity of the fluidized bed dryer. As a consequence, the fluidized-bed dryer will be larger in size, compared to the BC and HT configurations. This will result in larger FA requirements and higher FBD fan power. Also, the amount of coal moisture that could be removed in the dryer will be less. Therefore, performance of the LT configuration will be less compared to the BC and HT configurations.

The LT option offers no advantage compared to the HT case. This is because the equipment is pretty much the same but is arranged differently, and system performance is lower compared to the BC and HT configurations.

A combination of the HT and LT configurations is also possible, wherein heat is extracted from the flue gas upstream and downstream of the APH. This could also be combined with the waste heat utilization form the steam condenser. Although the combined HT/LT option offers increased operational flexibility, the amount of required equipment and capital cost are significantly increased.

Configuration D: Ultra-Low-Temperature (ULT) Case

In the ULT configurations, the FA stream is separate from the PA+SA streams and is heated by using waste heat from the condenser to a temperature of approximately 100° F. The heat for the in-bed heat exchanger will be supplied directly by circulating the hot condenser cooling water through the heat exchanger tubes. This will result in tube surface temperature of approximately 100° F. No waste heat from the flue gas is used in this case.

Since the temperature of the FA stream and the water for the in-bed heat exchanger will be significantly lower compared to the previously described Configurations A, B, and C, this will require a very large FB dryer. Also, the drying capacity of the dryer and the amount of coal moisture that could be removed in the dryer will be significantly lower. However, less equipment will be needed for this option, which will reduce capital cost.

This option could be modified by using waste heat from the condenser to preheat the PA+SA stream into the APH during the winter. This will eliminate the use of process steam to keep the PA+SA stream above the freezing temperature.

Another possible modification of the ULT case involves use of the SAH that could be used to increase the temperature of the FA stream and improve dryer performance.

Figure 27:
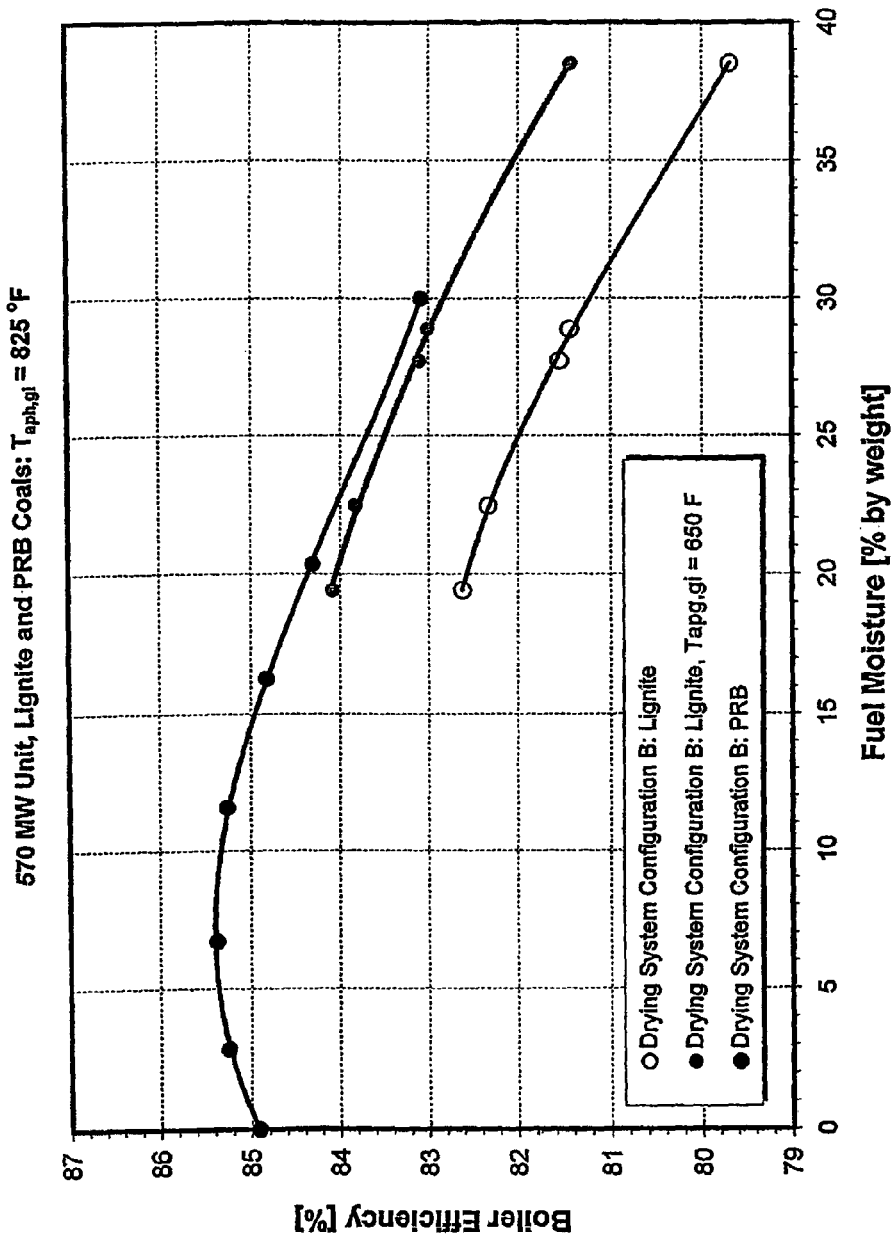
FIGS. 27-37 are graphical depictions of different measures of power plant efficiency for coals at different moisture levels using the various coal drying configurations.

The effect on boiler efficiency of lignite (825° F. vs. 650° F. flue gas) and PRB (825° F. flue gas) coal dried to different moisture levels in accordance with the Configuration B dryer system is shown in FIG. 27. Drier coals make the boiler burn more efficiently. In this case, an 8% gain in boiler efficiency was realized.

Figure 28:
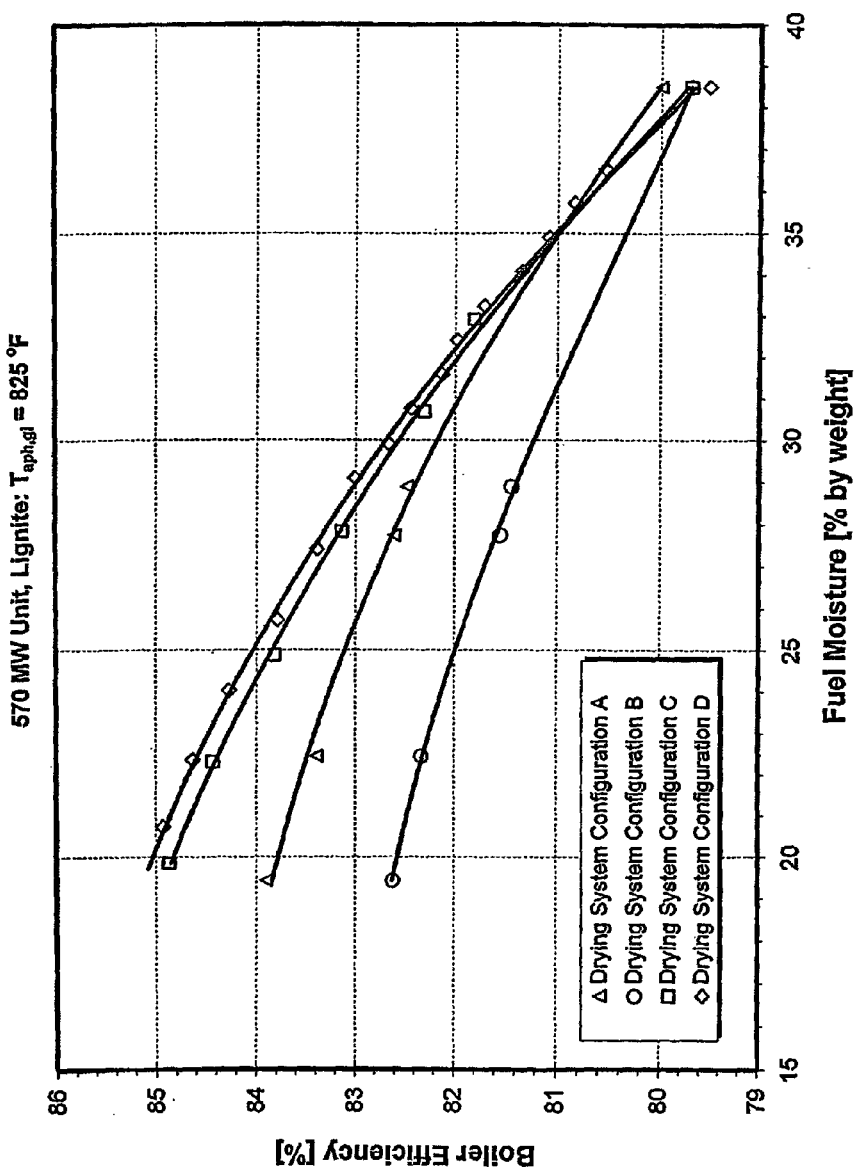

Application of the four different dryer configurations A, B, C, and D to lignite coal at an 825° F. flue gas temperature is shown in FIG. 28. The low-temperature and ultra-low-temperature configurations (C and D) provide the best increases in boiler efficiency.

Figure 29:
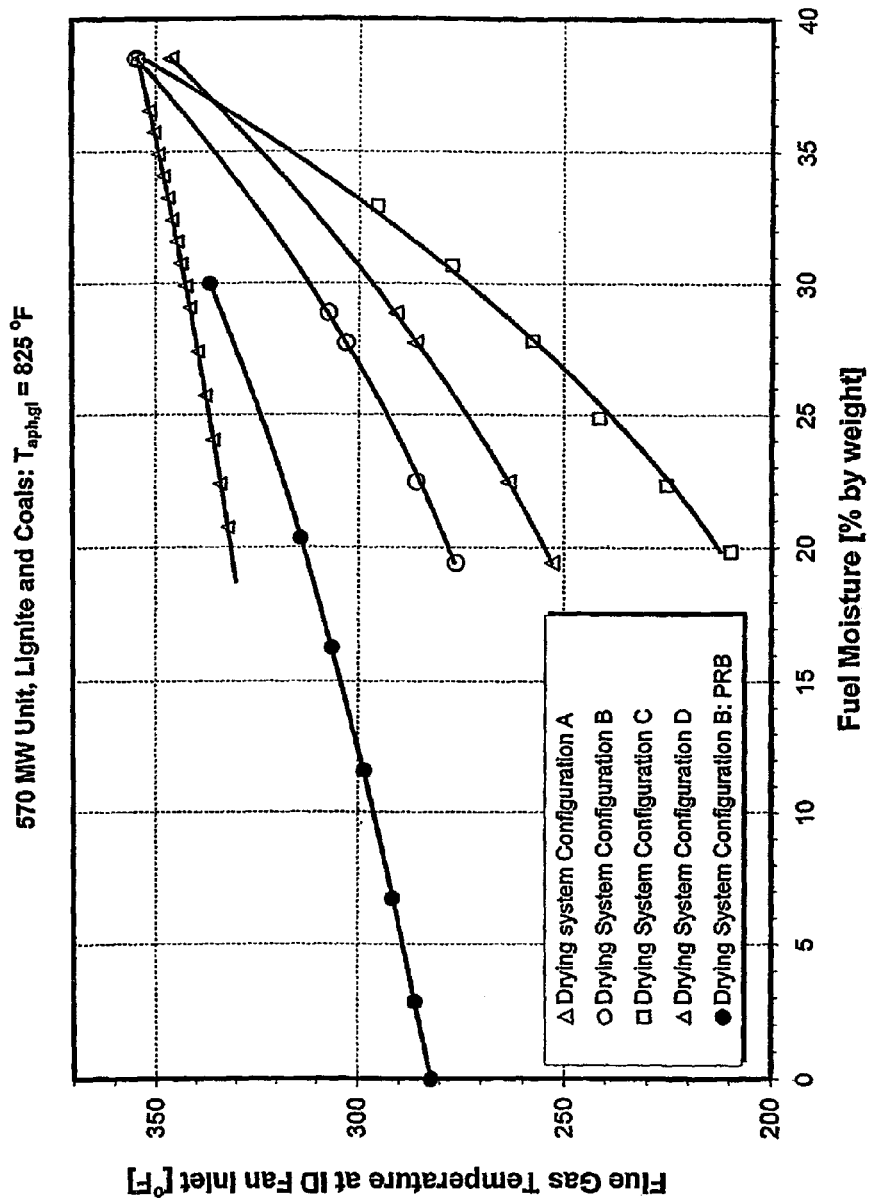

The impact on flue gas temperature exiting the APH for lignite coal using the four different configurations, and PRB coal using the high-temperature configuration is shown in FIG. 29. The flue gas for all of these options entered the APH at 825° F. The lowest flue gas exit temperature (210° F. for 20% moisture coal) is realized for the low-temperature configuration (C). This means that the heat content contained within the flue gas entering the APH was used more productively with this option.

Figure 30:
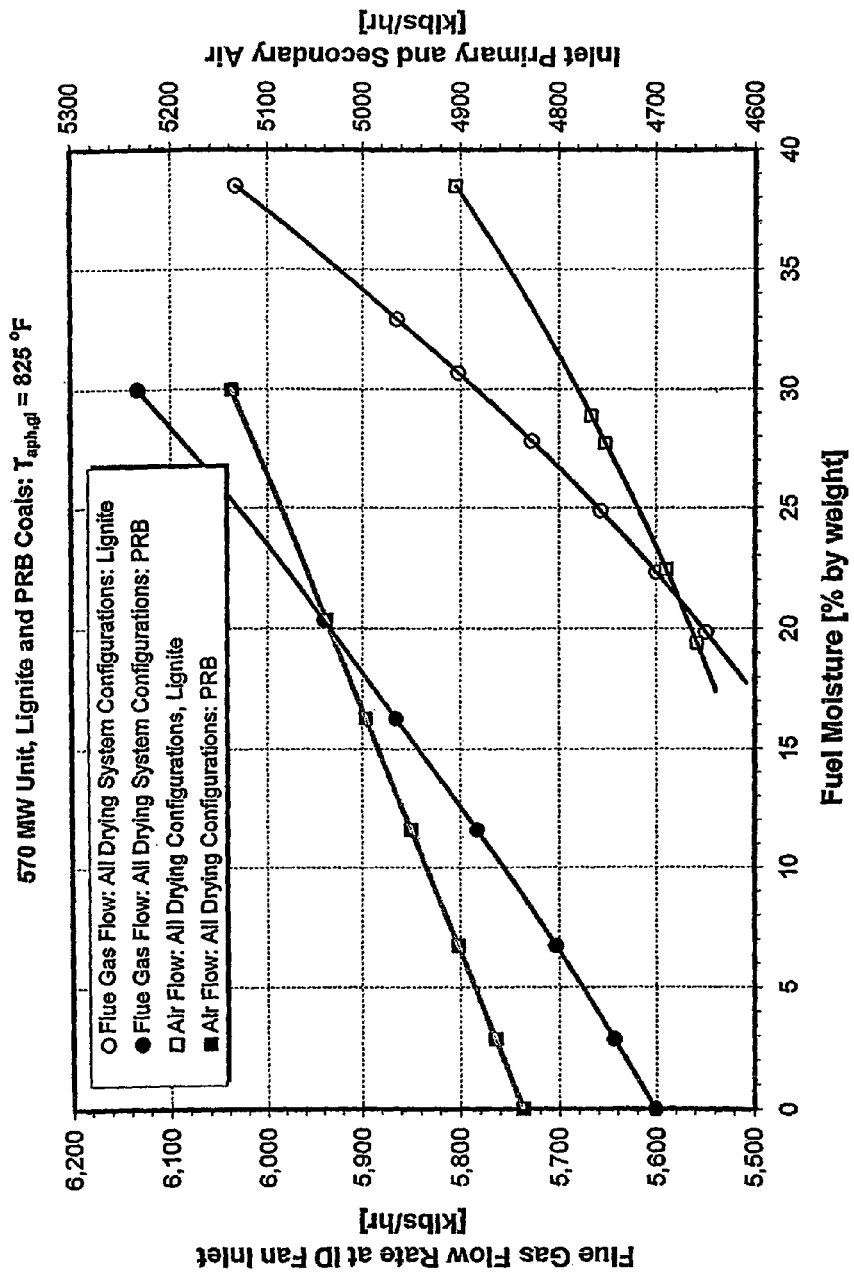

The impact on the flow rate of the flue gas out of the APH (ID fan inlet) for the lignite and PRB coals is shown in FIG. 30. Lower flow rates are produced when lower-moisture coal is burned in the boiler. Thus, smaller scrubbers and precipitators will be required to treat the flue gas when drier coals are used. Moreover, lower levels of energy will be used to run the IP fans needed to pump the flue gas.

Also shown in FIG. 30 is the impact on the air flow entering the boiler for lignite and PRB coals at different moisture levels. At lower moisture levels, this flow rate will also be reduced. Therefore, smaller fans will be needed, and energy costs can be saved.

Figure 31:
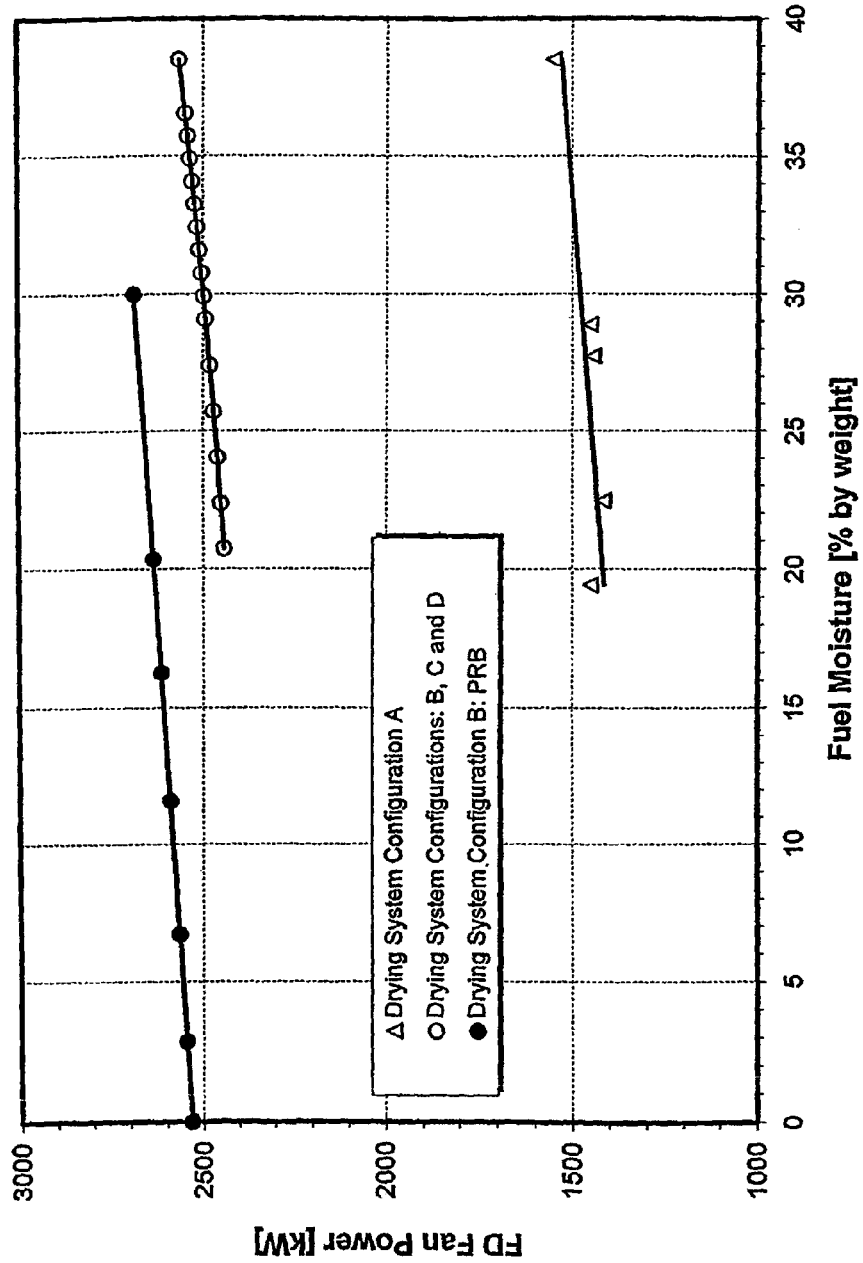

The impact on the power requirements for the FD fan used to drive the secondary air flow is shown in FIG. 31. These power requirements drop slightly at lower moisture levels in the coal, because the air flows are smaller.

Figure 32:
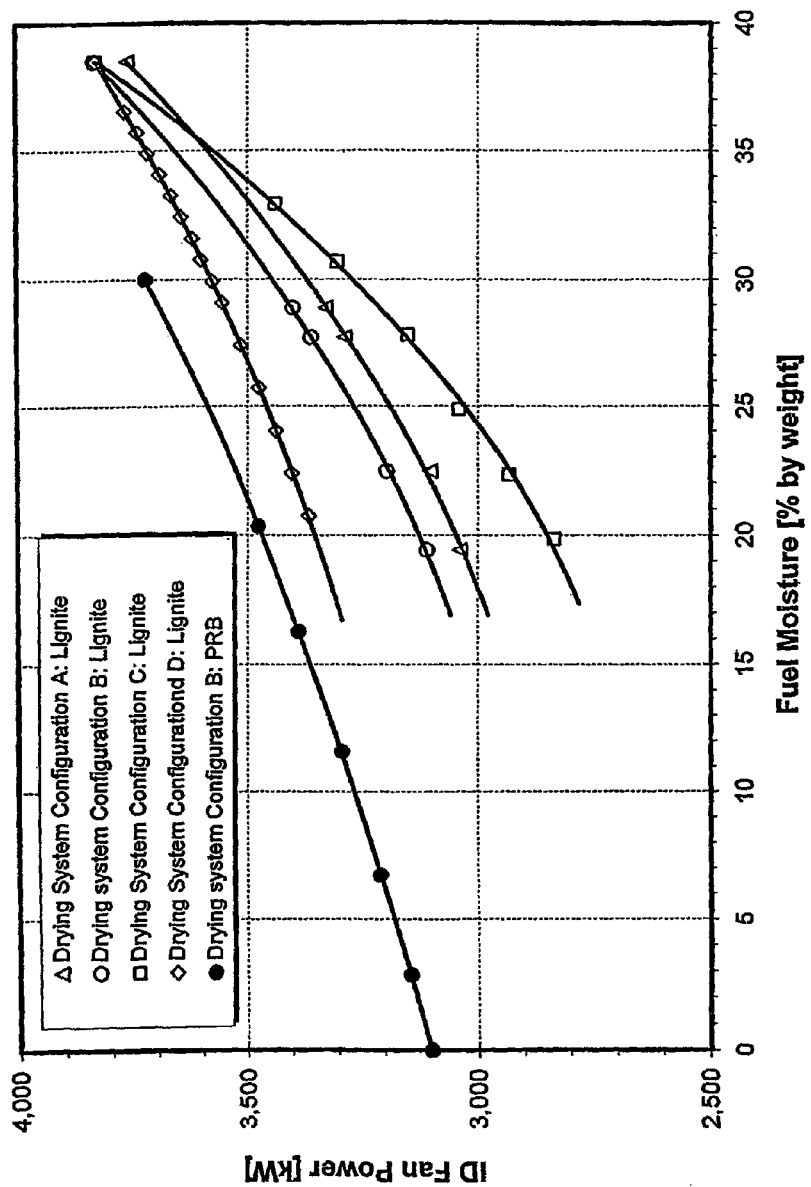

The impact on the power requirements for the ID fans used to drive the flue gas for lignite coal for the four different configurations and PRB coal is shown in FIG. 32. Much bigger energy savings are realized in this area. Again, low-temperature Configuration C seems to provide the largest energy requirement drop. This is very significant, since the power plant uses four ID fans, thereby multiplying four-fold these results.

Figure 33:
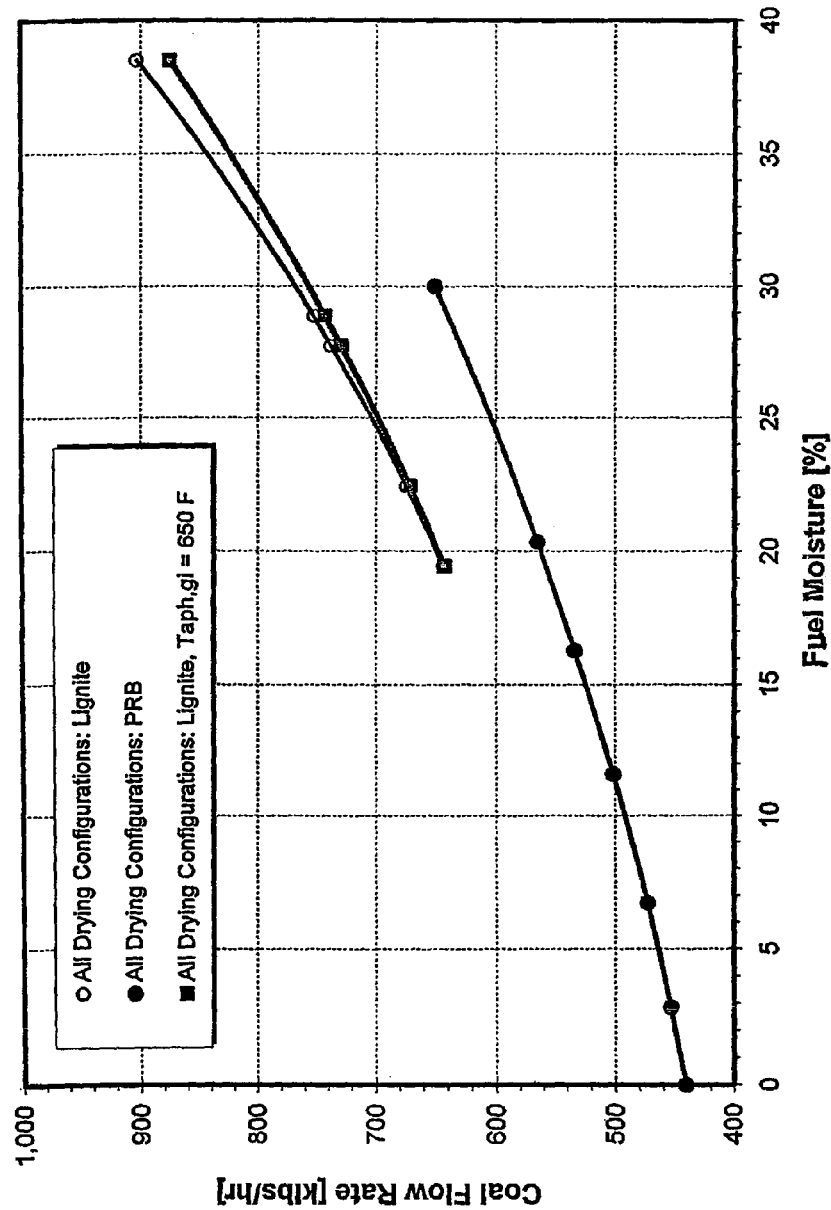

The impact on coal flow rates for lignite (825° F. vs. 650° F. flue gas) and PRB coal (825° F. flue gas) is shown in FIG. 33. The needed coal flow drops because of the boiler efficiency gains and coal weight losses due to the drying process. Therefore, the coal does not need to be fed as quickly to the boiler to produce the necessary heat to run the power plant.

Figure 34:
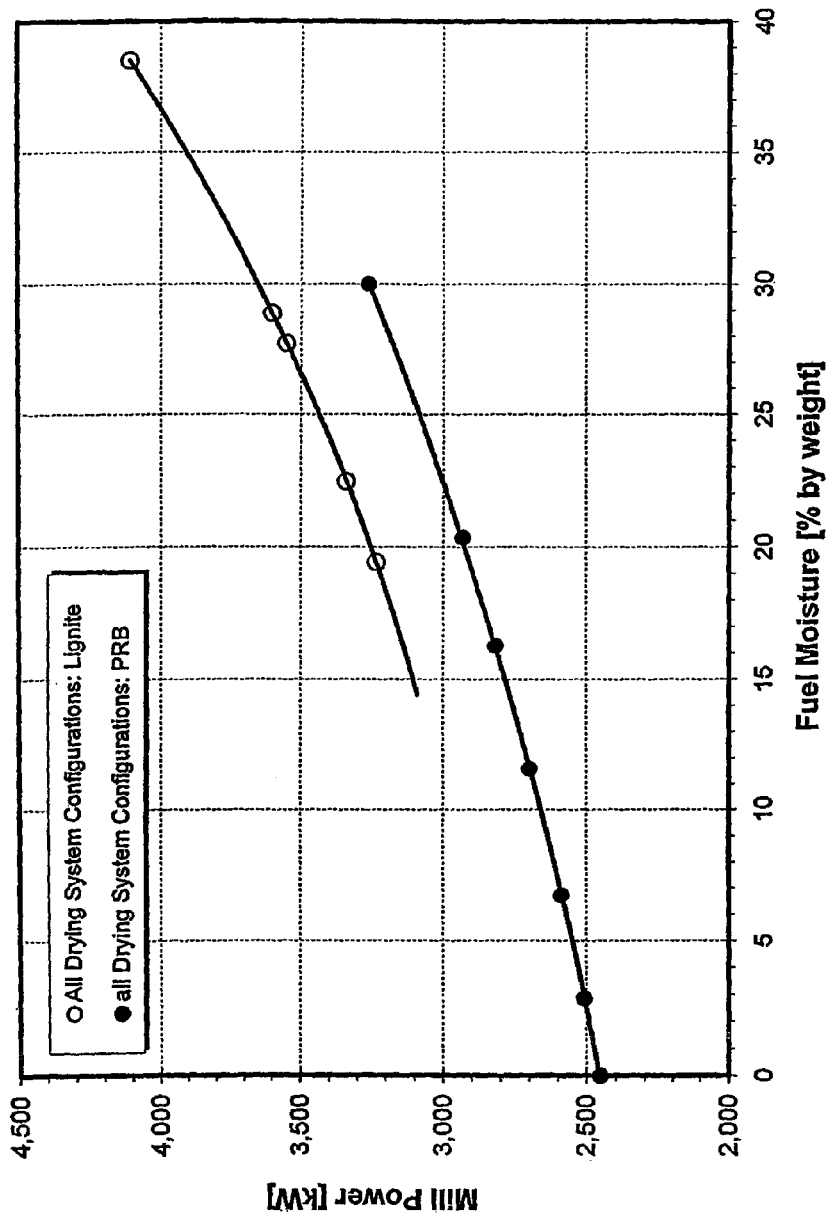

As shown in FIG. 34, lower mill power is required to run the pulverizers at lower coal moistures. A 20% drop in power requirements is realized. This is significant, since power plants may need 6-8 pulverizers to grind the coal.

Figure 35:
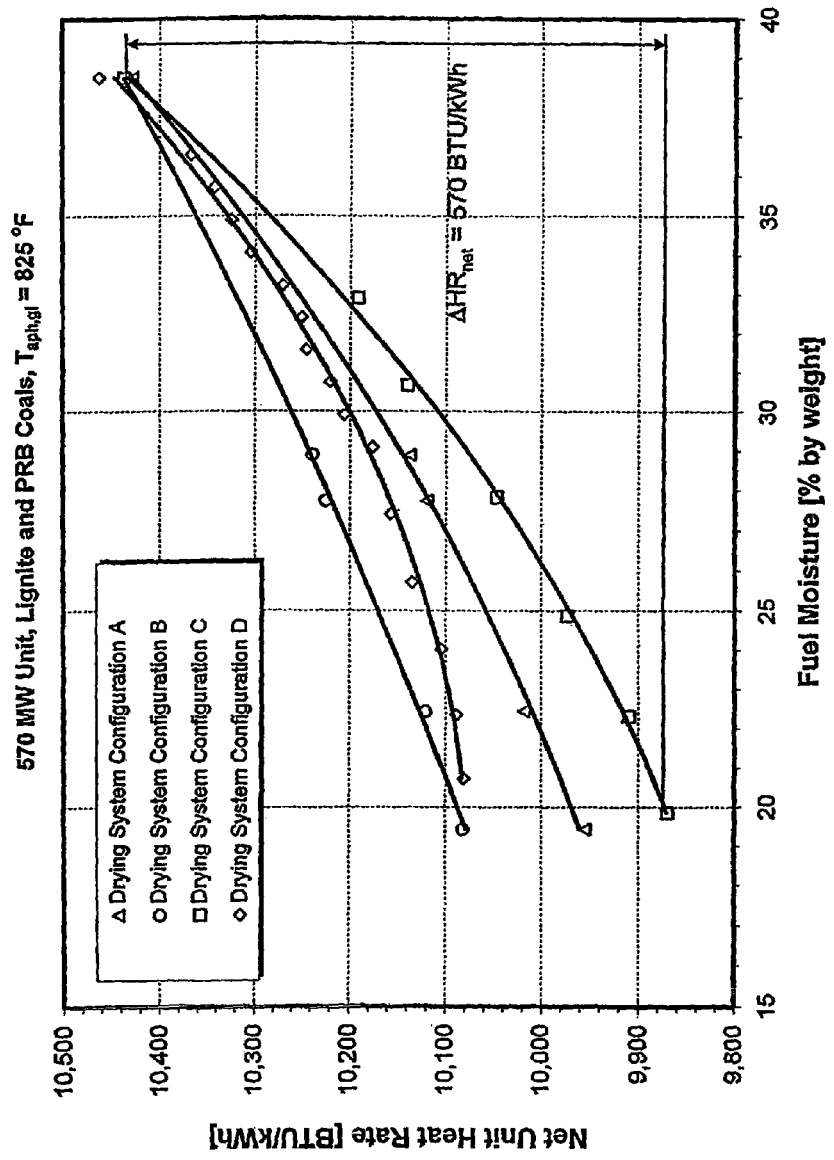
Figure 36:
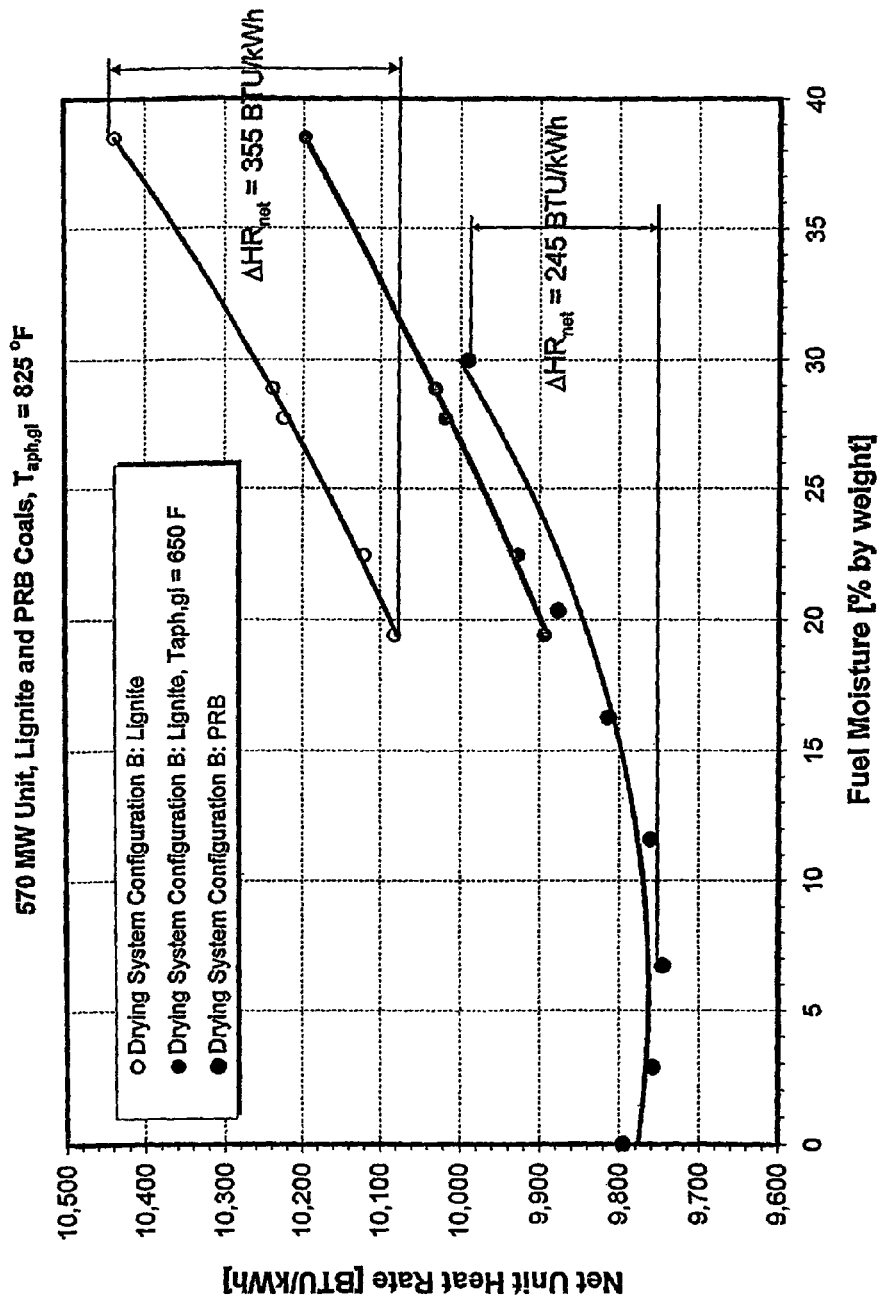

The impact on the net unit heat rate for the different dryer configurations used to dry the lignite and PRB coals is shown in FIG. 35. Net unit heat rate combines the increases in boiler efficiency, turbine efficiency, and reduced station service requirements produced by the drying systems. This indicates the total energy needed to produce electrical power. As shown in FIG. 35, the net unit heat rate is reduced for lower moisture coals. The low-temperature configuration provides the best results, although the base case is also good.

Figure 37:
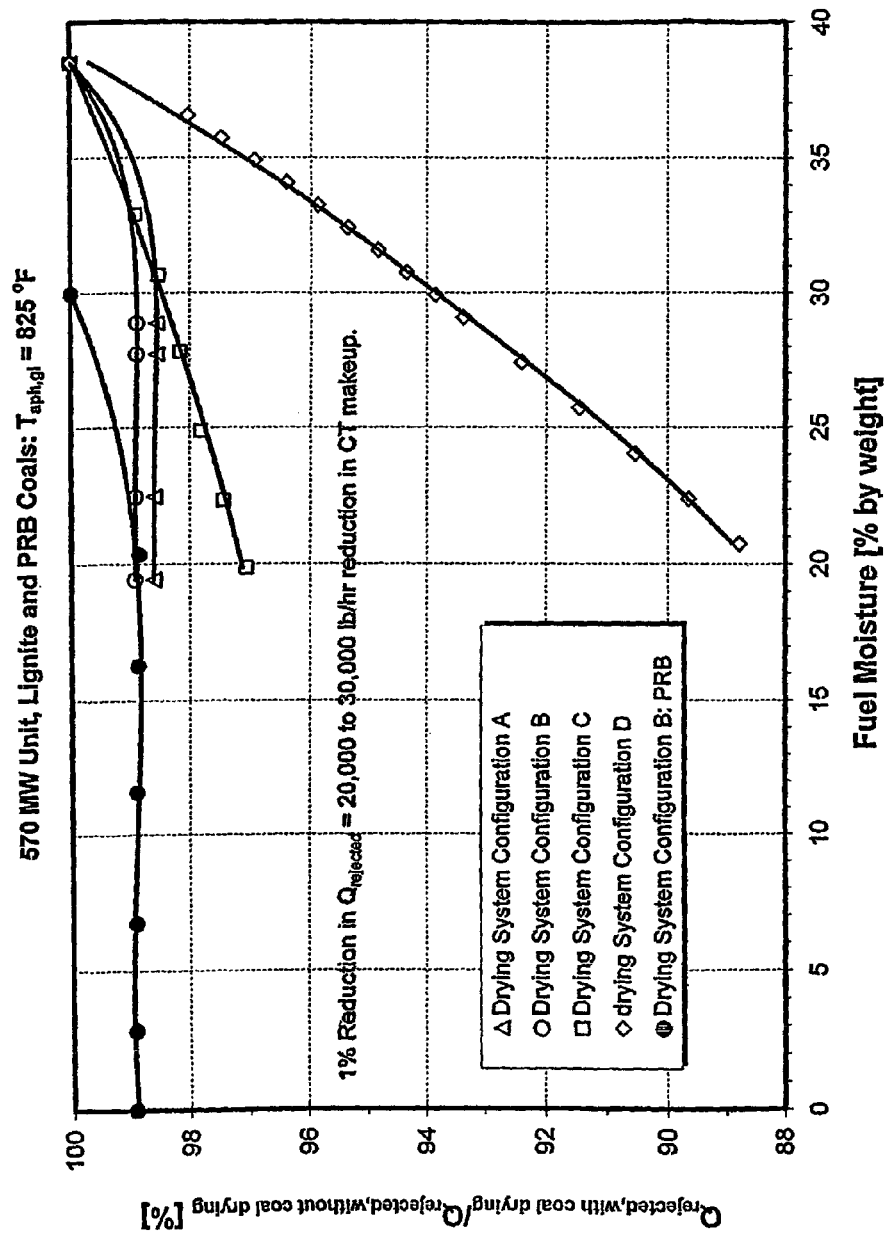

FIG. 37 shows the impact heat rejected to the cooling tower for the different drying configurations. Because some of the hot condenser cooling water has been diverted to heat the fan room coils, less heat is lost in the cooling tower. The ultra-low-temperature option provides the best results with the low-temperature option the next best.

These results collectively demonstrate that use of waste heat sources available at a power plant in the low-temperature drying process of the present invention to dry the coal feed significantly enhances the efficiency of the power plant operation. Improvements in boiler efficiency, net unit heat rate, and fan and mill power were all produced. While the magnitude of these improvements depend upon the specific coal drying system configuration used, reductions in lignite moisture content from 38.5% to 20% result in heat rate improvements within the 350-570 BTU/kWh (3.4-5.4%) range. Performance improvements for PRB coal are somewhat smaller, principally due to the fact that PRB coal starts out with 30% moisture instead of the 38.5% moisture level of lignite coal.

The above specification and drawings provide a complete description of the structure and operation of the open air, low temperature drying process of the present invention. However, the invention is capable of use in various other combinations, modifications, embodiments, and environments without departing from the spirit and scope of the invention. For example, it can be utilized with any combination of direct or indirect heat source, fluidized or non-fluidized beds, and single or multiple stages. Moreover, the drying approach described in this invention is not limited to enhancing the quality of coal to be burned in the utility or industrial boilers but can also be applied to dry particulate materials for the glass, aluminum, pulp and paper and other industries. For example, sand used as a feedstock in the glass industry can be dried and preheated by a fluidized bed dryer using waste heat harvested from flue gas exiting the furnace stack before the sand is fed to the glass furnace. This will improve thermal efficiency of the glass-making process.

As another example, a fluidized bed dryer can be used as a calcinatory in aluminum production. To refine alumina from raw bauxite ore, the ore is broken up and screened when necessary to remove large impurities like stone. The crushed bauxite is then mixed in a solution of hot caustic soda in digesters. This allows the alumina hydrate to be dissolved from the ore. After the red mud residue is removed by decantation and filtration, the caustic solution is piped into huge tanks, called precipitators, where alumina hydrate crystallizes. The hydrate is then filtered and sent to calciners to dry and under very high temperature, is transformed into the fine, white powder known as alumina. The present invention could be used as a calciner in this and similar processes.

As still another example for purposes of illustration, waste heat sources could be applied to a greenhouse used to grow tomatoes or other crops. Therefore, the description is not intended to limit the invention to the particular form disclosed.

We claim:

1. A method for improving a quality characteristic of a material through the application of at least two different waste heat sources, such material being for use within an industrial process operation, wherein such method comprises:
(a) providing a dryer bed for receiving the material and heat content from at least two different waste heat sources to be directed through the material;
(b) providing independent heat exchanger means each operatively connected to a waste heat source, a mixer box and the dryer bed to transfer a desired amount of heat content from each waste heat source to the mixer for use in the dryer bed; and
(c) actively combining heat content contained within the at least two waste heat sources in the mixer box for delivering an aggregate heat content at or below 300° F. to the dryer bed;

(d) wherein "waste heat source" means a gaseous or liquid stream having an elevated heat content resulting from an operation of a process or piece of equipment separate from the heat treatment apparatus, such gaseous or liquid stream being used for the secondary purpose of providing heat content to the heat exchanger instead of being discarded.

2. The method according to claim 1, wherein the material comprises coal.

3. The method of claim 2, wherein the coal comprises subbituminous or lignite coal.

4. The method according to claim 1, wherein the industrial process operation comprises an electric power plant.

5. The method according to claim 1, wherein the industrial process operation comprises a coal coking plant.

6. The method according to claim 1, wherein the improvement to the quality characteristic comprises a reduction in moisture of the material.

7. The method of claim 6, wherein the material is lignite coal whose moisture level is reduced to a value of 15-30% wt.

8. The method of claim 7, wherein the material is lignite coal whose moisture level is reduced to a value of 29-30% wt.

9. The method of claim 6, wherein the material is subbituminous coal whose moisture level is reduced to 15-28 wt %.

10. The method of claim 9, wherein the material is subbituminous coal whose moisture level is reduced to a value of 20-28% wt.

11. The method of claim 1, wherein the dryer bed comprises a fixed-bed dryer.

12. The method of claim 1, wherein, the dryer bed comprises a fluidized-bed dryer containing a bed of the material, and including means for delivering a forced air stream through the fluidized bed to fluidize the material.

13. The method of claim 1 further comprising a heat exchanger operatively connected to the flow of forced air stream for receiving heat from at least one waste heat source for heating the forced air stream prior to its delivery to the fluidized-bed dryer.

14. The method of claim 12, wherein the fluidized-bed dryer comprises a single vessel.

15. The method of claim 12, wherein the fluidized-bed dryer comprises multiple vessels.

16. The method of claim 12, wherein the vessel of the fluidized-bed dryer comprises multiple stages.

17. The method of claim 1, wherein the waste heat source is selected from the group consisting of hot condenser cooling water, hot stack gas, hot flue gas, spent process steam, and discarded heat from operating equipment.

18. The method of claim 1, wherein the temperature delivered to the dryer bed by the heat sources does not exceed 300° F.

19. The method of claim 18, wherein the temperature delivered to the dryer bed by the heat sources does not exceed 200° F.

20. The method of claim 1, wherein the particulate material is treated in the dryer bed in the presence of atmospheric air.

21. The method of claim 1, wherein the particulate material is treated in the dryer bed in the absence of an inert gas.

22. The method of claim 1, wherein the particulate material is treated in the dryer bed without the delivery of steam to the dryer bed.

23. The method according to claim 1, wherein the improvement to the quality characteristic comprises a reduction of amount of at least one contaminant contained in the material.

24. The method according to claim 1, wherein the particulate material comprises biomass, bark, peat, forestry waste matter, bauxite or other ores, grains, cereals, malt, cocoa, or a substrate to be modified or transformed within the industrial process operation.

25. The method according to claim 1 further comprising a mixing box operatively connected to the dryer bed, wherein the associated sets of heat exchanger and thermal carrier means for each of the heat sources are operatively connected to the mixing box for communicating a predetermined amount of heat content contained within the at least two heat sources via the thermal carrier means to the mixing box for further communication as a blended amount of heat to the dryer bed.

26. A method for improving a quality characteristic of a particulate material in the form of drying the particulate material through the application of two different waste heat sources, such particulate material being for use within an industrial plant operation, wherein such method comprises:
(a) providing a fluidized-bed dryer unit having an interior for receiving the particulate material;
(b) providing a fluidizing stream for fluidizing the particulate material contained within the dryer unit;
(c) providing a first heat exchanger for transferring heat content from a first waste heat source to the fluidizing stream to increase its temperature before it flows to and through the dryer unit; and
(d) providing a second heat exchanger for transferring heat content from a second waste heat source, different from the first waste heat source, to a third heat exchanger embedded within the dryer unit for increasing the interior temperature of the dryer unit to a temperature at or below 300° F. such that moisture within the particulate material is reduced.

27. The method of claim 26, wherein the heat source consists of hot condenser cooling water.

28. The method of claim 26 further comprising second waste heat source different in type from the first waste heat source, wherein a combination of the heat contained within the two waste heat sources is delivered via associated heat exchangers to the first heat exchanger operatively associated with the fluidizing stream, or the second heat exchanger operatively associated with the third heat exchanger embedded within the dryer unit.

29. A method for improving a quality characteristic of a particulate feed material in the form of reducing the moisture in the particulate feed material for use in an industrial plant operation producing two different types of waste heat sources and having the particulate feed material delivered to a boiler furnace, such method comprising:
(a) providing a first heat exchanger operatively connected to a hot condenser cooling water waste heat source for transferring heat content from the hot condenser cooling water waste heat source via the first heat exchanger to a fluidizing stream to increase the temperature of the fluidizing stream;
(b) providing a second heat exchanger operatively connected to a flue gas waste heat stream from the boiler furnace for transferring heat content from the flue gas waste heat source via the second heat exchanger to the fluidizing stream that exited the first heat exchanger to further increase the temperature of the fluidizing stream; and
(c) delivering the fluidizing stream heated in series via the first heat exchanger and second heat exchanger to a fluidized bed dryer to fluidize the particulate feed material contained therein to reduce the moisture in such particulate feed material in order to optimize the boiler efficiency.

30. A method for improving a quality characteristic of a particulate feed material in the form of reducing the moisture in the particulate feed material for use in an industrial plant operation producing two different types of waste heat sources and having the particulate feed material delivered to a boiler furnace, such method comprising:
  (a) providing a first heat exchanger operatively connected to a hot condenser cooling water waste heat source for transferring heat content from the hot condenser cooling water waste heat source via the first heat exchanger to a fluidizing stream to increase the temperature of the fluidizing stream;
  (b) providing a second heat exchanger operatively connected to a flue gas waste heat stream from the boiler furnace for transferring heat content from the flue gas waste heat source via the second heat exchanger to the fluidizing stream that exited the first heat exchanger to further increase the temperature of the fluidizing stream;
  (c) delivering the fluidizing stream heated in series via the first heat exchanger and second heat exchanger to a fluidized bed dryer to fluidize the particulate feed material contained therein; and
  (d) providing a third heat exchanger located inside the fluidized bed dryer connected to the hot condenser cooling water waste heat source for delivering heat content of the hot condenser cooling water waste heat source via the third heat exchanger to the particulate feed material in the dryer to reduce its moisture content in order to optimize the boiler efficiency.

31. A method for improving a quality characteristic of a particulate feed material in the form of reducing the moisture in the particulate feed material for use in an industrial plant operation producing two different types of waste heat sources and having the particulate feed material delivered to a boiler furnace, such method comprising:
  (a) providing a first heat exchanger operatively connected to a hot condenser cooling water waste heat source for transferring heat content from the hot condenser cooling water waste heat source via the first heat exchanger to the fluidizing stream to increase the temperature of the fluidizing stream;
  (b) providing a second heat exchanger operatively connected to a flue gas waste heat stream from the boiler furnace for transferring heat content from the flue gas waste heat source via the second heat exchanger to the fluidizing stream that exited the first heat exchanger to further increase the temperature of the fluidizing stream;
  (c) delivering a portion of the fluidizing stream exiting the first heat exchanger to a mixing box;
  (d) delivering the fluidizing stream exiting the second heat exchanger at the further elevated temperature to the mixing box; and
  (e) delivering a blended fluidizing stream containing predetermined portions of the fluidizing stream exiting the first heat exchanger and the fluidizing stream exiting the second heat exchanger to a fluidized bed dryer to fluidize the particulate feed material contained therein to reduce the moisture in such particulate feed material in order to optimize the boiler efficiency.

32. A method for improving a quality characteristic of a particulate feed material in the form of reducing the moisture in the particulate feed material for use in an industrial plant operation producing two different types of waste heat sources and having the particulate feed material delivered to a boiler furnace, such method comprising:
  (a) providing a first heat exchanger operatively connected to a hot condenser cooling water waste heat source for transferring heat content from the hot condenser cooling water waste heat source via the first heat exchanger to a fluidizing stream to increase the temperature of the fluidizing stream;
  (b) providing a second heat exchanger operatively connected to a flue gas waste heat stream from the boiler furnace for transferring heat content from the flue as waste heat source via the second heat exchanger to the fluidizing stream that exited the first heat exchanger to further increase the temperature of the fluidizing stream;
  (c) delivering the fluidizing stream heated in series via the first heat exchanger and second heat exchanger to a fluidized bed dryer to fluidize the particulate feed material contained therein; and
  (d) providing a third heat exchanger connected to the flue gas waste heat stream exiting the second heat exchanger for delivering heat content of the flue gas waste heat source via the third heat exchanger to a fourth heat exchanger located inside the fluidized bed dryer to the particulate feed material in the dryer to reduce its moisture content in order to optimize the boiler efficiency.

33. A method for improving a quality characteristic of a particulate feed material in the form of reducing the moisture in the particulate feed material in an industrial plant operation producing two different types of waste heat sources and having the particulate feed material delivered to a boiler furnace, such method comprising:
  (a) providing a first heat exchanger operatively connected to a hot condenser cooling water waste heat source for transferring heat content from the hot condenser cooling water waste heat source via the first heat exchanger to a fluidizing stream to increase the temperature of the fluidizing stream;
  (b) providing a second heat exchanger operatively connected to a flue gas waste heat stream from the boiler furnace for transferring heat content from the flue gas waste heat source via the second heat exchanger to the fluidizing stream that exited the first heat exchanger to further increase the temperature of the fluidizing stream;
  (c) delivering the fluidizing stream heated in series via the first heat exchanger and second heat exchanger to a fluidized bed dryer to fluidize the particulate feed material contained therein;
  (d) providing a third heat exchanger located inside one of the stages of the fluidized bed dryer connected to the hot condenser cooling water waste heat source for delivering heat content of the hot condenser cooling water waste heat source via the third heat exchanger to the particulate feed material contained inside that stage of the dryer to reduce its moisture content; and
  (e) providing a fourth heat exchanger connected to the flue gas waste heat steam exiting the second heat exchanger for delivering heat content of the flue gas waste heat source via the fourth heat exchanger to a fifth heat contained inside that other stage of the dryer to reduce its moisture content in order to optimize the boiler efficiency.

* * * * *